(12) United States Patent
Williams

(10) Patent No.: US 8,668,898 B1
(45) Date of Patent: Mar. 11, 2014

(54) LOW RADIOCARBON DIETARY SUPPLEMENTS AND FOODS AND METHODS OF MAKING AND USING SAME

(75) Inventor: Christopher P. Williams, Brunswick, OH (US)

(73) Assignee: Radiocarb Genetics, Inc., Brunswick, OH (US)

( * ) Notice: Subject to any disclaimer, the term of this patent is extended or adjusted under 35 U.S.C. 154(b) by 23 days.

(21) Appl. No.: 13/460,054

(22) Filed: Apr. 30, 2012

Related U.S. Application Data

(60) Division of application No. 12/151,972, filed on May 9, 2008, now abandoned, which is a continuation-in-part of application No. 11/344,003, filed on Jan. 31, 2006, now abandoned, which is a continuation-in-part of application No. 11/267,861, filed on Nov. 4, 2005, now abandoned, said application No. 12/151,972 is a continuation-in-part of application No. PCT/US2007/010775, filed on May 3, 2007, which is a continuation of application No. 11/344,003, filed on Jan. 31, 2006, now abandoned.

(51) Int. Cl.
*A61K 35/00* (2006.01)
*A61K 36/00* (2006.01)
*A61K 38/00* (2006.01)
*A61K 47/00* (2006.01)
*A61K 48/00* (2006.01)
*A61K 51/04* (2006.01)

(52) U.S. Cl.
USPC ...... 424/1.11; 424/1.37; 424/195.1; 424/439; 424/520; 514/2; 514/44

(58) Field of Classification Search
USPC ......... 424/1.11, 1.37, 195.1, 439, 520; 514/2, 514/44
See application file for complete search history.

(56) References Cited

U.S. PATENT DOCUMENTS

| | | | |
|---|---|---|---|
| 3,854,240 A | 12/1974 | Oldham et al. | |
| 4,084,346 A | 4/1978 | Stengel et al. | |
| 4,544,559 A | 10/1985 | Gil et al. | |
| 4,638,013 A | 1/1987 | Moja et al. | |
| 4,868,123 A | 9/1989 | Berson et al. | |
| 4,888,185 A | 12/1989 | Miller | |
| 4,994,442 A | 2/1991 | Gil et al. | |
| 5,026,721 A | 6/1991 | Dudrick et al. | |
| 5,066,500 A | 11/1991 | Gil et al. | |
| 5,151,347 A | 9/1992 | Delente et al. | |
| 5,286,468 A | 2/1994 | Chang et al. | |
| 5,471,785 A * | 12/1995 | Matthews | 47/58.1 R |
| 5,488,039 A | 1/1996 | Masor et al. | |
| 5,492,899 A | 2/1996 | Masor et al. | |
| 5,583,117 A | 12/1996 | von Borstel et al. | |
| 5,602,109 A | 2/1997 | Masor et al. | |
| 5,621,209 A | 4/1997 | Purser | |
| 5,700,590 A | 12/1997 | Masor et al. | |
| 5,712,256 A | 1/1998 | Kulkarni et al. | |
| 5,719,133 A | 2/1998 | Schmidl et al. | |
| 5,811,072 A | 9/1998 | Price et al. | |
| 5,956,896 A * | 9/1999 | Miekka et al. | 47/58.1 R |
| 6,254,904 B1 | 7/2001 | Bailey | |
| 6,503,506 B1 | 1/2003 | Germano | |
| 6,511,696 B2 | 1/2003 | Gohman et al. | |
| 6,576,634 B1 | 6/2003 | Steegers-Theunissen et al. | |
| 6,645,543 B2 | 11/2003 | Gohman et al. | |
| 6,872,516 B2 | 3/2005 | Evans et al. | |
| 6,896,804 B2 | 5/2005 | Haerther et al. | |
| 6,916,616 B2 | 7/2005 | Ihlenfeldt et al. | |
| 2002/0155478 A1 | 10/2002 | Nelson et al. | |
| 2004/0043473 A1 | 3/2004 | St. Lawrence | |
| 2004/0048256 A1 | 3/2004 | Agee et al. | |
| 2004/0138167 A1 | 7/2004 | Burcoglu | |
| 2005/0154064 A1 | 7/2005 | Piomelli et al. | |
| 2006/0038124 A1 | 2/2006 | Verhagen | |
| 2006/0088574 A1 * | 4/2006 | Manning et al. | 424/439 |
| 2006/0286279 A1 | 12/2006 | Eastman et al. | |

OTHER PUBLICATIONS

The World Health Organization Energy and Protein Requirements (1991; only relevant sections provided).*
Drewnowski et al, Am. J. Public Health 94(9): 1555-1559, 2004.*
Wang et al, J. Agric. Food Chem. 44:701-705, 1996.*
van der Plicht et al, Envrion. Chem. Lett; avail. online Dec. 15, 2009; DOI 10.1007/s10311-009-0264-4.*
Isaac Asimov, The Radioactivity of the Human Body, Journal of Chemical Education, v32, pp. 84-85 (1955).
David C. Lowe, Problems associated with the use of coal as a source of 14C-free background material, Radiocarbon 31(2):117-120 (1989).
J. S. Vogel, D. E. Nelson, and J. R. Southon, Accuracy and Precision in Dating Microgram Carbon Samples, Radiocarbon 31(2):145-149 (1989).
Richard D. Wood, Michael Mitchell, John Sgouros, and Tomas Lindahl, Human DNA Repair Genes, Science, 291:1284 (2001).
Aziz Sancar, Laura A. Lindsey-Boltz, Keziban Unsal-Kamaz, and Stuart Linn, Molecular Mechanisms of Mammalian DNA Repair and the DNA Damage Checkpoints, Annu. Rev. Biochem. 73:39-85 (2004).
Youngji Park and Stanton L. Gerson, DNA Repair Defects in Stem Cell Function and Aging, Annu. Rev. Med. 56:495-508 (2005).
Emily Oken, Ken P. Kleinman, Janet Rich-Edwards and Matthew W Gillman, A nearly continuous measure of birth weight for gestational age using a United States national reference, BMC Pediatrics 3:6 (2003). (http://www.biomedcentral.com/1471-2431/3/6).

(Continued)

*Primary Examiner* — Kevin Hill

(57) ABSTRACT

Methods and compositions for effectively lowering the carbon-14 content, particularly of DNA and histones in vertebrates, especially humans, to significantly below normal background levels and thereby reduce chromosomal damage using nutritional or dietary supplements based on low radiocarbon DNA, amino acid and histone precursors, further preferably including those which contribute the largest share of histone carbon atoms. Administration of the supplements during the earliest and/or most active growth stages of life is particularly beneficial. Particularly useful supplements are prepared by combining low radiocarbon precursor compounds with ordinary supplement or dietary components that exhibit substantially normal background radiocarbon concentrations.

19 Claims, 2 Drawing Sheets

(56) References Cited

OTHER PUBLICATIONS

Working Party on Fossil Fuels (WPFF), CO2 Capture at Power Stations and Other Major Point Sources, International Energy Agency (IEA)—Organisation for Economic Co-operation and Dpvelopment (OECD), 2003. (http://www.iea.org/textbase/papers/2003/CO2_Power_Fossil_Fuels.pdf).

Vyh Yu, Scientific rationale and benefits of nucleotide supplementation of infant formula, J. Paediatr. Child Health 38:543-549 (2002).

Wei Kong, Karen Engel and Joanne Wang, Mammalian Nucleoside Transporters, Current Drug Metabolism, 5:63-84 (2004).

Cabrita et al, Molecular biology and regulation of nucleoside and nucleobase transporter proteins in eukaryotes and prokaryotes, Biochem. Cell Biol. 80: 623-638 (2002).

Shah et al., Uptake of free adenosine and adenosine from adenosine monophosphate by human peripheral blood lymphocytes, Clin. exp. Immunol. (1986) 66, 158-165.

Bernstein, R.B., "Simple Laboratory Method for Producing Enriched Carbon-13", Science Jul. 19, 1957 126: 119-120.

P. H. Abelson, et al., "Carbon Isotope Fractionation in Formation of Amino Acids by Photosynthetic Organisms," PNAS 1961(47): 623-632.

Kaplan, I.R. et al., "Anomalous Carbon-Isotope Ratios in Nonvolatile Organic Material," Science 153, 744-745, 744 (1966).

V Parthasarathy, A K Nayak and S K Sarkar, "Control strategies for laser separation of carbon isotopes," Proc. Indian Acad. Sci. (Chem. Sci.), vol. 114, No. 6, Dec. 2002, pp. 639-648, 639, 640.

Email communications thread, C.P. Williams and Cambridge Isotope Laboratories, Aug. 21, 2007-Aug. 28, 2007.

Bhardwaj et al., Neocortical neurogenesis in humans is restricted to development, PNAS, Aug. 15, 2006; vol. 103, No. 33, 12564-12568.

Williams, Christopher P., Recycling greenhouse gas fossil fuel emissions into low radiocarbon food products to reduce human genetic damage, Environ. Chem. Lett. (2007) 5:197-202.

* cited by examiner

LOW RADIOCARBON DIETARY SUPPLEMENTS AND FOODS AND METHODS OF MAKING AND USING SAME

CROSS REFERENCE TO RELATED APPLICATIONS

This application is a divisional of application Ser. No. 12/151,972 filed on May 9, 2008, which is a continuation-in-part of Application No. PCT/US2007/010775 filed on May 3, 2007, which is a continuation-in-part of U.S. application Ser. No. 11/344,003 filed on Jan. 31, 2006, which is a continuation-in-part of U.S. application Ser. No. 11/267,861 filed on Nov. 4, 2005, the disclosures of which are incorporated herein by reference.

BACKGROUND OF THE INVENTION

This application relates to low radiocarbon dietary supplements for vertebrates including mammals, fish and fowl, and particularly for humans, which supplements are preferably directed to nucleotides, amino acids, and other DNA and histone protein precursors, and to methods for making such supplements, preferably using byproduct or recycled carbon dioxide "greenhouse gas" emissions from industrial combustion processes involving fossil fuels.

The majority of carbon in the biosphere (the atmosphere, oceans, and surface of the earth where life exists) consists of carbon-12 (about 98.89% natural abundance) or carbon-13 (about 1.11% natural abundance). These are both stable (non-radioactive) isotopes. However, there is a third significant carbon isotope, carbon-14 (also referred to elsewhere and in this document as $^{14}C$ or radiocarbon), which is radioactive with a half-life of 5730 years and which decays by beta emission to nitrogen-14, the stable form of nitrogen. This transmutation of carbon-14 to nitrogen-14 involves beta particle (electron) decay with an energy of 0.1565 MeV (156,500 eV).

The formation of radioactive carbon-14 in the earth's upper atmosphere was first theorized in the 1930's by Serge Korff, who proposed that cosmic rays striking particles in the upper atmosphere would result in secondary neutrons which would become thermalized and ultimately react with nitrogen-14 atoms to yield carbon-14 and a proton (Currie, 2004). These carbon-14 atoms quickly become oxidized to $^{14}CO_2$ (radioactive carbon dioxide), which within a few hundred years reach an equilibrium concentration in the atmosphere and oceans with the stable forms of $CO_2$, assuming that the cosmic ray flux is relatively constant. Since virtually all living organisms derive the carbon incorporated into their various structures either directly from $CO_2$ in the atmosphere or oceans via photosynthesis, or directly or indirectly by consuming photosynthetic organisms, during their lifetimes they also will have a percentage of radiocarbon in all of their organic matter that is approximately the same as that of the atmosphere. In the 1940's Willard F. Libby developed a technique to measure these trace levels of radiocarbon in $CO_2$ and in living and dead organic material, and to deduce the age of dead organic material by the corresponding depletion of radiocarbon due to its decay. For this development of the carbon dating technique he was awarded a Nobel Prize (Libby, 1960). Libby experimentally verified that natural background radiocarbon levels of $CO_2$ (referred to herein as the natural abundance concentration of carbon-14) in the biosphere (defined as $CO_2$ in the atmosphere, $CO_2$ dissolved in the oceans, and in organic matter from living organisms all over the earth) had a radioactivity level of about 15.3 dpm/g (disintegrations per minute per gram of carbon). This amount of radioactivity corresponds to a carbon-14 level of just one atom out of every 750 billion total carbon atoms. This natural background radiocarbon level is an approximation, and over time may increase due to additional carbon-14 released into the atmosphere from human or natural nuclear activity, or may decrease by release of additional low radiocarbon into the atmosphere from the burning of fossil fuels. Changes in solar activity may also affect the background radiocarbon levels over time. For the purposes of this disclosure and claims, reference to natural, natural abundance, background or natural background radiocarbon levels, such as "95% below natural radiocarbon levels," is based on assuming a current natural background level of radiocarbon of about one carbon-14 atom per every 750 billion total carbon atoms. For convenience, natural background levels of radiocarbon may also be expressed in units of percent modern carbon (pMC), where 100% of the current natural background radiocarbon level is equal to 100 pMC. The terms radiocarbon level and radiocarbon concentration are used interchangeably.

Asimov (1955, 1976) was the first to clearly point out that even this trace level of radioactive carbon-14 would result in a significant number of mutations in human DNA. However, he accepted this natural background level of radiocarbon and the resulting mutations as unavoidable. Asimov instead focused attention on preventing any further increase in radiocarbon levels by limiting atmospheric testing of nuclear weapons. Further, Asimov speculated on whether a diet high in C-14 would increase the mutation rate in *Drosophila* (the fruit fly) or if it would increase tumor formation rates in cancer-prone strains of rats.

Carbon-14 decay occurring in carbon atoms in living organisms may cause damage by several mechanisms. First, a beta decay converts a carbon-14 atom into the chemically dissimilar nitrogen-14 atom. This alone can significantly alter the chemical structure of the affected compound or molecule in which it is present. Second, the emission of the 156,500 eV beta particle (electron) results in a massive recoil of the remaining nitrogen-14 atom, ripping it from whatever compound or molecule of which it was originally a part (also referred to in the art as the "Szilard-Chalmers Effect"). Typical C—C bond enthalpies (bond energies) of 3.59 eV, or C—N bond enthalpies of 3.16 eV, would not be strong enough to retain such a recoiling atom, and it is torn from its original structure. Third, the emitted 156,000 eV beta particle can subsequently ionize thousands of nearby molecules, including water molecules and whatever organic molecules are present. Assuming an average of 35 eV needed to form an ion pair, a single emitted carbon-14 beta particle could produce as many as 4400 ion pairs before dissipating all of its energy. Furthermore, each of the ion pairs produced could potentially be free radicals or other chemically reactive species, which in turn could react with other nearby molecules, including DNA or histone protein residues. These three mechanisms of carbon-14 damage are particularly harmful to the cell when the decaying carbon-14 atom is itself part of the DNA or histones of the chromosomes.

Natural sources of carbon with low radiocarbon levels do exist, primarily in ancient limestone, oil, and coal formations that are not in equilibrium with the carbon of the biosphere. Because half of a sample's carbon-14 atoms will decay every 5730 years, a sample starting out at 100 pMC (that is, at 100% of the current natural abundance level) and that is isolated from the biosphere and has no further carbon-14 added to it will have decayed to lower percentages of carbon (pMC) as illustrated in the following table, Table 1:

TABLE 1

| Decay Time (years) | Remaining Radiocarbon Carbon (pMC) |
| --- | --- |
| 425 | 95.0 |
| 870 | 90.0 |
| 5,730 | 50.0 |
| 7,570 | 40.0 |
| 9,955 | 30.0 |
| 13,305 | 20.0 |
| 19,040 | 10.0 |
| 24,770 | 5.0 |
| 32,360 | 2.0 |
| 34,700 | 1.5 |
| 38,100 | 1.0 |
| 43,800 | 0.50 |
| 57,000 | 0.10 |
| 95,000 | 0.001 |
| 95,000 | 1.0E−03 |
| 140,000 | 4.4E−06 |
| 266,500 | 1.0E−12 |

Absent contamination from biosphere sources, within 1,000,000 years even a massive coal deposit would be reduced to a level of 0 pMC and would not be expected to contain even a single atom of carbon-14. It should be noted that elimination of natural background carbon-14 from ordinary carbon is also theoretically possible using artificial isotopic separation or enrichment processes. However, such processes are extremely expensive and therefore cost prohibitive for use in producing large quantities of materials for food or nutritional purposes. Furthermore, processes are known for producing enriched carbon-13, typically containing unspecified levels of carbon-14, for use in producing organic compounds for isotopic tracer purposes, for example in drugs or other ingestible components. Such enriched carbon-13 compounds are not necessarily lower in carbon-14, since typical isotopic enrichment processes used to separate the heavier carbon-13 from lighter carbon-12 will typically also enrich the concentration of the still heavier carbon-14, unless special measures are deliberately taken. Furthermore, carbon-13 enriched materials, regardless of their carbon-14 content, would likely not be suitable or safe for use as a component of the human (or mammalian) diet because of potential biochemical or physiological issues involving kinetic isotope effects associated with the highly enriched carbon-13 materials.

Matthews (U.S. Pat. No. 5,471,785) proposed a method to reduce the amount of radiocarbon in organisms to extremely low levels using organic nutrients with radiocarbon levels of at most $\frac{1}{100}^{th}$ the natural abundance level, which he calculated to be less than 2 atoms of carbon-14 per $10^{14}$ atoms of carbon (which can also be expressed as 1.5 pMC when adjusted for the natural abundance level of 1 $C^{14}$ per 750 billion carbon atoms, as assumed in this disclosure). It is disclosed that achieving such low levels of radiocarbon requires fairly drastic methods. There must be a minimum of contact with the atmosphere throughout the entire process, which would require hermetic enclosures or airlocks and purging to eliminate contamination from sources such as atmospheric $CO_2$. Vacuum heat treatment of solid carbon sources such as coal, and use of shielded underground greenhouses with artificial illumination are also recommended. Miekka (U.S. Pat. No. 5,956,896) proposed a variation on Matthews in which a controlled greenhouse using $CO_2$ virtually free from radiocarbon is used to raise photosynthetic plants for human or animal consumption, as well as low radiocarbon-containing animals and animal products for human consumption. The methods disclosed are directed to a total diet low in carbon-14, in order to lower the carbon-14 level in all organic compounds of the organism, including, e.g., lipids, proteins, sugars, etc.

Additionally, ultra-low carbon-14 raw materials having radiocarbon levels below 1 pMC and as low as 0.0001 pMC (see, e.g., Matthews) may not be readily available. Although one would expect (as did Matthews) that most coal or oil deposits, which are conventionally dated as tens or hundreds of millions of years old, should have near 0% radiocarbon, that is not the case. For whatever reason, whether due to contamination by microorganisms, radioactive byproducts of trace amounts of radioactive substances including uranium, small amounts of de-novo synthesis of carbon-14 in-situ, or other undefined causes, these deposits are typically found with carbon-14 levels that would be expected for deposits as young as 25,000 to 45,000 years, or 5 to 8 half-lives of carbon-14 (Lowe, 1989). Thus, coal radiocarbon levels range from about 3.1% to about 0.4% of natural background levels (about 3.1 pMC to about 0.4 pMC, or $\frac{1}{30}^{th}$ to $\frac{1}{250}$th of the natural radiocarbon abundance found in the biosphere).

Various workers have documented that nucleosides and various related DNA precursors are naturally found in human milk, and have provided methods of supplementing infant formula, humanized milk, and other human nutritional formulas with various DNA precursors. See, for example, Gil et al. (U.S. Pat. Nos. 4,544,559, 5,066,500, 1991), Masor et al. (U.S. Pat. Nos. 5,488,039, 5,492,899, 5,602,109, 5,700,590), Kulkarni et al. (U.S. Pat. No. 5,712,256, 1998), Germano (U.S. Pat. No. 6,503,506), and Gohman et al. (U.S. Pat. No. 6,511,696, U.S. Pat. No. 6,645,543). Humans and other mammals have a variety of active and passive nucleoside transporter proteins which facilitate cellular uptake of these compounds (Kong et al., 2004).

Ordinary nucleotide supplementation of infant formulas is currently available; see, for example, "Similac Advance" and "Similac NeoSure Advance—Infant Formula with Iron" (Ross Nutritionals, Abbott Laboratories). Among other nutrients, these formulas contain added amounts of four basic nucleotides: adenosine 5'-monophosphate, cytidine 5'-monophosphate, disodium guanosine 5'-monophosphate, disodium uridine 5'-monophosphate.

In addition to individual amino acid supplements, typically available over-the-counter, are more complex formulations used for special medical purposes. For example, an infant formula containing, among other nutrients, added amounts of the essential amino acids L-cystine, L-tyrosine and L-tryptophan, is commercially available in the United States as "Similac Alimentum Advance" (Ross Nutritionals, Abbott Laboratories). Also available (Mead Johnson Nutritionals) are a number of special dietary replacement formulas supplemented with selected amino acids for use by infants, children, juveniles and adults suffering from metabolic disorders such as phenylketonuria (PKU), maple syrup urine disease (MSUD), homocystinuria, and glutaric acidemia Type 1. "Phenyl-Free 1" and "Phenyl-Free 2" (for infants, children and adults with Phenylketonuria, or PKU) both include 17 added amino acids (all except for phenylalanine, asparagine, and glutamine). "LMD" (for "Leucine Metabolism Disorders") is a formula for infants and toddlers that includes among other nutrients 16 added amino acids (all the primary amino acids except for leucine, asparagine, glutamic acid, and glutamine). "BCAD 1" and "BCAD 2" (for MSUD) both include 15 added amino acids (all except for leucine, isoleucine, valine, asparagine, and glutamine). "HCY 1" and "HCY 2" (HCY for homocystinuria) both include 17 added amino acids (all except for methionine, asparagine, and glutamine).

"GA" (for Glutaric Acidemia Type 1) includes among other nutrients 15 added amino acids (all the primary amino acids except for lysine, tryptophan, asparagine, glutamic acid, and glutamine). Mead Johnson Nutritionals also makes a special formula ("Phenyl-Free 2 HP") that is provided for expectant women with maternal PKU. It has a higher proportion of amino acids relative to carbohydrates and fats, thus permitting the patient to consume larger amounts of other foods that are not too high in phenylalanine. Other examples of infant formula supplemented with amino acids include Gohman, et al. (U.S. Pat. No. 6,511,696, 2003; U.S. Pat. No. 6,645,543, 2003) and Schmidl (U.S. Pat. No. 5,719,133).

Greenhouse Gases—Emissions of Carbon Dioxide There continues to be a concern that the significant amounts of carbon dioxide ($CO_2$) being released into the atmosphere may act as a "greenhouse gas" with the potential for causing destabilizing climatic change. The United States Department of Energy (DOE) released figures showing that the worldwide emission of carbon dioxide reached 25,162 million metric tons in 2003, a 37% increase since 1980. This same report disclosed that 98% of the $CO_2$ emissions from the U.S. were from the combustion of fossil fuels such as coal, oil, or natural gas. At least 35% of the $CO_2$ emissions in the U.S. come from stationary combustion sources, such as coal-fired electrical generators or industrial heaters or furnaces. The National Energy and Technology Laboratory of the United States Department of Energy (DOE) (NETL DOE, www.netl.doe.gov) is spending millions of dollars funding numerous carbon sequestration research projects aimed at reducing emissions from such $CO_2$ sources into the atmosphere and thus minimize the greenhouse gas effect. The goal of these projects and other international efforts is to find ways to convert the $CO_2$ into biomatter or other organic forms, even if the resulting material is merely dispersed in the ocean or deposited in abandoned mines as inert solid waste. Current estimated costs of sequestering $CO_2$ from a coal-fired power plant are significant, ranging from $35-$264 per ton. The DOE's goal is to reduce this cost to below $10 per ton. One DOE report (Capture and Sequestration of $CO_2$ From Stationary Combustion Systems by Photosynthesis of Microalgae) describes efforts to use photobioreactors with microalgae to sequester $CO_2$ emissions into high value products including pharmaceuticals, fine chemicals and commodities. However, conversion to products such as low radiocarbon nucleotides or amino acids has never been recognized or suggested. Further improvements in dietary supplements having reduced labels of radiocarbon will be particularly useful.

SUMMARY OF THE INVENTION

In one embodiment of the invention there is provided a nutritional supplement comprising: (I) at least one member, including enantiomers, stereoisomers, rotamers, tautomers, racemates and nutritionally acceptable salts or solvates thereof, selected from the group consisting of: (A) DNA precursor compounds comprising purines, pyrimidines, nucleosides, deoxynucleosides, nucleotides, deoxynucleotides, and derivatives and mixtures thereof; (B) amino acids, amino acid derivatives and mixtures thereof; and (C) mixtures of (A) and (B); and (II) at least one component selected from the group consisting of fats, lipids, fatty acids, carbohydrates, ingestible dietary organic compounds, vitamins, pharmaceutically acceptable carriers, excipients and stabilizers; wherein the at least one member from (I) exhibits a level of carbon-14 that is at least about 50% lower to about 100% lower than the natural abundance concentration of carbon-14 and the at least one component from (II) exhibits a level of carbon-14 that is at about the natural abundance concentration of carbon-14.

In another embodiment of the invention there is provided a method for reducing in a vertebrate the radiocarbon content of at least one component selected from the group consisting of deoxyribonucleic acid (DNA), histone proteins and chromatin comprising providing to said vertebrate an effective amount of at least one dietary or nutritional supplement as described above so as to form in vivo at least one of DNA, histone proteins or chromatin comprising a reduced concentration of radiocarbon compared to the natural abundance concentration of radiocarbon.

In further embodiments, such supplements include an effective amount of one or more DNA precursor compound or amino acids, amino acid derivatives and mixtures thereof wherein the compound, amino acid or amino acid derivative exhibits a radiocarbon content substantially at normal background level, in combination with the low radiocarbon precursor compounds, amino acids or amino acid derivatives as described herein. Still other embodiments of dietary or nutritional supplement compositions are particularly useful where additional components are included with the low radiocarbon nutritional supplement so that it is suitable for use in an infant formula, in a liquid drink or beverage for individuals in various age groups, particularly younger individuals, and as a nutritional supplement for expectant and/or lactating mothers.

An additional embodiment of the invention relates to a method for producing a nutritional or dietary supplement comprising mixing (I) at least one member selected from the group consisting of: (A) DNA precursor compounds selected from the group consisting of purines, pyrimidines, nucleosides, deoxynucleosides and derivatives and mixtures thereof; (B) amino acids and derivatives and mixtures thereof; and (C) mixtures of (A) and (B); and (II) at least one component selected from the group consisting of fats, lipids, fatty acids, carbohydrates, ingestible dietary organic compounds, vitamins, pharmaceutically acceptable carriers, excipients and stabilizers; wherein the at least one member from (I) exhibits a level of carbon-14 that is at least about 50% lower to about 100% lower than the natural abundance concentration of carbon-14 and the at least one component from (II) exhibits a level of carbon-14 that is at about the natural abundance concentration of carbon-14. A further embodiment of this method is provided wherein the supplement further comprises at least one member from (I) wherein the member exhibits a level of carbon-14 that is at about the natural abundance concentration of carbon-14.

DETAILED DESCRIPTION

Definitions

Figure 1:
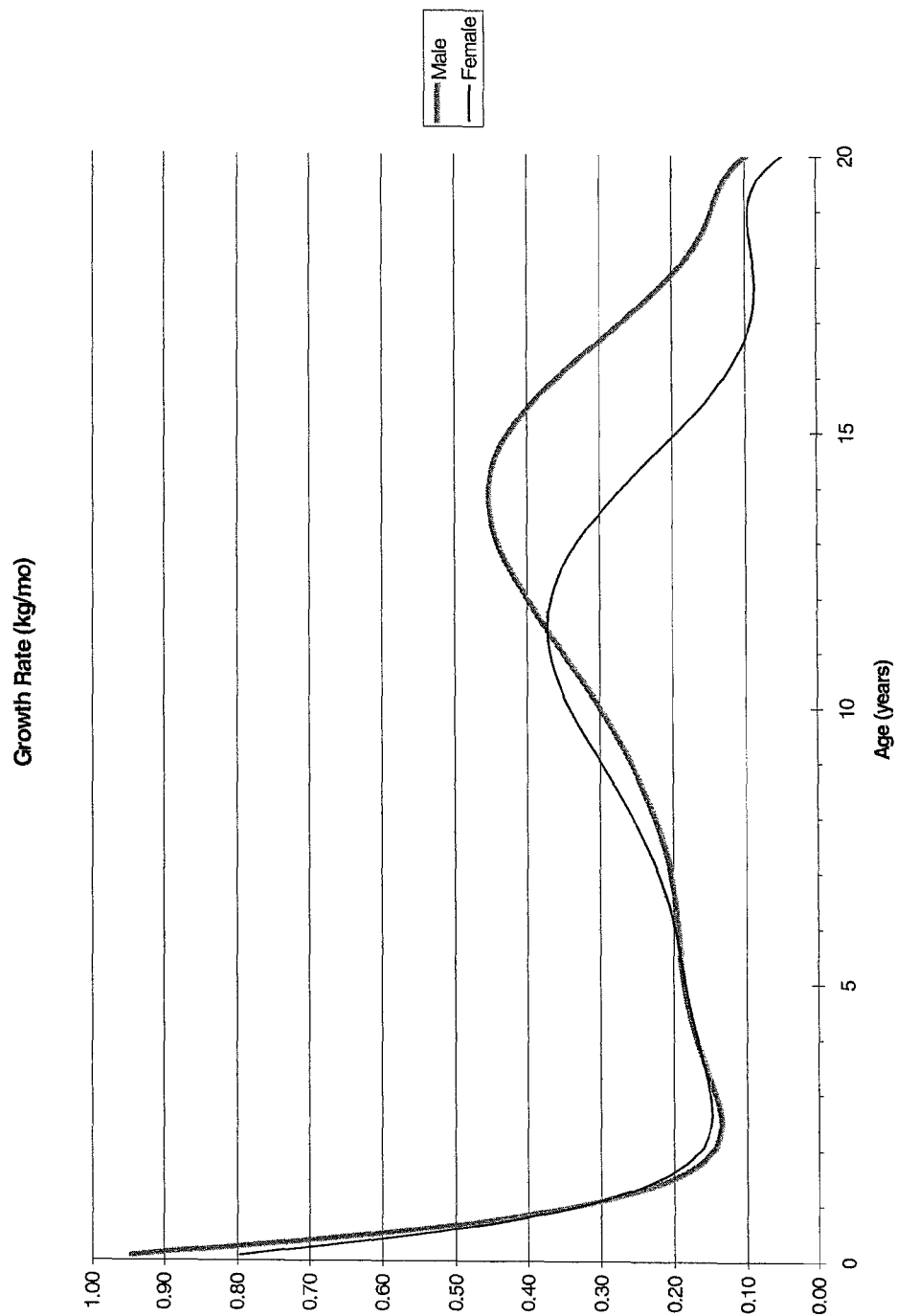
FIG. 1 illustrates the average absolute growth rates (kg/mo) for males and females in the United States from birth through age 20.

For purposes of the present invention, including the description and appended claims, the following terms shall have the indicated meanings.

Amino acids: The term "amino acid(s)", when not explicitly used to denote a specific amino acid such as lysine or arginine is also used to refer to "histone precursors", as defined herein below, since histone precursors, in addition to specific amino acids, are readily converted to amino acids in the body and thus can provide an equivalent benefit. When "amino acid" is prefaced with "standard" or "primary", its meaning shall be understood to include only the twenty amino acids typically transformed into human protein.

Carbohydrate: The term "carbohydrate" or "carbohydrates" as used in the present disclosure and claims refers to any of the organic compounds commonly understood by those skilled in the art to which this invention is directed to be included in the nutritional group which includes carbohydrates, sugars, monosaccharides, disaccharides, polysaccharides, sugar acids and sugar alcohols, but not including sugar nucleosides, sugar nucleotides or any other compounds which are within the definition of a DNA precursor according to the present disclosure and claims.

Comprise or comprising: Throughout the entire specification, including the claims, the word "comprise" and variations of the word, such as "comprising" and "comprises," as well as "have," "having," "includes," "include" and "including," and variations thereof, means that the named steps, components, elements or materials to which it refers are essential, but other steps, components, elements or materials may be added and still form a construct with the scope of the claim or disclosure. When recited in describing the invention and in a claim, it means that the invention and what is claimed is considered to what follows and potentially more. These terms, particularly when applied to claims, are inclusive or open-ended and do not exclude additional, unrecited components, elements or materials, or methods steps.

Consisting essentially of: In the present context, "consisting essentially of" is meant to exclude any element or combination of elements as well as any amount of any element or combination of elements that would alter the basic and novel characteristics of the invention. Thus, by way of example, a nutritional supplement that is comprised primarily of DNA precursors that exhibit normal levels of radiocarbon would be excluded.

DNA precursor: The term "DNA precursor" as used in the present disclosure and claims refers to any of the multiple forms in which purines, pyrimidines and other nitrogenous bases (described herein) are known, whether as bases, nucleosides, or nucleotides (with any level of phosphorylation), whether containing ribose or deoxyribose sugars, and including monomeric, oligomeric, or polymeric, or as salts or mixtures of any of such compounds. The term "nucleotide equivalent" is used to refer to any of the biochemically equivalent or interconvertible forms of nucleic acids, whether present in any one or more of the following forms: purines or pyrimidines, ribonucleosides, deoxyribonucleosides, ribonucleotides, deoxyribonucleotides, oligo- and poly-nucleotides and deoxynucleotides, and phosphate esters of any of these. The various forms of nucleotide equivalents are determined, calculated and expressed as the monophosphate esters. Thus, for example, adenine, adenosine, deoxyadenosine, AMP, dAMP, and ATP are all nucleotide equivalents of AMP. Thus, by way of example, a 1 mg equivalent of AMP could consist of a mixture of any or all of these nucleotide equivalents, in amounts such that if entirely converted to AMP would yield 1 mg of AMP. The various forms of uridine and thymidine are also considered equivalents of each other since they can be readily interconverted by the body (i.e., in vivo). Furthermore, low radiocarbon DNA precursors refers to any quantity or admixture of these compounds in which the carbon atoms of any one or more components they contain have a percentage of radiocarbon that is at least about 10% lower, preferably at least about 25%, 50%, or 75% lower, for example about 50% to about 95% lower, more preferably at least about 90%, 96% or 98% lower, for example about 90% to about 98% lower, and most preferably at least about 96% to about 100% lower than the natural radiocarbon abundance level.

Fat: The term "fat" or "fats" as used in the present disclosure and claims refers to any of the organic compounds commonly understood to be included in the nutritional group which includes fats, oils, and lipids, whether saturated or unsaturated, and including sub-components such as fatty acids, glycerol.

Histone precursor: The term "histone precursor" as used in the present disclosure and claims refers not only to the twenty standard amino acids typically found in proteins, but also to their derivatives such as esters and amides, and including monomeric, oligomeric (dipeptides, tripeptides, as well as compounds containing 2-50 amino acid residues, including cystine and aspartame), or polymeric (polypeptides containing 50 or more amino acid residues), including hydrolyzed, substantially hydrolyzed or partially hydrolyzed proteins, or as salts or adducts or mixtures of any of these compounds, since all the various forms can be readily converted to ordinary amino acids by the body). The use of this term implies, but does not require, relative amounts of amino acids that roughly correspond to the relative abundances of amino acids within histones, as described herein. Furthermore, low radiocarbon histone precursors refers to any quantity or admixture of these compounds in which the carbon atoms of any one or more components they contain have a percentage of radiocarbon that is at least about 10% lower, preferably at least about 25%, 50%, or 75% lower, for example about 50% to about 95% lower, more preferably at least about 90%, 96% or 98% lower, for example about 90% to about 98% lower, and most preferably at least about 96% to about 100% lower than the natural radiocarbon abundance level. Histone precursors of the present invention also refers to the above compounds in which the radiocarbon content is about 99% or more, lower than the natural radiocarbon abundance level.

Infusion: The therapeutic introduction of a fluid other than blood into the bloodstream, e.g., by introduction into a vein.

Inorganic carbon: The term "inorganic carbon" as used in the present disclosure and claims refers to any of the inorganic forms of carbon including pure carbon, carbon dioxide, carbonic acid, or any inorganic carbonates or bicarbonates. Since carbon atoms from inorganic carbon in the diet of animals or humans do not typically become incorporated into the DNA or histones of genetic material in the cells, especially when sufficient dietary nucleotides and amino acids are provided, the radiocarbon level of any dietary inorganic carbon is not relevant for the purposes of the present invention and claims.

Mammal: For purposes of the present invention mammal refers to any animal classified as a mammal, including humans, domestic and farm animals, and zoo, sports, or pet animals, such as dogs, horses, cats, cows, etc. Preferably, the mammal is human.

Milk substitute: For purposes of the present invention, milk substitute refers to any non-dairy beverage intended as a replacement for either human or cow's milk, typically containing protein, fats, vitamins, minerals and other nutrients. Soy milk is one example.

Normal or Ordinary: The terms "normal" or "ordinary", when applied to a food or a chemical substance, is used in the present disclosure and claims to mean food or chemical substances in which the radiocarbon level has not been reduced and thus such materials contain approximately 100% the natural background level of radiocarbon (100 pMC).

Nucleotide: The terms "nucleotide" or "nucleotides", when not clearly used to denote a specific phosphorylated nucleoside such as dCTP or guanosine-5'-monophosphate, are used as equivalent or alternative expressions for "DNA precursor" or "DNA precursors", as previously defined, since DNA precursors are readily converted to nucleotides in the body of a vertebrate, particularly a human, and thus may provide an equivalent benefit.

Oligonucleotide: The term "oligonucleotide" as used in the present disclosure and claims refers to oligomers comprising two or more nucleotide residues, typically from 2 to about 50. The term "polynucleotide" as used in the present disclosure and claims refers to nucleotide polymers comprising about 50 or more nucleotide residues. Both oligonucleotides and polynucleotides containing any low radiocarbon nucleotide residues are to be considered low radiocarbon DNA precursors since they are readily broken down into mixtures of monomeric nucleotides and nucleosides during ordinary digestive processes.

Other organic compounds: The term "other organic compounds" as used in the present disclosure and claims refers to any other organic compounds which do not fall into any of the following groups as defined herein: DNA precursor, histone precursor, carbohydrate, fat, vitamin, and pharmaceutically acceptable carriers, excipients or stabilizers. Other organic compounds include, but are not limited to, such chemical forms as acetates and steroids.

Pharmaceutically acceptable carriers, excipients or stabilizers: Typically such compounds, compositions or mixtures as those described in Remington's Pharmaceutical Sciences 16th edition, Osol, A. Ed. (1980) that may be included in the composition provided that such materials do not adversely affect the desired characteristics of the composition. Acceptable carriers, excipients or stabilizers are nontoxic to recipients at the dosages and concentrations employed and include: additional buffering agents; preservatives; antioxidants; biodegradable polymers; binders; disintegrants; fillers (diluents); lubricants; glidants (flow enhancers); compression aids; colors; sweeteners; suspending/dispersing agents; film formers/coatings; flavors; printing inks; compounds useful for preparing a dosage form, including tablets and capsules; and mixtures thereof.

Preservatives: Compounds that can be added in order to destroy, prevent, or inhibit the proliferation of microorganisms, e.g., bacteria, yeast and mold, during manufacturing, storage and/or use of the nutritional composition. Preservatives can be used individually and in combination with one another; combination products are also commercially available.

Radiocarbon: The term "radiocarbon" is used in the disclosure and claims to mean carbon-14.

Radiocarbon level or concentration: For the purposes of this disclosure and claims, reference to natural, natural abundance, background or natural background radiocarbon levels, such as "at least about 95% below natural radiocarbon levels" is based on assuming a current natural background level of radiocarbon of about one carbon-14 atom per every 750 billion total carbon atoms. For convenience, natural background levels of radiocarbon may also be expressed in units of percent modern carbon (pMC), where 100% of the current natural background radiocarbon level is equal to 100 pMC. Thus the expression "about 95% below natural radiocarbon levels" illustrates about a 95% reduction in radiocarbon concentration or level, which can be expressed alternatively as "about 5 pMC." The terms radiocarbon level and radiocarbon concentration are used interchangeably.

Reduced radiocarbon materials: For purposes of the present disclosure and claims, unless otherwise stated, when referring to materials having "reduced radiocarbon" levels it should be understood that such materials also include typical, normal or near-normal abundances of both of the stable isotopes of carbon, that is, a carbon-12 abundance of about 98.9%±1.0%, and a carbon-13 abundance of about 1.1%±1.0%.

Substantially: For purposes of the present invention, unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met.

Supplement: For purposes of the present invention, the term "supplement", including the combined terms "dietary supplement" and "nutritional supplement", as applied to the compounds, substances or compositions of the present invention means elements which are for supplementing the regular food intake of humans or mammals with additional nutritional elements or for supplementing or replacing at least a portion of nutritional elements within a food or nutritional product, and which are typically consumed to enhance the quality of life, to reduce the chance of genetic or cellular damage, or both. A nutritional or dietary supplement of the present invention may be pure single substances or mixtures of substances, particularly in combination with carriers other additives or foods that exhibit natural, natural abundance, background or natural background radiocarbon levels. However, a supplement suitable for use in the present invention cannot be contaminated with or include materials that would render such supplement unsuitable for consumption by humans or animals, as the case may be. The terms "dietary supplement" or "nutritional supplement" include a product intended to supplement the diet that bears or contains one or more of the following dietary ingredients: (A) a vitamin; (B) a mineral; (C) an herb or other botanical; (D) an amino acid; (E) a dietary substance for use by man to supplement the diet by increasing the total dietary intake; or (F) a concentrate, metabolite, constituent, extract, or combination of any ingredient described in (A), (B), (C), (D), or (E). Dietary or nutritional supplements are further include products that are for use with or in combination with a conventional food and may in some instances serve as a sole item of a meal or the diet. Supplements can be produced for ingestion in a variety of dosage forms including capsule, powder, softgel, gelcap, tablet, liquid, or, indeed, any other convenient form. For purposes of the present invention, the reduced radiocarbon content compounds, products and compositions described herein are included within the scope of this definition.

Therapeutically effective, or beneficial, amount: The amount of a therapeutically beneficial substance or mixture of substances, including specifically, at least one low radiocarbon DNA precursor, and/or low radiocarbon histone precursor, and, optionally a combination of such low radiocarbon compounds with at least one additional nutritional component, selected from the group consisting of vitamins, minerals, carbohydrates, vegetable oils, lipids, and the like, resulting in a nutritional supplement that provides a therapeutic benefit by reducing, over a period of time, the radiocarbon level in the cells, particularly within the chromosomes, of the individual taking the supplement. It should be understood by one of ordinary skill in the art that a therapeutically effective, or beneficial, amount can vary depending on the stage of life of the individual and the baseline level of radiocarbon in that individual, the particular individual and that individual's history and response to the supplement, the composition and concentration used, the types and amounts of ordinary food in the diet, and the discretion of the attending professional. The nutritional supplement is typically suitably administered to an individual over a period of time in a series of treatments. The supplement(s) may be administered in the forms described herein or in conjunction with other compositions that may be beneficial to the individual. Such an amount can be readily determined by a person of ordinary skill in the art, including nutritionists, pharmacists, medical professionals, veterinarians, etc.

Therapeutically beneficial: any material which by its action or presence, brings about a therapeutic result in an individual. Such materials include but are not limited to, for example, one or more of the following: low radiocarbon nucleotides, low radiocarbon histones and low radiocarbon amino acids, and nutritionally active agents such as vitamins and minerals. Such therapeutically beneficial substances may optionally be provided with a carrier.

Vitamin: The term "vitamin" or "vitamins" as used in the present disclosure and claims refers to any of the organic compounds commonly understood to be included in the nutritional group which includes vitamins and cofactors, including among others such common vitamins as Vitamin A, Vitamin C, Vitamin D, Vitamin E, Vitamin K, any of the B vitamins including thiamin or B1, riboflavin or B2, B6 or B12, niacin, folic acid, pantothenic acid, biotin, choline, and inositol. However, vitamin as used in the present disclosure and claims does not include any compounds which are within the definition of a DNA precursor or histone precursor according to the present disclosure.

For purposes of the present invention, supplements of the present invention include enantiomers, stereoisomers, rotamers, tautomers, racemates and nutritionally acceptable salts or solvates thereof, selected from the group consisting of: (A) DNA precursor compound selected from the group consisting of purines, pyrimidines, nucleosides, deoxynucleosides, nucleotides, deoxynucleotides, and derivatives and mixtures thereof; (B) amino acids and derivatives and mixtures thereof; and (C) mixtures of (A) and (B); the (A) component typically exhibiting a radiocarbon concentration or level that is at least about 10% lower, preferably at least about 25%, 50%, or 75% lower, for example about 50% to about 95% lower, more preferably at least about 90%, 96% or 98% lower, for example about 90% to about 98% lower, and most preferably at least about 96% to about 100% lower than the natural abundance concentration of carbon-14; and the (B) component typically exhibiting a radiocarbon concentration or level that is at least about 10% lower, preferably at least about 25%, 50%, or 75% lower, for example about 50% to about 95% lower, more preferably at least about 90%, 96% or 98% lower, for example about 90% to about 98% lower, and most preferably at least about 96% to about 100% lower than the natural radiocarbon abundance level, for example about 98% to about 99% lower than the natural abundance concentration of carbon-14. Furthermore, the terms "dietary" and "nutritional" are used interchangeably, for example, referring to a dietary supplement or a nutritional supplement.

Nucleotides and Other DNA Precursors

The structure and metabolism of nucleic acids is fairly well understood. The standard DNA and RNA nitrogenous bases are the purines (adenine and guanine) and pyrimidines (cytosine, thymine, only in DNA, and uracil, only in RNA). Other nitrogenous bases, such as xanthine, hypoxanthine, and orotic acid, are precursors of the standard DNA and RNA bases. Their structures are shown in Table 2.

TABLE 2

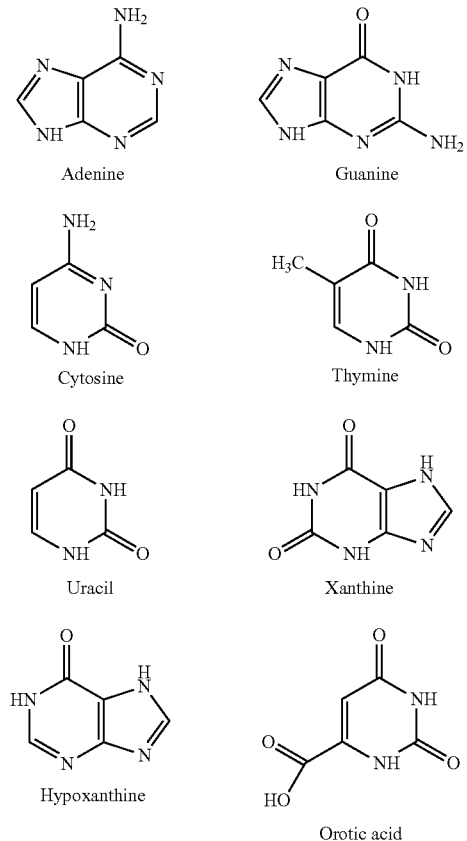

Some Purine and Pyrimidine Bases

Adenine, Guanine, Cytosine, Thymine, Uracil, Xanthine, Hypoxanthine, Orotic acid The standard DNA and RNA ribo- and deoxyribonucleosides (including adenosine, guanosine, cytidine, thymidine, uridine, and their deoxy analogs) consist of a purine or pyrimidine base attached to a ribo or deoxyribo sugar. Other ribo- and deoxyribonucleosides which are precursors of the standard DNA and RNA nucleosides include xanthosine, inosine, and orotidine and their deoxy analogs. The human body has enzymes that can readily convert these precursor nucleosides into the standard nucleosides.

Nucleotides are simply ribo- or deoxyribonucleosides with at least one and alternatively two or three phosphate groups attached to either the 3'- or 5'-hydroxyl groups of the sugar unit. Because nucleotides are acidic, they typically exist in the form of salts with sodium, potassium, or any other biologically compatible cations such as calcium, magnesium, iron, zinc, manganese, chromium, cobalt, copper, molybdenum, and zinc. A variety of enzymes in humans and most other mammals and vertebrates allow these various chemical forms (purine and pyrimidine bases, nucleosides, and nucleotides, and their ribo- and deoxyribo forms) to be interconverted as needed. The ultimate DNA precursors actually used by DNA polymerases during DNA replication and DNA repair, and the preferred embodiments of the present invention, as further explained below, include the deoxynucleoside 5'-triphosphates (dATP, dGTP, dCTP, and dTTP) as shown in the following generalized nucleoside/nucleotide structure.

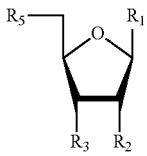

$R_1$ = purine or pyrimidine base
$R_2$ = H or OH
$R_3$ = OH, $PO_4$ (monophosphate), $P_2O_7$ (diphosphate), $P_3O_{10}$ (triphosphate), or other nucleotide (AMP, GMP, CMP, UMP, dAMP, dGMP, dCMP, dTMP)
$R_5$ = OH, $PO_4$ (monophosphate), $P_2O_7$ (diphosphate), $P_3O_{10}$ (triphosphate), or other nucleotide (AMP, GMP, CMP, UMP, dAMP, dGMP, dCMP, dTMP)

In the above structure, the abbreviations AMP, GMP, CMP, and UMP are for the 3'- or 5'-monophosphates of adenosine, guanosine, cytidine, and uridine, respectively. The abbreviations dAMP, dGMP, dCMP, dTMP are for the 3'- or 5'-monophosphates of deoxyadenosine, deoxyguanosine, deoxycytidine, and deoxythymidine, respectively. A specific example of a particular nucleotide fitting the general structure is 2'-deoxycytidine-5'-monophosphate (dCMP), where $R_1$=cytosine, $R_2$=H, $R_3$=OH, and $R_5$=$PO_4$ (monophosphate), as follows:

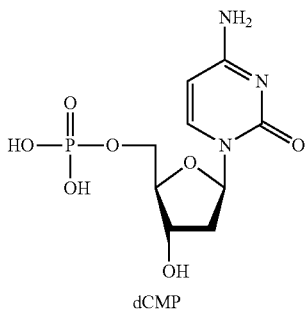 [SMILES: Nc1ccn([C@H]2C[C@@H](O)[C@@H](COP(=O)(O)O)O2)c(=O)n1]

dCMP

The present invention contemplates the use of at least one of the above nucleoside, nucleotide, or other DNA precursor compounds and their derivatives, individually and in mixtures or in the form of oligomers or polymers, in a low radiocarbon form as dietary supplements. Useful DNA precursor compounds include adenine, guanine, cytosine, thymine, uracil, hypoxanthine, xanthine, orotic acid, ribose, deoxyribose, adenosine, deoxyadenosine, guanosine, deoxyguanosine, cytidine, deoxycytidine, thymidine, deoxythymidine, uridine, deoxyuridine, inosine, deoxyinosine, xanthosine, deoxyxanthosine, orotidine, deoxyorotidine and mixtures thereof.

Amino acids and other histone protein precursors The structure and metabolism of amino acids is similarly well understood. Amino acids are readily available to the body from the breakdown of peptides and proteins during digestion. There are twenty primary amino acids used in the synthesis of proteins. The essential amino acids (tryptophan, lysine, threonine, valine, leucine, isoleucine; the interconvertible pairs of methionine/cysteine and phenylalanine/tyrosine) cannot be manufactured by humans and must be obtained in the diet, either from protein or as free amino acids. Two others, histidine and, according to some, arginine, are essential in children. The other non-essential amino acids can be manufactured in humans from fats and carbohydrates together with an appropriate nitrogen donor compound. Other mammals are known to have varying requirements for essential versus nonessential amino acids. Amino acids useful in the present invention are selected from the group consisting of alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, valine and mixtures thereof.

Dipeptides consist of two amino acids joined by a peptide bond. Some of these may be involved in the diet, including the artificial sweetener aspartame (L-alpha-aspartyl-L-phenylalanine methyl ester). The amino acid cysteine can also exist in a dimeric form known as cystine (two cysteine molecules joined by a disulfide linkage of their side chains). Cystine is used as a dietary supplement, and can be reduced enzymatically in the body to yield two cysteine molecules.

Another amino acid derivative, which is also a nucleoside derivative, is the dietary supplement S-adenosyl-methionine (SAMe), which can be broken down in the body to yield adenosine and homocysteine.

Amino acid derivatives useful in the present invention include amino acid derivatives in the form of at least one salt or adduct selected from the group consisting of sodium, potassium, calcium, magnesium, iron, zinc, manganese, chromium, cobalt, copper, molybdenum, zinc, chloride, hydrochloride, sulfate, carbonate, bicarbonate, phosphate, acetate, ascorbate, citrate, isocitrate, cis-aconitate, malate, maleate, succinate, fumarate, glutarate, alpha-ketoglutarate, oxaloacetate, pyruvate, pyroglutamate, tartrate, lactate, caseinate, gluconate, palmitate, stearate, picolinate and mixtures thereof. Amino acid derivatives in the form of an ester selected from the group consisting of methyl, ethyl, propyl and mixtures thereof are also useful in the present invention. Amino acid derivatives of this type include aspartame (L-alpha-aspartyl-L-phenylalanine methyl ester). Alternatively, an N-acetyl amide can be a useful amino acid derivative. Similarly useful are amino acid derivatives in a form selected from the group consisting of a dipeptide, tripeptide, oligopeptide, polypeptide and mixtures thereof.

In addition to the twenty primary amino acids involved in the synthesis of protein, there are other amino acids that are not incorporated into protein, at least in humans. These nonproteogenic amino acids play various other roles in metabolism, such as intermediate metabolites in the breakdown of other amino acids (such as ornithine, hydroxyproline, and hydroxylysine), and taurine (involved in forming bile salts).

Because of the critical role the twenty primary amino acids play in the formation of protein, which is essential to all life processes and is especially important during times of growth or disease, many types of amino acid dietary supplements are readily available. These can consist of individual amino acids (arginine, lysine, leucine and methionine are especially popular) as well as mixtures (including just essential amino acids, or all amino acids). They often are provided in the form of sodium or hydrochloride salts. Delivery forms, including those useful in the present invention, may include tablets, capsules, powder, or liquid.

The present invention contemplates the use of at least one of the abovementioned amino acids or other histone precursor compounds and their derivatives, individually and in mixtures or in the form of oligomers or polymers, in a low radiocarbon form as dietary supplements.

The present invention further contemplates the use of mixtures comprising (A) at least one DNA precursor compound selected from the group consisting of adenine, guanine, cytosine, thymine, uracil, hypoxanthine, xanthine, orotic acid, ribose, deoxyribose, adenosine, deoxyadenosine, guanosine, deoxyguanosine, cytidine, deoxycytidine, thymidine, deoxythymidine, uridine, deoxyuridine, inosine, deoxyinosine, xanthosine, deoxyxanthosine, orotidine, deoxyorotidine, and mixtures and derivatives thereof; and further comprising (B) at least one histone precursor selected from the group consisting of alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, valine, and mixtures and derivatives thereof. An example of such mixture comprises the four ribonucleoside 5'-monophosphates (AMP, CMP, GMP, UMP), or the four deoxyribonucleoside 5'-monophosphates (dAMP, dCMP, dGMP, dTMP), or mixtures thereof, and the nineteen amino acids found in histones (alanine, arginine, asparagine, aspartic acid, cysteine, glutamic acid, glutamine, glycine, histidine, isoleucine, leucine, lysine, methionine, phenylalanine, proline, serine, threonine, tyrosine, and valine). Another example comprises a mixture of the four ribonucleoside 5'-monophosphates (AMP, CMP, GMP, UMP), or the four deoxyribonucleoside 5'-monophosphates (dAMP, dCMP, dGMP, dTMP), or mixtures thereof, and all twenty primary amino acids found in proteins (alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine). Still another example comprises a mixture of the four deoxyribonucleoside 5'-monophosphates (dAMP, dCMP, dGMP, dTMP), the four ribonucleoside 5'-monophosphates (AMP, CMP, GMP, UMP), and all twenty primary amino acids found in proteins (alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine). Further examples of mixtures comprise the various permutations and combinations of one or more of each of the (A) components with one or more of each of the (B) components listed above.

Nutritional and dietary supplements and formulas which have one or more DNA or histone precursors that are low in radiocarbon as described herein, but which also contain at least one or more other nutritional components such as fats, lipids, fatty acids, carbohydrates, ingestible dietary organic compounds, vitamins, or pharmaceutically acceptable carriers, excipients or stabilizers, that are at higher radiocarbon content or at about natural abundance levels of radiocarbon, are especially useful in achieving a beneficial as well as cost effective reduction of genetic or cellular damage from radiocarbon. Such a supplement contains one or more of the typically more expensive low radiocarbon DNA or histone precursors to reduce radiocarbon incorporation into genetic material, while allowing use of other less expensive nutritional components with higher or natural background levels of radiocarbon for other nutritional purposes. For example, carbohydrates or fats which will primarily be utilized for energy or for cellular components other than DNA or histones can conveniently be provided in the form of a less expensive, natural abundance radiocarbon compound, composition or mixture.

In another embodiment of the invention there is provided a nutritional or dietary supplement suitable for human consumption comprising (1) a low radiocarbon component comprising at least one member selected from the group consisting of (A) a DNA precursor compound selected from the group consisting of purines, pyrimidines, nucleosides, deoxynucleosides, nucleotides, deoxynucleotides, and derivatives and mixtures thereof; (B) a histone precursor comprising at least one amino acid or derivative selected from the group consisting of Lys, Arg, Leu, Ala, Val, Ile, Thr, Glu, Tyr, and Pro; and (C) mixtures of (A) and (B); said low radiocarbon component member exhibiting a level of carbon-14 that is at least about 50% lower to about 100% lower; preferably about 60% lower to about 98% lower; more preferably about 75% lower to about 95% lower; and most preferably about 90% lower to about 100% lower than the natural abundance concentration of carbon-14; and (2) a higher radiocarbon content or natural background radiocarbon component comprising at least one member selected from the group consisting of fats, carbohydrates, vitamins, pharmaceutically acceptable carriers, excipients or stabilizers, and other organic compounds; said higher radiocarbon content or natural background radiocarbon component member exhibiting a level of carbon-14 that is at about the natural abundance concentration of carbon-14, or no more than about 10%, 20%, 30%, 40% or 50% lower than the natural abundance concentration of carbon-14.

In a still more preferable embodiment the mixture (1)(C) comprises at least four nucleotides or nucleosides (preferably, nucleotides or nucleosides comprising the nucleic acid bases adenine, cytosine, guanine, and either thymine or uracil) and also at least the amino acid lysine, and still more preferably further including one or more amino acid selected from the group consisting of Arg, Leu, Ala, Val, Ile, Thr, Glu, Tyr, and Pro. The above described nutritional or dietary supplements may be in the form of any conveniently ingestible foodstuff for an infant, child, teenager, young adult or adult, and especially useful as a component of infant formula or baby foods, or in other convenient physical forms as described elsewhere in this description.

The present invention further includes embodiments wherein at least some of the ingredients used to formulate the nutritional or dietary supplement include one or more DNA or histone precursors having about the natural background level of radiocarbon, provided there is an additional low radiocarbon component included comprising a sufficient amount of at least one low radiocarbon DNA or histone precursor such that the resulting final radiocarbon level for at least one DNA or histone precursor is at least about 50% lower to about 100% lower; preferably about 60% lower to about 98% lower; more preferably about 75% lower to about 95% lower; and most preferably about 90% lower to about 100% lower than the natural abundance concentration of carbon-14, and further, more preferably comprising at least four nucleotides or nucleosides (preferably, nucleotides or nucleosides comprising the nucleic acid bases adenine, cytosine, guanine, and either thymine or uracil) and the amino acid lysine such that the mixture exhibits a radiocarbon level at least about 50% lower to about 100% lower; preferably about 60% lower to about 98% lower; more preferably about 75% lower to about 95% lower; and most preferably about 90% lower to about 100% lower than the natural abundance concentration of carbon-14.

Furthermore, the present invention provides for embodiments in which at least one, but not necessarily all members selected from the group consisting of fats, carbohydrates, vitamins, and other compositions comprising organic compounds, particularly ingestible or dietary compounds, exhibit a level of carbon-14 that is at about the natural abundance concentration of carbon-14; alternatively, less than about 10%, 20%, 30%, 40% or 50% lower than the natural abundance concentration of carbon-14. That is, one or more fats, carbohydrates, vitamins, or other organic compounds may exhibit about 50% or more lower content than the natural abundance concentration of carbon-14, provided there is also at least one or more fats, carbohydrates, vitamins, or other organic compounds that is at about the natural abundance concentration of carbon-14, or no more than about 10%, 20%, 30%, 40% or 50% lower than the natural abundance concentration of carbon-14. A particularly preferred embodiment of the present invention provides a dietary or nutritional supplement that is a mixture of ingestible elements, including fats, carbohydrates, vitamins, or other organic compounds, that exhibit natural abundance concentrations of carbon-14, as well as ingestible elements, including fats, carbohydrates, vitamins, or other organic compounds, that exhibit at least about 50% to 100% lower than the natural abundance concentration of carbon-14; in other words, at least one or more of these non-DNA/histone precursor components contains relatively high or near natural abundance levels of radiocarbon or carbon-14. In other words, a particularly preferred embodiment of the present invention is directed to dietary or nutritional supplements, formulations or compositions comprising a mixture of elements selected from the group consisting of fats, carbohydrates, vitamins, and other ingestible or dietary organic compounds or compositions, some of which exhibit natural abundance (or substantially natural abundance) concentrations of carbon-14 and some of which can exhibit at least about 50% lower to about 100% lower; preferably about 60% lower to about 98% lower; more preferably about 75% lower to about 95% lower; and most preferably about 90% lower to about 100% lower than natural abundance concentrations of carbon-14. Such mixtures can usefully be combined with at least one DNA or histone precursor component which exhibits lower than the natural abundance concentration of carbon-14 as described herein.

Carbon-14 and Genetic Damage

Even in the absence of all other chemical and/or environmental causes of mutations, it is estimated that the average adult human will still experience about 149 billion genetic mutations over the course of a normal 77-year lifetime due to the radioactive decay of carbon-14 naturally found in their deoxyribonucleic acid (DNA). In addition, there will be another 213 billion carbon-14 atoms decaying within the histone proteins around which chromosomal DNA is tightly wrapped. Histones play a critical role in the processes of DNA folding, replication and transcription, so any alteration in their structure can potentially cause mutations or otherwise disrupt vital genetic processes. It is naturally expected that similarly high levels of radioactive decay in DNA and histones will be experienced by other vertebrates and as well. Such DNA and histone damage, if not accurately or fully repaired, may ultimately lead to cancer and premature aging. Individuals suffering from genetically-linked conditions associated with DNA repair defects, such as some forms of xeroderma pigmentosum (a condition characterized by a sensitivity to all sources of ultraviolet radiation and early onset of skin cancers; believed to be caused by a defect in the ultraviolet (UV) mutation repair system) and trichothiodystrophy (a condition characterized by sparse and brittle hair having an unusually low sulfur content, short stature, and varying degrees of mental retardation) may be particularly affected by DNA damage. The occurrence of some maternal age-related birth defects or stillbirths might also be the result of carbon-14 decay in the chromosomes of primary oocytes of females.

In one aspect, the present invention is directed to dietary or nutritional supplements containing low radiocarbon DNA precursors and amino acids that can be used in combination with an otherwise normal diet (i.e., an ordinary diet consisting of normal food and other nutrients containing natural background levels of radiocarbon) in order to preferentially reduce the number of radioactive carbon-14 atoms incorporated into the DNA and histones of vertebrates, especially mammals, and particularly humans, provided with such supplements. Use of such low radiocarbon supplements may also prove advantageous to individuals suffering from certain disorders or diseases related to DNA repair.

In another aspect of the invention there is provided a method to significantly lower radiocarbon-induced DNA mutation rates by selectively diluting the radiocarbon levels of DNA precursor compounds and/or amino acids through use of dietary supplements, without requiring the entire diet to be low in radiocarbon. The supplements of the present invention can also suitably be used for fish, birds as well as food animals (e.g., cattle, goats, pigs, etc.) in order to develop improved food sources exhibiting lower radiocarbon levels as well as fewer genetic and/or cellular defects or mutations.

A further aspect of the present invention is directed to the capture and use of $CO_2$ effluents from industrial combustion of fossil fuels and its conversion into low radiocarbon supplements, thus aiding in the reduction of greenhouse gas emissions.

As will be described, radiocarbon content of the supplements of the present invention are typically at least about 10% below or about 25% below that of corresponding compounds having normal radiocarbon background levels; preferably about 50% to about 75% to about 95% below; more preferably about 90% to about 96% to about 98% below. In particular, the DNA precursor supplements are still more preferably at least about 98% or more, for example, as much as about 99% or about 100% below the normal radiocarbon background levels. While such reductions may not bring the radiocarbon content to zero, the preferable levels provide a significant benefit. Furthermore, suitable supplements can be readily prepared by the present methods using a widely available industrial by-product, $CO_2$ emissions.

Carbon-14 and DNA

Even if all outside mutagenic influences from environmental causes such as chemicals or radiation are eliminated, the presence of naturally occurring radioactive carbon-14 (referred to in the present disclosure as radiocarbon, or carbon-14) in human genetic material, particularly in DNA and histone proteins, inevitably results in a significant number of genetic mutations and chromosomal damage events, which can be calculated as follows. The average adult human has approximately 100 trillion cells [Lehninger Principles of Biochemistry, p. 914], each with approximately 6 billion chromosomal DNA base pairs, or billion total DNA bases per cell (Human Genome Project published sequences, www.genome.gov, 2003). Each DNA base has an average of 9.75 carbon atoms (adenosine, guanosine, and thymidine each have 10 carbons, while cytidine has 9). Thus there are 117 billion carbon atoms in the DNA in every single cell nucleus, and $1.17 \times 10^{25}$ carbon atoms contained in the nuclear DNA of all the cells of the body. Approximately one in 750 billion ($1.33 \times 10^{-12}$) naturally occurring carbon atoms is a carbon-14 atom, so there are $1.56 \times 10^{13}$ carbon-14 atoms in the entire body. Roughly 1 in 6 cells (15.6%) has one carbon-14 atom in its chromosomal DNA. Since carbon-14 has a half-life of 5730 years, the number (N) that will decay during any time period (t) can be calculated using the standard equation for radioactive decay:

$$N = N_0 * e^{-\lambda t} \quad (1)$$

where:
$N_0$=initial number of carbon-14 atoms ($1.56 \times 10^{13}$)
$\lambda = 0.693/T1/2$
$T1/2$=carbon-14 half-life=5730 years (or 2,092,840 days)
T=time period (expressed in same units as T1/2)

Applying this equation, it can be shown that every second, the average adult experiences mutations in 60 cells due to carbon-14 decay within their chromosomal DNA. This adds up to 5.2 million mutations per day and 1.9 billion per year. Since the average U.S. life expectancy is currently 77.2 years (CDC, Center for Disease Control), nearly 145 billion cells will have sustained a mutation from carbon-14 over the course of an average lifetime. 145 billion mutated cells (out of 100 trillion total) corresponds to one of every 690 human cells being affected (0.14%), or roughly one cell in every 3-dimensional array of 9×9×9 cells. This means that in an average human lifetime every cell in the body will, on average, be within a distance of 3.4 cells from a cell having a mutation due to carbon-14 in its chromosomal DNA.

The preceding calculation, and other similar ones in the present disclosure that depend on the total number of cells in the average human body, are based on an estimate of 100 trillion nucleated cells. Other estimates (Freitas, 1999) indicate that a range of 10 trillion to 100 trillion human cells may be more accurate. Obviously the number of cells in individual humans may further vary considerably. As the calculations can be adjusted in a straightforward manner in view of the descriptions in this disclosure, an adjustment based on a range of 10 to 100 trillion human cells will necessarily result in a range of values rather than a single value. For example, adjusting the abovementioned 145 billion mutated cells out of 100 trillion total cells results in a range of 14.5 billion (based on 10 trillion total cells) to 145 billion mutated cells (based on 100 trillion total cells). Likewise, the calculations described herein can be adjusted by proportionate amounts if other estimated values or factors are changed, for example, if a different life expectancy than 77.2 years is used, or if a 10%-11% reduction in overall life expectancy is factored in to account for fewer total cells during the growing years. Overall, even with such adjustments, the underlying premises and substance of the invention disclosed herein remain unchanged.

Mitochondrial DNA (mtDNA) is also present in every human cell, and likewise will contain a proportionate amount of carbon-14. Since each human mitochondrial DNA molecule is about 16,500 base pairs (bp) long, and there are about 5000 mitochondria per cell, there are about 82.5 million by (or 165 million bases) total of mtDNA in each human cell. Thus the total amount of mtDNA is only about 1/70 (1.4%) of the total DNA per cell. Consequently there are only $1/70^{th}$ the number of carbon-14 related mutations in mtDNA as compared to chromosomal DNA. However, this still corresponds to nearly 1 mtDNA mutation per second in the average adult human, and 2 billion mtDNA mutations over a 77-year lifespan.

As discussed above, it is significant that each carbon-14 decay event in the DNA may cause mutations by multiple mechanisms—the transmutation of carbon-14 to nitrogen-14, the loss of that nitrogen-14 from recoil due to the beta particle emission, and the subsequent secondary chemically induced mutations from as many as 4000 ion pairs formed due to the energy from the 156,500 eV beta particle.

Human beings (as well as other vertebrates and mammals) have complex systems for different types of DNA repair (Wood, 2001; Sancar, 2005), and while not all mutations are equally damaging, not all can be as successfully detected or repaired. For example, some mutations, such as thymine dimerization induced by overexposure to UV radiation, or the oxidation of a nucleic acid base by an oxidant, may involve no loss of sequence information, and can conceivably be repaired with 100% efficiency. Likewise, mutations that remove a single DNA base can also potentially be repaired with 100% efficiency using the "backup" information from the complementary base on the opposite DNA strand. However, more severe mutations, such as those induced by radio-carbon decay within the DNA base itself, which might convert one DNA base into another base, or which may cause one base to become a reactive species which can then react with its adjacent complementary base, or which can cause double-strand breaks, are much more likely to be either unrepairable or else prone to erroneous repair. Unrepaired mutations or error prone repair, if in critical locations of the genome and/or in great enough quantities, may seriously impact cell function, which in turn may affect adjacent cells and the tissues they comprise. Defects in DNA repair have been associated with cancer, aging, and stem cell defects (Park, 2005). As the number of mutations increases over time, the number of damaged cells that escape repair will also tend to increase, heightening the risk of "spontaneous" uncontrolled cell growth or cancer. As damaged cells accumulate throughout the body, especially those with more critical functions, such as nerve, glandular, and stem cells, the overall aging of the organism may also be detrimentally affected or accelerated. Because mtDNA repair mechanisms are more limited than those for chromosomal DNA, even though only 1.4% of all DNA mutations occur in mtDNA, such mtDNA mutations may have a disproportionate influence on overall cell and tissue health, and may be the source of the spontaneous occurrence of some mitochondrial disorders.

Carbon-14 and Histone Proteins

In addition to DNA, the chromatin material of chromosomes also contains histone proteins around which the DNA is tightly packed. These histone proteins are strongly basic (due to excess lysine and arginine residues) and thus neutralize the DNA's acidity (due to linking phosphate groups). If the entire DNA in a single microscopic human cell were stretched out linearly, it would be almost 2 meters (6 feet) long. Histones allow this large amount of DNA to be highly coiled and compacted to fit within a 10 μm cell nucleus (less than $1/500,000^{th}$ its fully extended length). This highly coiled and compacted DNA can still be accurately replicated and transcribed as needed. Although the precise structure of chromatin varies according to the type of tissue, the position within the chromosome, and point of time within the cell cycle, on average every 200 base pairs of DNA is associated with a histone nucleosome core particle consisting of two molecules each of histones H2A, H2B, H3, and H4, along with a single histone H1 linker. Through extremely complex enzymatically controlled processes involving the methylation and acetylation of specific basic histone residues, the cell is able to unwind and open up the correct sections of DNA precisely when needed for replication or for transcribing genes into messenger RNA. So not only are histones required for ultra compact DNA storage, they also are integrally involved in DNA processing.

A carbon-14 decay that occurs within the histone protein portion of chromatin may not necessarily cause a DNA mutation. However, since the DNA is in such close proximity to the histone protein, there is a significant chance that the beta particle emitted during carbon-14 decay in a histone protein could directly strike the DNA. Another possible cause of mutation is that the chemically modified amino acid residue (after the transmutation of carbon-14 to nitrogen-14) in the histone protein itself is likely to be highly reactive, or to generate reactive free radicals species nearby. Because of the close proximity to the DNA, the chances of these reactive chemical species interacting with a DNA base and causing a mutation are significant. But even without actually damaging the DNA directly, a carbon-14 damaged histone protein itself may fold differently, or become cross-linked to itself or to an adjacent protein, or have a key residue modified. Any of these or other possible scenarios that cause structural alteration of a histone protein could result in abnormal cellular behavior, either by preventing unfolding of the DNA when required, or else causing the unfolding to occur when it should not, or via some other, as yet undefined, mechanism. It is unlikely that the cell has any methods of recognizing and repairing damaged histone molecules, since there is no direct template involved as is the case with DNA, so such damage would likely persist until the cell dies.

The four DNA bases (adenine (A), cytosine (C), guanine (G) and thymine (T)) are not present in equal relative amounts in the human genome. There are numerous GC-rich and GC-poor regions scattered throughout the chromosomes, having a genome-wide average GC content of 41%, and an average AT content of 59%. The relative overall base content in human DNA is thus about 20.5% each for guanine and cytosine, and 29.9% each for adenine and thymine. The methods of the present invention for reducing carbon-14 content within DNA take into account this human DNA base compositional distribution, and preferably provide nutritional supplements comprising larger amounts of DNA precursors directed to adenine and thymine bases than to precursors directed to guanine and cytosine. However, various relative amounts of nucleotide supplements, even if non-optimal, can still provide useful benefits, including an equimolar mixture of all four primary nucleotides and precursors and derivatives of such compounds.

The amount of carbon-14 damage to histone proteins can be calculated as follows. The amino acid composition of the typical human histones is shown in the following table, Table 3:

TABLE 3

Amino Acid Composition of Histone Proteins

| Amino acid | | H1 | H2A | H2B | H3 | H4 |
|---|---|---|---|---|---|---|
| Lysine (Lys) | (K) | 57 | 13 | 20 | 13 | 11 |
| Arginine (Arg) | (R) | 4 | 13 | 8 | 18 | 14 |
| Leucine (Leu) | (L) | 10 | 16 | 6 | 12 | 8 |
| Alanine (Ala) | (A) | 42 | 16 | 13 | 18 | 7 |
| Valine (Val) | (V) | 14 | 8 | 9 | 6 | 9 |
| Isoleucine (Ile) | (I) | 3 | 6 | 6 | 7 | 6 |
| Threonine (Thr) | (T) | 14 | 5 | 8 | 10 | 7 |
| Glutamic Acid (Glu) | (E) | 6 | 7 | 7 | 7 | 4 |
| Tyrosine (Tyr) | (Y) | 1 | 3 | 5 | 3 | 4 |
| Proline (Pro) | (P) | 19 | 5 | 6 | 6 | 1 |
| Serine (Ser) | (S) | 23 | 5 | 14 | 5 | 2 |
| Glycine (Gly) | (G) | 13 | 14 | 7 | 7 | 17 |
| Glutamine (Gln) | (Q) | 2 | 5 | 3 | 8 | 2 |
| Phenylanine (Phe) | (F) | 1 | 1 | 2 | 4 | 2 |
| Histidine (His) | (H) | 0 | 4 | 3 | 2 | 2 |
| Asparagine (Asn) | (N) | 4 | 6 | 3 | 1 | 2 |
| Aspartate (Asp) | (D) | 1 | 2 | 3 | 4 | 3 |
| Methionine (Met) | (M) | 0 | 0 | 2 | 2 | 1 |
| Cysteine (Cys) | (C) | 0 | 0 | 0 | 2 | 0 |
| Tryptophan (Trp) | (W) | 0 | 0 | 0 | 0 | 0 |
| TOTAL Amino Acids | | 214 | 129 | 125 | 135 | 102 |

Using the numbers of amino acid residues from this table, the total number of each type of amino acid contained in the typical nucleosome/histone linker that wraps every 200 base pairs of DNA can be found. Taking into account the differing number of carbon atoms contained in each amino acid, and the relative numbers of each histone protein, it can be determined how many carbon atoms are contributed to chromatin by each type of amino acid. The following table shows the relative carbon atom contribution from each amino acid, ordered in descending order of carbon atoms concentrations (% carbons):

TABLE 4

Relative Overall Contribution of Carbon to Human Chromatin, by Amino Acid, per 200 DNA Base Pairs

| Amino acid | | Total Each Amino Acid [H1 + 2 (H2A, H2B, H3, H4)] | % Residues | Carbons per Amino Acid | Total No. Carbons | % Carbons | Cumulative % Carbons |
|---|---|---|---|---|---|---|---|
| Lys* | (K) | 171 | 14.3% | 6 | 1026 | 17.9% | 17.9% |
| Arg | (R) | 110 | 9.2% | 6 | 660 | 11.5% | 29.4% |
| Leu* | (L) | 94 | 7.9% | 6 | 564 | 9.8% | 39.2% |
| Ala | (A) | 150 | 12.5% | 3 | 450 | 7.8% | 47.1% |
| Val* | (V) | 78 | 6.5% | 5 | 390 | 6.8% | 53.9% |
| Ile* | (I) | 53 | 4.4% | 6 | 318 | 5.5% | 59.4% |
| Thr* | (T) | 74 | 6.2% | 4 | 296 | 5.2% | 64.6% |
| Glu | (E) | 56 | 4.7% | 5 | 280 | 4.9% | 69.5% |
| Tyr** | (Y) | 31 | 2.6% | 9 | 279 | 4.9% | 74.3% |
| Pro | (P) | 55 | 4.6% | 5 | 275 | 4.8% | 79.1% |
| Ser | (S) | 75 | 6.3% | 3 | 225 | 3.9% | 83.0% |
| Gly | (G) | 103 | 8.6% | 2 | 206 | 3.6% | 86.6% |
| Gln | (Q) | 38 | 3.2% | 5 | 190 | 3.3% | 89.9% |
| Phe** | (F) | 19 | 1.6% | 9 | 171 | 3.0% | 92.9% |
| His* | (H) | 22 | 1.8% | 6 | 132 | 2.3% | 95.2% |
| Asn | (N) | 28 | 2.3% | 4 | 112 | 2.0% | 97.2% |
| Asp | (D) | 25 | 2.1% | 4 | 100 | 1.7% | 98.9% |
| Met** | (M) | 10 | 0.8% | 5 | 50 | 0.9% | 99.8% |
| Cys** | (C) | 4 | 0.3% | 3 | 12 | 0.2% | 100.0% |
| Trp* | (W) | 0 | 0.0% | 11 | 0 | 0.0% | 100.0% |
| TOTAL | | 1196 Amino Acids | | | 5736 Carbon Atoms | | |

*Essential amino acid
**Essential but interconvertible (Phe/Tyr, Met/Cys)

From Table 4 it can be seen that the nine histone protein molecules (one 'linker' H1 histone, and two each of the H2A, H2B, H3, and H4 nucleosome histones) that are typically associated with every 200 or so DNA base pairs contain 5736 carbon atoms. The 200 DNA base pairs (or 400 bases) contain an average of 9.75 carbons per base, or 3900 total carbons. Thus there is a greater contribution of chromatin carbon atoms from histone proteins than from DNA, by a ratio of 5736/3900, or 1.47:1. This also means that there are 1.47 times as many radioactive carbon-14 atoms present in the histone portion of chromatin as compared to that in the DNA portion. It is thus possible to calculate that each second there are 88 carbon-14 atoms decaying within histone proteins in the chromosomes, 7.6 million per day, and 2.79 billion per year, and 213 billion over an average lifetime.

Although there are twenty different amino acids used in making proteins, they do not all contain the same number of carbon atoms, nor are they equally represented in histones. In fact, the amino acid composition of histones differs considerably from that of the average non-histone proteins in the body. Based on the information shown in Table 4, lysine and arginine are the most significant of the twenty amino acids in histones, in the sense that they contribute 17.9% and 11.5%, respectively, of the overall number of carbon atoms to the histones making up the chromatin. This is nearly twice the average level of lysine and arginine in non-histone proteins. The top five amino acids alone (Lys, Arg, Leu, Ala, Val) contribute 53.9% of the carbons in the histones. The top ten amino acids contribute 79.1% of the carbons, while the bottom ten only contribute 20.9%. Tryptophan is not present at all in histones, and Met and Cys together contribute only 1.1% of the carbons. The methods of the present invention for reducing carbon-14 content within histone proteins preferably takes into account this amino acid compositional distribution, and preferably focuses on providing as low radiocarbon supplements the amino acids that contribute the largest number of carbon atoms. For example, a low radiocarbon supplement of the present invention containing just the four most prevalent amino acids in histones—Lys (40%), Arg (25%), Leu(20%), and Ala (15%), by molar concentration—can provide nearly 50% of the maximum reduction possible using all the amino acids. Various factors, including cost of production, chemical instability, the individual subject's sensitivity or adverse reaction to specific amino acids, changes in the subject's metabolism in different stages of life, or differential absorption or cellular uptake, suggest other various permutations of the relative or absolute amounts of amino acids to be used in order to achieve suitable histone radiocarbon reductions. However, various relative amounts of amino acids, including roughly equal amounts of all twenty amino acids, or in the same relative amounts as present in normal foods, can be provided and are suitable. For example, using Table 4, useful compositions can employ at least one and preferably at least two, three, four, etc., up to all nineteen of the amino acids present in histones, alternatively including Trp, and furthermore in relative molar amounts substantially equal to the relative amounts ("% Residues") shown in Table 4. Alternatively, the amino acids can be present in the supplement in relative molar amounts that are ±25%; or ±10% of the "% Residues" amounts shown. Typically, a histone-targeted supplement of the present invention includes at least: Lys and Arg; more preferably, Lys, Arg, Leu, Ala, and Val; still more preferably, the first ten amino acids listed in Table 4 and in each instance in relative amounts substantially as shown in Table 4.

Other preferred embodiments of the present invention include low radiocarbon compositions with higher concentrations of those particular amino acids which contribute the most carbons to histones. One such preferred embodiment is a low radiocarbon composition comprising the low radiocarbon amino acid, or amino acid derivative, carbon atoms contributed by Lys and at least one of the amino acids selected from the group consisting of Arg, Leu, Ala, Val, Ile, Thr, Glu, Tyr, Pro, Ser, Gly, and Gln; preferably selected from the group consisting of Arg, Leu, Ala, Val, Ile, Thr, and Glu. Another preferred embodiment further includes low radiocarbon DNA precursors selected from the group consisting of purines, pyrimidines, nucleosides, deoxynucleosides, nucleotides, deoxynucleotides, and derivatives and mixtures thereof; still more preferably including all four DNA nucleotides, specifically deoxyadenosine 5'-phosphate (dAMP), deoxyguanosine 5'-phosphate (dGMP), deoxycytidine 5'-phosphate (dCMP) and deoxythymidine 5'-phosphate (dTMP); all four in combination sometimes identified as dNMP. Still another preferred embodiment is a low radiocarbon composition comprising about 50% or more, and more preferably about 70% or more, and more preferably about 90% or more, of the low radiocarbon amino acid, or amino acid derivative, carbon atoms contributed by Lys and at least one of the amino acids selected from the group consisting of Arg, Leu, Ala, Val, Ile, Thr, Glu, Tyr, Pro, Ser, Gly, and Gln; and more preferably also including low radiocarbon DNA precursors of all four DNA nucleotides as described above. Yet another preferred embodiment is a low radiocarbon composition comprising the low radiocarbon amino acid carbon atoms contributed or present in about the percentages shown in the following Table 4A and derived from Table 4, including additional useful ranges also shown, and more preferably further including low radiocarbon DNA precursors of all four DNA nucleotides as described above.

TABLE 4A

| Amino Acid<br>3 Letter Code (name) | Preferred<br>Amount, % | Useful<br>Range, % |
| --- | --- | --- |
| Lys (lysine) | 17.90 | 12-24 |
| Arg (arginine) | 11.50 | 7-16 |
| Leu (leucine) | 9.80 | 5-14 |
| Ala (alanine) | 7.80 | 3-11 |
| Val (valine) | 6.80 | 3-10 |
| Ile (isoleucine) | 5.50 | 3-9 |
| Thr (threonine) | 5.20 | 2-8 |
| Glu (glutamic acid) | 4.90 | 2-8 |
| Tyr (tyrosine) | 4.90 | 2-8 |
| Pro (proline) | 4.80 | 2-8 |
| Ser (serine) | 3.90 | 1-7 |
| Gly (glycine) | 3.60 | 0-7 |
| Gln (glutamine) | 3.30 | 0-6 |
| Phe (phenylalanine) | 3.00 | 0-6 |
| His (histidine) | 2.30 | 0-5 |
| Asn (asparagine) | 2.00 | 0-4 |
| Asp (aspartic acid) | 1.70 | 0-3 |

Although the above estimates of the relative amounts of each amino acid and nucleotide to obtain significant overall reduction of radiocarbon in histones and DNA are useful, issues of differential stability, absorption, and metabolism of these individual chemical species in the body are to be expected. Complicating factors may also include the age, growth stage, and/or the user, for example, pregnant women, infants, toddlers, pre-teen children, or other specific age group, as well as the types and amounts of other foods with normal levels of radiocarbon that are also included in the diet. For any particular individual or group of subjects and type of diet, one skilled in the art can arrive at alternative preferred or suitable relative amounts of individual amino acids and nucleotides for these low radiocarbon nutritional supplements, as well as the minimum absolute amounts needed for any particular degree of radiocarbon reduction of chromosomal material. This can be accomplished using the present disclosure and, for example, tests including accelerator mass spectrometry or other measurements of radiocarbon levels in protein, histones, DNA, as well as individual types of amino acids and nucleotides obtained from hair, saliva, or other tissue samples or cell fractions from volunteer subjects or appropriate model animals. For example, one such suitable method can compare the amounts of each low radiocarbon component ingested, such as Lys or adenosine, with the radiocarbon levels subsequently obtained for Lys or adenosine in protein or histones or DNA extracted from the test subject, and calculate or conduct recursive experiments to arrive at preferred amounts of the component in the supplement for the desired level of radiocarbon reduction.

Overall Effect of Carbon-14 on the Cell

Adding the number of DNA mutations previously calculated together with the number of carbon-14 decays in histones results in a total number of carbon-14 damage events to the chromosomes and mtDNA: 149 every second, 12.9 million per day, and 360 billion over the average 77.2 year lifetime. This corresponds to one of every 278 human cells (0.36%) being affected in an average lifetime, or roughly one cell in every 3-dimensional array of 6.53×6.53×6.53 cells. This means that in a typical human lifetime every cell in the body will on average be within a distance of about 2.2 cells from a cell having DNA or histone damage from carbon-14 decay.

For every carbon atom in the body's DNA and histones, there are approximately 60 other carbon atoms in all the rest of the body's molecules: sugars, fats, steroids, enzymes, RNA, all other non-histone proteins, and various other organic molecules. Thus there are also 60 times as many carbon-14 decays occurring in all these other compounds in the body. However, carbon-14 decay occurring in these non-chromosomal molecules will tend to damage only one molecule out of hundreds or thousands of identical copies within the cell, so that the effect of such damage will be limited. This damage thus has little direct consequence on the overall operation of the cell, and will not affect the cell's ability to make additional replacement copies of that compound. Additionally, these carbon-14 decay events in other types of compounds are still rather infrequent, occurring on average just one time in only one out of every five cells during an average 77 year human lifetime.

More importantly, DNA or histone damage from carbon-14 decay is likely to have a large "cascade" effect that continues over time, since it can potentially cause significant changes to the functioning and replication of the cell. Carbon-14 decay in the body that occurs outside of the DNA or histones, and especially in the bulk of the molecules outside of the nucleus, is thus unlikely to be a significant health concern. Consequently, it is more significant that the precursors and specifically focused compounds and compositions of the present invention are employed in order to minimize mutations, chromosomal damage, and their subsequent effects. It is significantly less important to lower the carbon-14 levels in compounds other than DNA and histone proteins.

The above disclosure has focused on overall carbon-14 damage accumulating in somatic cells in the human body over time, which may increase the risk of cancer and/or may contribute to overall aging. However, there is another aspect of carbon-14 chromosomal damage that can be considered—damage to reproductive (germ) cells, and in particular to the maternal germ cells, the oocytes. Damage occurring to a somatic cell may occur in a portion of the chromosome that is not used, or the cell that is damaged may not critically impact the tissue or organism, or the damaged cell may die. But damage to a germ cell is far more likely to be significant to the individual that develops from it, since any genetic damage in that initial cell will be duplicated in every cell of the individual as it develops. It is far more likely that damage to any part of a germ cell will affect the operation of some type of tissue in the developing individual, or may perturb the development process itself (perhaps even affecting chromosomal separation, as in the congenital disorder trisomy 21 or Down syndrome). Even if the individual is not directly affected itself with a birth defect or stillbirth, it may result in creation of a new recessive mutation that could be passed down to a subsequent generation.

In a human, a woman's reproductive cells, the primary oocytes, are formed during the fourth or fifth month of fetal development, and unlike any other cells in the body, remain static in the portion of the cell cycle with the chromosomes duplicated but not yet separated. These cells are thus 'tetraploid' or 4n, and have roughly twice as much DNA and histones as ordinary somatic cells (and thus are subject to twice the rate of damage due to carbon-14 decay). These primary oocytes remain in this 4n state until one is selected for further development to an egg cell during ovulation. Thus, when, e.g., a 30-year old woman becomes pregnant, it is one of her 30.5 year old egg cells that is involved.

It is possible to calculate, based on the mother's age, the percentage of babies born each year that have developed from an egg cell having carbon-14 damaged chromosomal DNA or histones. These data are shown in the following table, Table 5:

TABLE 5

Maternal Age Related Carbon-14 Damage

| Maternal Age | Babies born from egg cell with a C-14 damaged chromosome pct | 1 birth per | US Births (4,000,000 total) | Worldwide (120,000,000 total) |
|---|---|---|---|---|
| 18 | 0.042% | 2387 | | |
| 20 | 0.047% | 2148 | | |
| 25 | 0.058% | 1719 | 2,327 | 69,797 |
| 27 | 0.063% | 1592 | 2,512 | 75,371 |
| 30 | 0.070% | 1433 | 2,791 | 83,731 |
| 40 | 0.093% | 1076 | | |
| 50 | 0.116% | 861 | | |

This table shows that a 40-year-old mother has a 0.093% chance (1 in 1076) of having her child born from an egg cell with carbon-14 related chromosomal damage, twice that of a 20-year-old mother. The average maternal age at childbirth varies among different demographic groups, but is usually between 25-30 years in the United States. If the average maternal age at childbirth is assumed to be 27 years, then each year approximately 2,512 U.S. births (and 75,371 worldwide) involve a child that developed from an egg cell having carbon-14 damage.

Since each egg cell involved in a pregnancy developed from a tetraploid (4n) primary oocyte, there is an additional possibility of indirect damage from carbon-14 decay in the three other sets of chromosomes that later will segregate into the secondary oocytes. Even though these secondary oocytes are ultimately discarded, for many years their chromosomes are in extremely close proximity to the chromosomes ultimately incorporated in the egg cell. If a carbon-14 decay occurs in one of these nearby chromosomes destined for secondary oocytes, there is a significant chance that some of the 4000 or more ion pairs produced by the emitted beta particle can result in damage to the chromosomes incorporated in the egg cell. Again, if the average maternal age at childbirth is assumed to be 27 years, then each year approximately 10,000 U.S. births (and 300,000 births worldwide) involve a child that developed from a primary oocyte having carbon-14 chromosomal damage. Of these, one-fourth involve direct damage to the chromosomes incorporated in the egg cell, and three-fourths involve possible indirect damage to the egg cell chromosomes due to secondary effects of radiocarbon decay in secondary oocyte chromosomes.

Although this calculated carbon-14 related risk is not large enough to account for all age-related birth defects, in particular Down syndrome, it can be seen carbon-14 damage occurring to the primary oocyte can still be a significant contributing factor to many birth defects or stillbirths attributed to unknown causes.

Reduction of Radiocarbon Levels in DNA and Histone Proteins

The present invention provides a cost-effective and practical alternative for reducing genetic damage to vertebrates and mammals, and specifically to humans, from carbon-14. This can be achieved by means of a modest and suitable reduction in the overall radiocarbon levels in the chromosomes, i.e., the chromatin material, comprising DNA and various histone proteins. This delivers a significant benefit in a focused or targeted manner in terms of reducing the overall number of mutations and chromosomal damage.

The new methods described here can accomplish a specific reduction in the carbon-14 levels of mammalian, specifically human, DNA, and similarly in the histone proteins. One aspect of the invention is a consequence of the fact that most of the carbon ingested in a typical diet does not end up in the DNA or histones. The average adult with 100 trillion cells contains only about 240 g, or 8.5 oz of carbon within their DNA—only about 1-2% of the total carbon in their body. It is not necessary to eliminate radiocarbon from all the organic material in the diet, especially the approximately 98-99% that will not end up in DNA, provided that by following the teachings of the present invention, the level of radiocarbon can be selectively and preferably reduced in those types of carbon compounds that are likely to be incorporated into DNA. Reducing carbon-14 in histone proteins containing about 360 g of carbon, is also feasible, although it is less selective compared to the DNA, since the same amino acid precursors used for making histones are also the precursors for all other proteins in the body. Still, a reduction can be achieved and can be beneficial for the reasons explained above. Furthermore, selective amino acid precursor supplements also can be employed as described.

The use of DNA and histone precursor supplementation for various nutritional and/or medicinal purposes typically involves supplementation with nucleosides or nucleotides or specific amino acids, desirably in combination with milk, infant formula, suitable liquids or in other convenient ingestible forms. The method of the present invention provides DNA precursor and/or amino acid supplementation having reduced concentrations of harmful carbon-14. A normal, low cost, diet of ordinary food containing natural background levels of carbon-14 may be used to provide the bulk of a person's or animal's nutritional needs, provided that such a diet is carefully supplemented with an effective amount of suitable DNA precursors and/or amino acids containing lower than normal levels of carbon-14 as taught herein. This supplementation has the effect of isotopically diluting the radiocarbon levels of DNA precursor pools within the body. The present method will be significantly less costly and far less restrictive than an alternative requiring all food in the diet to be low in radiocarbon, yet it permits a major reduction of radiocarbon levels in the DNA. In other words, the present invention provides a means for achieving a targeted result.

Thus the dietary supplements of the present invention comprise at least one member, including enantiomers, stereoisomers, rotamers, tautomers, racemates and nutritionally acceptable salts or solvates thereof, selected from the group consisting of: (A) DNA precursor compound selected from the group consisting of purines, pyrimidines, nucleosides, deoxynucleosides, nucleotides, deoxynucleotides, oligomers, polymers and derivatives and mixtures thereof; (B) amino acids and derivatives and mixtures thereof; and (C) mixtures of (A) and (B). Further, in a nutritional supplement, components based on type (A) or (B) materials and compounds recited above typically exhibits a concentration range or level of carbon-14 that at the low end of the range is at least about 10%, 25%, 50%, 75%, 90%, 96%, 98% or 99% lower than the natural abundance concentration of carbon-14, and at the high end of the range up to about 96%, 98% or 100% lower than the natural abundance concentration of carbon-14. For example, 10% lower to about 100% lower than the natural abundance concentration of carbon-14; alternatively, about 15% to about 100% lower; or about 20% lower to about 99% lower; for example, about 10% lower to about 98.5% lower; such as about 50% lower to about 98% lower; or about 75% lower to about 95% lower; about 90% lower to about 98% lower; about 95% lower to about 98.5% lower; and about 97% lower to about 100% lower. Similarly, in a nutritional supplement, components based on (B) materials or compounds recited above typically exhibit a concentration or level of carbon-14 that is at least about 10% lower to about 98% or 99% lower than the natural abundance concentration of carbon-14; alternatively, about 15% to about 98% lower; or about 20% lower to about 97.5% lower; for example, about 25% lower to about 97% lower; such as about 50% lower to about 98% lower; or about 75% lower to about 95% lower; about 90% lower to about 98% lower; about 95% lower to about 98% lower; and about 95% lower to about 97.5% lower; or about 96% to about 99% or about 100% lower.

The ultimate carbon-14 isotope dilution obtained in the DNA is controlled not only by the absolute radiocarbon level of the precursor compounds in the supplements, but also by the relative amount of low radiocarbon precursor supplements provided per amount of high radiocarbon precursors in normal food ingested by the individual. The overall resultant amount of any individual nucleotide or amino acid ($A_R$), and resultant level of carbon-14 in the body's nucleotide or amino acid pool ($L_R$, measured in pMC), can be approximately calculated from the following equations:

$$A_R = A_F + A_S \tag{2}$$

(where amounts $A_R$, $A_F$, and $A_S$ can be expressed in any unit, such as grams, g, or milligrams, mg, provided all are in the same units)

$$L_R = ((A_F \times L_F) + (A_S \times L_S))/(A_F + A_S) \tag{3}$$

where:
 $A_F$=amount of nucleotide or amino acid from normal food entering cellular pool
 $L_F$=radiocarbon level of normal food (100 pMC)
 $A_S$=amount of nucleotide or amino acid from the supplement entering cellular pool
  (in same units as $A_F$)
 $L_S$=radiocarbon level of supplement (in units of pMC)

For example, if an individual's diet includes DNA that when digested provides approximately 1 g of ordinary nucleotides with natural radiocarbon levels (100 pMC), supplementation with a tenfold amount (10 g) of 2.0 pMC (2% of normal level) nucleotides delivers an overall resultant cellular pool containing 11 g of nucleotides with a carbon-14 level LR of 11 pMC, or just ⅑th the normal level. Any new DNA manufactured in the body while the nucleotide pools are at a level of 11 pMC will thus share this relatively lower level of radiocarbon (⅑th normal, a reduction of 89%).

The following table illustrates several examples using equation (3) to calculate the resultant radiocarbon (LR) in the cellular DNA precursor pool for various relative amounts of precursors in normal food with 100% natural abundance radiocarbon (AF) and in low radiocarbon supplements (AS), and for different radiocarbon levels in the supplements (LS). The value AS/F indicates the ratio of the amount of DNA precursors in the supplement relative to that in the normal food.

TABLE 6

Resultant Levels of Radiocarbon Reduction

| Example | $A_F$ | $L_F$ | $A_S$ | $L_S$ | $A_{S/F}$ | $L_R$ |
|---|---|---|---|---|---|---|
| 1 | 1 | 100 | 1 | 5 | 1:1 | 52.5 |
| 2 | 1 | 100 | 1 | 2 | 1:1 | 51.0 |
| 3 | 1 | 100 | 1 | 1 | 1:1 | 50.5 |
| 4 | 1 | 100 | 1 | 0.5 | 1:1 | 50.3 |
| 5 | 1 | 100 | 1 | 0 | 1:1 | 50.0 |
| 6 | 1 | 100 | 5 | 5 | 5:1 | 20.8 |
| 7 | 1 | 100 | 5 | 2 | 5:1 | 18.3 |
| 8 | 1 | 100 | 5 | 1 | 5:1 | 17.5 |
| 9 | 1 | 100 | 5 | 0.5 | 5:1 | 17.1 |
| 10 | 1 | 100 | 5 | 0 | 5:1 | 16.7 |
| 11 | 1 | 100 | 10 | 5 | 10:1 | 13.6 |
| 12 | 1 | 100 | 10 | 2 | 10:1 | 10.9 |
| 13 | 1 | 100 | 10 | 1 | 10:1 | 10.0 |
| 14 | 1 | 100 | 10 | 0.5 | 10:1 | 9.5 |
| 15 | 1 | 100 | 10 | 0 | 10:1 | 9.1 |
| 16 | 1 | 100 | 50 | 5 | 50:1 | 6.9 |
| 17 | 1 | 100 | 50 | 2 | 50:1 | 3.9 |
| 18 | 1 | 100 | 50 | 1 | 50:1 | 2.9 |
| 19 | 1 | 100 | 50 | 0.5 | 50:1 | 2.5 |
| 20 | 1 | 100 | 50 | 0 | 50:1 | 2.0 |

From this table is can be seen that increasing the relative ratio of low radiocarbon supplement to that of normal food is equally or more important than lowering the carbon-14 level of the supplement. For example, using 10:1 amount of supplement to food (AS/F) with 5 pMC supplement yields an overall pool with 13.6 pMC (Ex. No. 11). Reducing the supplement carbon-14 level five fold down to 1 pMC only reduces the pool down to 10 pMC (Ex. No. 13). Even if the supplement is completely free of carbon-14 (i.e., 0 pMC), the resulting precursor pool when using 10:1 supplement to normal food is only reduced to 9.1 pMC (Ex. No. 15). However, if the supplement carbon-14 level is kept at 5 pMC but its relative amount compared to normal food is increased fivefold (to 50:1), then the level of C-14 in the pool is reduced to 6.9 pMC (Ex. No. 16). Even if it is difficult to find carbon sources near or below 2 pMC, one can compensate and achieve relatively low C-14 levels (<10 pMC) in the DNA precursor pool by increasing the relative amount of supplement to normal food.

If a person's or animal's diet is supplemented with nutritional supplements comprising low radiocarbon DNA precursors, particularly in larger concentrations than those provided by ordinary food, biochemical kinetics will dictate that the enzymes involved in nucleotide metabolism and DNA synthesis will preferentially use the more abundant low radiocarbon precursors (including, e.g., dATP, dGTP, dCTP, dTTP) in the synthesis of new DNA.

Increasing the amount of low radiocarbon supplementation relative to normal precursor components present in food (AS/AF) can further reduce the radiocarbon level, as would lowering the radiocarbon level in the supplement (LS). However, there are limits as to how much of the supplements can be consumed, and how low the radiocarbon concentration is within the supplements. Various alternative methods are available to provide the desired amount of radiocarbon reduction that can be obtained using the supplements of the present invention.

Protein consumption varies based on individual preferences as to types of foods eaten, but is typically about 15-20% of overall calorie intake (with the remaining caloric intake consisting of about 50-60% from carbohydrates and about 25% from fats). Adult humans require at least about 0.8 to about 1 gram of protein daily for every kilogram of body weight. An average adult male with a body mass of 70 kg therefore requires at least about 56 g to about 70 g protein per day. Dietary guidelines typically recommend 75 g to 150 g of protein for individuals with an overall caloric intake in the range of 2000-3000 calories. Guidelines for nucleoside or nucleotide intake are not readily available. It is estimated that average nucleic acid content in the diet is just a few percent of the protein content, e.g., about 1% to about 3%. Also, for purposes of the present invention, it is assumed that foods high (or low) in protein are correspondingly high (or low) in nucleic acids.

Reducing portion size of ordinary high radiocarbon-containing protein food is one way to enhance the effect of low radiocarbon supplements.

Preferentially selecting normal foods containing lower than average levels of ordinary DNA and protein related compounds can also reduce the relative intake of higher radiocarbon compounds into the nucleotide and amino acid pools of the cells of the body and thereby leave these pools more readily available to the supplements of the invention. An example of a diet low in DNA precursors and amino acids can be found in relation to the disease gout, which involves excess accumulation of uric acid resulting from the breakdown of purines, primarily adenine and guanine. Foods recommended for those suffering with gout are low in both nucleotides and protein, and include: cherries, strawberries, blueberries, and other red-blue berries, bananas, celery, tomatoes, vegetables including kale, cabbage, parsley, green-leafy vegetables, foods high in bromelain (pineapple), foods high in vitamin C (red cabbage, red bell peppers, tangerines, mandarins, oranges, potatoes), fruit juices, and complex carbohydrates (breads, cereals, pasta, rice, as well as the aforementioned vegetables and fruits). Foods to avoid include most meats and beans, and others generally known to contain a high concentration of protein. Other examples for low protein diets can be obtained from dietary recommendations for individuals with disorders of amino acid metabolism such as phenylketonuria (PKU) or maple syrup urine disease (MSUD).

Useful amounts of such low radiocarbon DNA and histone precursor supplements, on a daily basis, is dependent on a number of factors including the subject's weight and the amount of DNA and histone precursors consumed in ordinary food, but is typically about 1 mg to about 3 g per kg body weight; alternatively about 10 mg to about 2 g per kg body weight; usefully about 100 mg to about 1 g per kg body weight. However, personal preference, medical issues or other reasons may indicate other preferred supplementation amounts.

Although low radiocarbon dietary supplements can be taken whenever convenient, including with meals, the present invention includes methods for obtaining additional benefits by timing when such supplements are delivered or ingested. Without wishing to be bound by theory, it is believed that such controlled timing can pre-saturate the digestive system, tissues, and cells with low carbon-14 DNA and histone precursors. Thus, the subsequent uptake of precursors from normal food having higher (natural background) levels of carbon-14 into the cellular pools used for DNA and histone synthesis is minimized. Ingesting low radiocarbon DNA and histone precursors of the present invention a suitable, and preferably sufficient, time prior to taking normal nutrition will also tend to preferentially satisfy the body's need for these compounds in the low radiocarbon forms. Typically the compositions of the present invention can be taken about 5 to about 15 minutes prior to a normal meal; preferably about 15 to about 30 minutes; more preferably about 30 to about 120 minutes prior. Alternatively, such compositions are taken (or given if to individuals not able to take it themselves) at a time that will permit the stomach to substantially empty prior to ingestion of a meal comprising normal radiocarbon level ingredients. However, for reasons of convenience they may also be taken at any time between meals.

Use of liquid forms of the supplements containing free nucleotides and amino acids can maximize and speed their absorption into the body, especially relative to normal foods in solid form which must first be digested and dissolved.

The abovementioned embodiments of the present invention either lower the actual or effective amount of DNA and protein precursors in normal food entering the cellular precursor pool (i.e., lowers AF), or increase the relative amount of low radiocarbon supplement reaching the precursor pools (i.e., raises AS), consequently lowering the resulting radiocarbon level LR in the chromosomes.

Furthermore, if cellular pools in a person or animal are saturated with low radiocarbon DNA precursors, normal enzyme control mechanisms will also tend to shut down the de-novo synthesis of these precursors from alternative high radiocarbon dietary sources such as amino acids or carbohydrates. As an example of such feedback inhibition, high levels of CTP (cytidine triphosphate) act as an allosteric inhibitor of the aspartate transcarbamylase, one of the first enzymes involved in de novo pyrimidine synthesis. Thus the majority of high radiocarbon compounds from the normal part of the diet, such as proteins, carbohydrates, and fats, will tend not to be used in the manufacture of DNA and the benefit of the supplements of the present invention can be obtained. Other studies also suggest that ingested (or otherwise delivered) DNA-related compounds can be incorporated in the body with beneficial effect, particularly as ordinary nucleotide supplementation in infant formula (Yu, 2002).

Similarly, the present invention can suitably use low radiocarbon amino acid precursors to lower the radiocarbon levels in histone proteins. While low radiocarbon amino acids cannot be exclusively directed to just the histone proteins, it is possible to lower the carbon-14 levels in all types of proteins. Consequently, to achieve a benefit in histone proteins greater amounts of low radiocarbon amino acid supplements are needed as compared to low radiocarbon DNA precursors, since the overall amount of protein in the body is far greater than the amount of DNA. An individual is also likely to consume a higher relative amount of normal protein in the diet, which contributes amino acids with natural, and consequently high, levels of radiocarbon. Thus, if large amounts of low radiocarbon amino acids are introduced or if the intake of normal source protein is lowered, reduction of carbon-14 in proteins also can be achieved. Therefore, meaningful reductions may still be possible, and even if carbon-14 reductions in proteins are not as large as for DNA, a reduction can be beneficial in reducing the overall damage to histones.

The use of low radiocarbon amino acids to lower radiocarbon levels in histone proteins in the chromosomes is analogous to the methods described above for using low radiocarbon DNA precursors to lower the radiocarbon levels of DNA. In general, the radiocarbon level of the amino acid supplements should be as low as possible, the relative amounts of supplement compared to regular food should be as high as possible, and the supplements should be taken a sufficient amount of time prior to eating normal foods in order to presaturate the blood and cellular amino acid pools with low radiocarbon amino acids, which can analogously minimize the uptake and absorption of the subsequent higher radiocarbon amino acids from normal food.

Because histones have an unusually large amount of lysine and arginine (nearly double that found in average proteins), it is particularly preferred that supplementation contain additional amounts of low radiocarbon versions of these amino acids. Since cysteine and methionine (coincidentally the only two sulfur-containing amino acids) together contribute only 1.1% of the carbons found in histones, they can be present as less significant components in the low radiocarbon supplements unless extremely high radiocarbon reduction is desired. Alternatively, these amino acids can be omitted from a supplement composition in order to reduce costs or to increase the amount of other components or supplemental additives, e.g., vitamins and/or minerals. The other amino acids, with the exception of tryptophan, are present in histones in similar relative amounts as in average proteins. Tryptophan is the only amino acid not present in typical histone proteins, and thus does not need to be included at all in the low radiocarbon amino acid supplementation of the present invention. It is convenient that the present invention is as effective in lowering histone radiocarbon levels even in the substantial absence of tryptophan.

Carbon-14 reduction in DNA nucleotides or other precursor compounds and histone amino acids need not be uniform in order to still provide health benefits. If, by way of example, carbon-14 levels in guanosine in the DNA are reduced by 58%, cytidine by 83%, adenosine by 72%, thymidine by 94%, and histone amino acids are reduced 25%-45%, such reductions can provide a significant overall reduction in chromosomal damage, which can be calculated by the methods described above. It is not necessary that all nucleotides and amino acids be present in the low radiocarbon supplements of the present invention, or have the same specific low levels of radiocarbon content. Various economic, medical or other reasons may dictate that certain nucleotides or amino acids be used in the supplements in greater or lesser quantities or not at all, or with differing radiocarbon levels. The relative quantities used may also vary by the age or health conditions of the intended recipients. Furthermore, in a preferred embodiment low radiocarbon amino acid supplementation can be directed to the essential amino acids, in other words, those not produced in the body of the individuals for whom the supplement is intended. This can vary according to whether a person or animal is the individual to whom the supplement is administered since specific amino acids considered to be essential can vary. Furthermore, certain individuals may exhibit a defect in the ability to synthesize one or more specific amino acids, even where a normal individual is typically able to do so, and such an amino acid and/or DNA precursor can be additionally supplemented. In the normal human being the essential amino acids (those that cannot be internally synthesized) are described hereinabove. Supplementation with at least one of such essential amino acids is preferred. Typically supplementation can be provided on a daily basis and at such suitable concentrations, for example, amounts as are considered by one skilled in the art to constitute the required daily amount. Alternatively, at least one of such low radiocarbon essential amino acids can be introduced more than once per day at a suitably adjusted (e.g., reduced) concentration in order to attain an equilibrium pool of the compound in the body. Conversely, for convenience, a larger amount can be introduced during a longer time interval, e.g., once every two, three, four or more days; alternatively, once per week or once during each two weeks or more.

The supplements of the present invention can also be delivered to individuals at various times and in differing amounts and/or types of DNA precursors and/or amino acids depending on where an individual is in their life cycle. Based on the teachings of the present invention, one skilled in the art to which this invention pertains, for example, a skilled nutritionist, can make the choices and adjustments necessary to gain appropriate advantage of the invention.

Most new DNA, and presumably the associated histone proteins as well, are synthesized when cells replicate and divide. This naturally occurs most significantly in humans (as well as other animals) during rapid growth stages, generally considered to occur during fetal development (the prenatal period, from conception to birth) and in infancy (birth to about age 2), childhood (from about age 2 to about age 10), adolescence (from about age 11 to about age 18), and early adulthood (from about age 18 to about age 30). The age ranges corresponding to the various "rapid-growth" stages of life for other vertebrates can similarly be ascertained by one skilled in the art relating to such vertebrate.

Although amounts of DNA formation are not precisely know for the various stages of human growth and development, reliable statistics on body weight or mass are available. For the purpose of this invention it is assumed that the amount of DNA formed is roughly proportional to the body mass. This assumption may need to be adjusted if in some stages of life the new cells are significantly smaller or larger than the average value, since the amount of new DNA is actually proportional to the number of cells, and not directly to their mass. Obesity, which may involve increased fat content in cells rather than a proportionate increase in the number of cells, may be one such example. However, for average body build, it should be suitable to assume an average cell size at different stages of life; if significant variations in average cell size are found to occur, appropriate corrections can be calculated.

The Center for Disease Control has compiled and published growth charts and data tables which provide numerous useful statistics on age and body mass for Americans from birth to age twenty (2000 CDC Growth Charts: United States). The median (P50) mass at birth and at the middle of each month for both sexes was taken from these data tables, and from these was calculated the relative rate of change of body mass and percentage of final adult weight (cumulative percent) from time of birth to age 20 (240 months). The following table contains portions of that data for selected months for both males and females.

TABLE 7

Age and Median Body Mass From Birth to Age 20

| | Male | | | | Female | | | |
|---|---|---|---|---|---|---|---|---|
| Middle of Month | P50 (kg) | Rate of change (kg/mo) | Relative rate of change (% body mass) | % Final Adult Weight | P50 (kg) | Rate of change (kg/mo) | Relative rate of change (% body mass) | % Final Adult Weight |
| (birth) | 3.53 | — | — | 5.0% | 3.40 | — | — | 5.8% |
| 1 | 4.00 | 0.95 | 26.8% | 5.7% | 3.80 | 0.80 | 23.4% | 6.5% |
| 2 | 4.88 | 0.88 | 21.9% | 6.9% | 4.54 | 0.75 | 19.7% | 7.8% |
| 3 | 5.67 | 0.79 | 16.3% | 8.0% | 5.23 | 0.69 | 15.1% | 9.0% |
| 4 | 6.39 | 0.72 | 12.7% | 9.1% | 5.86 | 0.63 | 12.0% | 10.1% |
| 5 | 7.04 | 0.65 | 10.2% | 10.0% | 6.44 | 0.58 | 9.9% | 11.1% |
| 6 | 7.63 | 0.59 | 8.4% | 10.8% | 6.97 | 0.53 | 8.2% | 12.0% |
| 7 | 8.16 | 0.53 | 7.0% | 11.6% | 7.45 | 0.49 | 7.0% | 12.8% |
| 8 | 8.64 | 0.48 | 5.9% | 12.2% | 7.90 | 0.45 | 6.0% | 13.6% |
| 9 | 9.08 | 0.44 | 5.0% | 12.9% | 8.31 | 0.41 | 5.2% | 14.3% |
| 10 | 9.48 | 0.40 | 4.4% | 13.4% | 8.69 | 0.38 | 4.6% | 14.9% |
| 11 | 9.84 | 0.36 | 3.8% | 13.9% | 9.04 | 0.35 | 4.0% | 15.5% |
| 12 | 10.16 | 0.33 | 3.3% | 14.4% | 9.37 | 0.32 | 3.6% | 16.1% |
| 13 | 10.46 | 0.30 | 2.9% | 14.8% | 9.67 | 0.30 | 3.2% | 16.6% |
| 14 | 10.73 | 0.27 | 2.6% | 15.2% | 9.94 | 0.28 | 2.9% | 17.1% |
| 15 | 10.98 | 0.25 | 2.3% | 15.6% | 10.20 | 0.26 | 2.6% | 17.5% |
| 16 | 11.21 | 0.23 | 2.1% | 15.9% | 10.45 | 0.24 | 2.4% | 17.9% |
| 17 | 11.42 | 0.21 | 1.9% | 16.2% | 10.67 | 0.23 | 2.2% | 18.3% |
| 18 | 11.62 | 0.20 | 1.7% | 16.5% | 10.89 | 0.21 | 2.0% | 18.7% |
| 24 | 12.60 | 0.15 | 1.2% | 17.8% | 11.97 | 0.16 | 1.4% | 20.6% |
| 30 | 13.43 | 0.14 | 1.0% | 19.0% | 12.90 | 0.15 | 1.2% | 22.1% |
| 36 | 14.26 | 0.14 | 1.0% | 20.2% | 13.79 | 0.15 | 1.1% | 23.7% |
| 48 | 16.15 | 0.17 | 1.1% | 22.9% | 15.71 | 0.17 | 1.1% | 27.0% |
| 60 | 18.30 | 0.19 | 1.0% | 25.9% | 17.84 | 0.18 | 1.0% | 30.6% |
| 72 | 20.58 | 0.19 | 0.9% | 29.2% | 20.14 | 0.20 | 1.0% | 34.6% |
| 84 | 22.96 | 0.20 | 0.9% | 32.5% | 22.65 | 0.22 | 1.0% | 38.9% |
| 96 | 25.53 | 0.22 | 0.9% | 36.2% | 25.50 | 0.25 | 1.0% | 43.8% |
| 108 | 28.42 | 0.26 | 0.9% | 40.3% | 28.84 | 0.30 | 1.0% | 49.5% |
| 120 | 31.78 | 0.30 | 1.0% | 45.0% | 32.72 | 0.34 | 1.1% | 56.2% |
| 132 | 35.72 | 0.35 | 1.0% | 50.6% | 37.02 | 0.37 | 1.0% | 63.6% |
| 144 | 40.27 | 0.40 | 1.0% | 57.0% | 41.46 | 0.37 | 0.9% | 71.2% |
| 156 | 45.37 | 0.44 | 1.0% | 64.3% | 45.66 | 0.33 | 0.7% | 78.4% |
| 168 | 50.78 | 0.45 | 0.9% | 71.9% | 49.23 | 0.27 | 0.5% | 84.6% |
| 180 | 56.07 | 0.42 | 0.8% | 79.4% | 51.95 | 0.19 | 0.4% | 89.2% |
| 192 | 60.75 | 0.36 | 0.6% | 86.0% | 53.82 | 0.13 | 0.2% | 92.4% |
| 204 | 64.44 | 0.27 | 0.4% | 91.30 | 55.09 | 0.09 | 0.2% | 94.6% |
| 216 | 67.11 | 0.19 | 0.3% | 95.1% | 56.14 | 0.09 | 0.2% | 96.4% |
| 228 | 69.05 | 0.15 | 0.2% | 97.8% | 57.26 | 0.10 | 0.2% | 98.3% |
| 240 | 70.55 | 0.10 | 0.1% | 100.0% | 58.20 | 0.05 | 0.1% | 100.0% |

From this table a number of significant observations can be made based on the assumption that new DNA formation rates are roughly proportional to overall body mass increase (and ignoring the effects of obesity).

At birth, boys have approximately 5.0% and girls 5.8% of all the DNA they will ultimately have as an adult (i.e., age 20). This DNA, which is formed during pregnancy, can have lower radiocarbon levels if the expectant mother takes adequate amounts of the supplements of the present invention during her pregnancy.

By age 20 (240 months) average rate of change is approaching zero (even more so for women than for men). Although men may still experience a small amount of growth and new DNA formation after age 20, it is likely to only be for a few more years and then by only a few percent. To be assured of maximum reduction of chromosomal radiocarbon, low radiocarbon supplementation should optionally continue for several years past the age of twenty, typically about 1 to about 10 years, preferably at least for men and optionally for women.

The column "Percentage of Final Adult Weight" column should also approximate the cumulative percentage of DNA formed by the middle of each month listed. For example, boys will have about ½ their DNA formed by age 11 (132 months), whereas girls will have reached 50% two years sooner at age 9 (108 months). The percentage of DNA formation occurring in any time period can be estimated as the difference of the values in the "Percentage of Final Adult Weight" column for the starting and ending time. For example, between the ages of 5 (60 months) and 11 (132 months), girls will have added about 33% (63.6%-30.6%) of their lifetime total DNA, whereas boys in the same period will have added 24.7% (50.6%-25.9%) (not including replacement DNA during growth and afterwards for cells that die).

The relative rate of increase in body mass (and presumably DNA formation) per month is by far highest in the first month after birth (26.8% for boys and 23.4% for girls), and drops very rapidly over the first 12 months.

Figure 2:
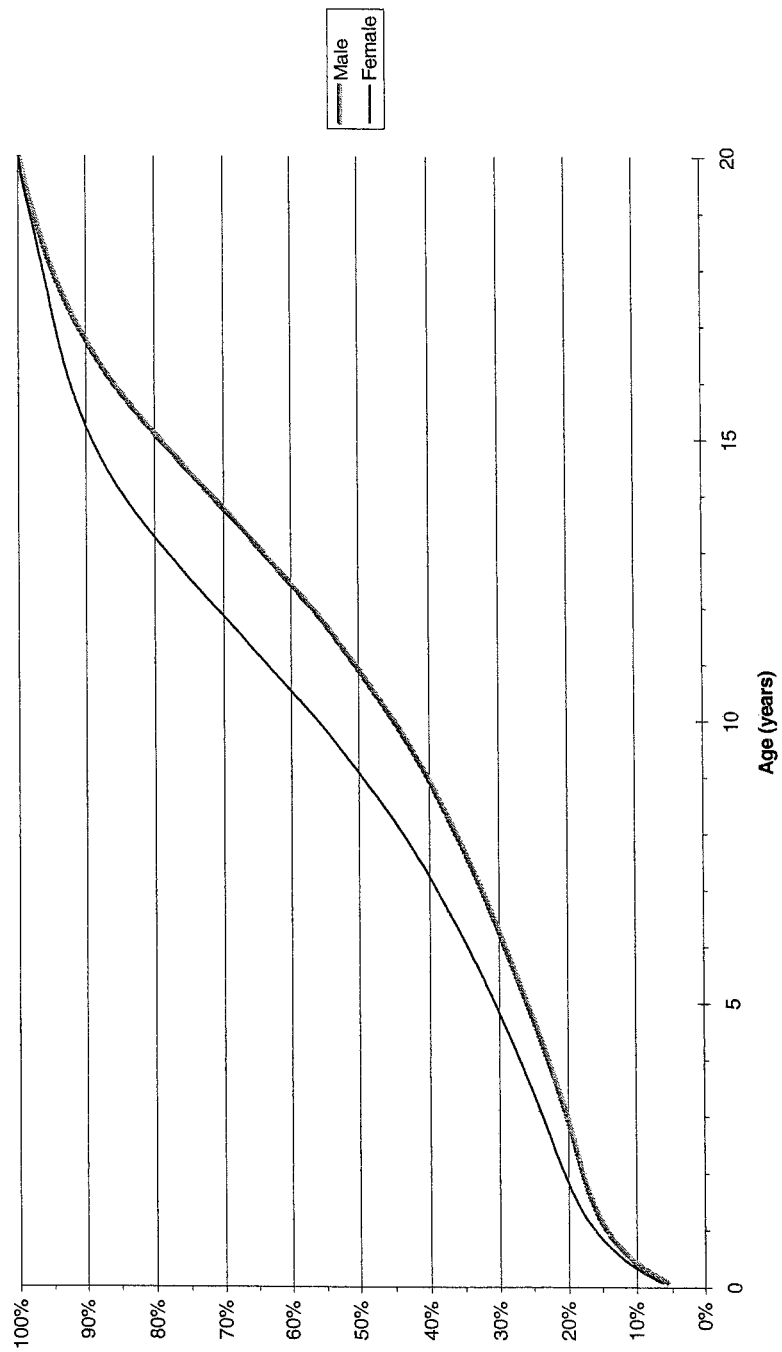
FIG. 2 illustrates the percentage of final adult weight for males and females in the United States from birth through age 20.

The absolute growth rate (kg/mo) for both sexes is illustrated in FIG. 1, and clearly shows the rapid initial growth and sharp decrease by age two, followed by distinct growth spurts (at about age 10-17 for boys, and age 9-14 for girls). The percentage of final adult weight for both sexes is shown in FIG. 2. From FIG. 2 it can be seen that girls (the upper curve) approach their final weight more rapidly than boys. For example, girls reach 50%, 60%, 70% and 80% of their final weight about 1½ years sooner than boys. This chart (and the corresponding data table) can also be used to show the consequences of starting the low radiocarbon supplementation of the present invention late, or stopping it before age 20, or any combination of starting and stopping. For example, if a girl waits to start supplementation at age 5, she has already formed about 30% of her DNA, and can at most only lower the radiocarbon level in the 70% of her DNA yet to be formed. Likewise, a boy who has received low radiocarbon supplementation from birth to age 9, then stops for six years, then resumes at age 15 and continues to adulthood, will end up with at most a 55% reduction in DNA radiocarbon, since about 5% of his DNA was formed before birth and about 40% was formed between ages 9 and 15, during which time he was ingesting (or during pregnancy, indirectly ingesting) normal food.

One can also make estimates (albeit somewhat less accurate) for the amount of growth and DNA formation occurring during the gestation (pregnancy) period. The following table is based on very rough estimates for gestation weeks 8-21, with median weights for weeks 22-40 based on statistics from premature births in the United States from 1999-2000 using estimated gestation ages calculated from best-guess conception dates (Oken et al., 2003). (Rates of change were not calculated for weeks 8-22, since the median body mass for those weeks are very rough estimates)

TABLE 8

Estimated Age and Median Body Mass During Gestation

| Est. Gest. Age (weeks) | Male | | | | Female | | | |
|---|---|---|---|---|---|---|---|---|
| | P50 (kg) | Rate of change (kg/wk) | Relative rate of change (% body mass) | % Final Adult Weight | P50 (kg) | Rate of change (kg/mo) | Relative rate of change (% body mass) | % Final Adult Weight |
| 8  | 0.001 | —     | —     | 0.0% | 0.001 | —     | —     | 0.0% |
| 9  | 0.002 | —     | —     | 0.0% | 0.002 | —     | —     | 0.0% |
| 10 | 0.004 | —     | —     | 0.0% | 0.004 | —     | —     | 0.0% |
| 11 | 0.007 | —     | —     | 0.0% | 0.007 | —     | —     | 0.0% |
| 12 | 0.014 | —     | —     | 0.0% | 0.014 | —     | —     | 0.0% |
| 13 | 0.040 | —     | —     | 0.1% | 0.040 | —     | —     | 0.1% |
| 14 | 0.055 | —     | —     | 0.1% | 0.055 | —     | —     | 0.1% |
| 15 | 0.070 | —     | —     | 0.1% | 0.070 | —     | —     | 0.1% |
| 16 | 0.100 | —     | —     | 0.1% | 0.100 | —     | —     | 0.2% |
| 17 | 0.140 | —     | —     | 0.2% | 0.140 | —     | —     | 0.2% |
| 18 | 0.190 | —     | —     | 0.3% | 0.190 | —     | —     | 0.3% |
| 19 | 0.240 | —     | —     | 0.3% | 0.240 | —     | —     | 0.4% |
| 20 | 0.300 | —     | —     | 0.4% | 0.300 | —     | —     | 0.5% |
| 21 | 0.360 | —     | —     | 0.5% | 0.360 | —     | —     | 0.6% |
| 22 | 0.520 | —     | —     | 0.7% | 0.482 | —     | —     | 0.8% |
| 23 | 0.597 | 0.076 | 14.6% | 0.8% | 0.564 | 0.082 | 17.1% | 1.0% |
| 24 | 0.680 | 0.083 | 14.0% | 1.0% | 0.626 | 0.062 | 10.9% | 1.1% |
| 25 | 0.771 | 0.092 | 13.5% | 1.1% | 0.712 | 0.086 | 13.7% | 1.2% |
| 26 | 0.898 | 0.127 | 16.4% | 1.3% | 0.835 | 0.123 | 17.3% | 1.4% |
| 27 | 1.023 | 0.125 | 13.9% | 1.4% | 0.947 | 0.112 | 13.4% | 1.6% |
| 28 | 1.170 | 0.147 | 14.3% | 1.7% | 1.087 | 0.140 | 14.8% | 1.9% |
| 29 | 1.360 | 0.190 | 16.3% | 1.9% | 1.286 | 0.199 | 18.3% | 2.2% |
| 30 | 1.577 | 0.217 | 16.0% | 2.2% | 1.500 | 0.215 | 16.7% | 2.6% |
| 31 | 1.834 | 0.257 | 16.3% | 2.6% | 1.777 | 0.277 | 18.5% | 3.1% |
| 32 | 2.115 | 0.282 | 15.4% | 3.0% | 2.061 | 0.284 | 16.0% | 3.5% |
| 33 | 2.410 | 0.294 | 13.9% | 3.4% | 2.371 | 0.310 | 15.1% | 4.1% |
| 34 | 2.658 | 0.496 | 20.6% | 3.8% | 2.597 | 0.225 | 9.5%  | 4.5% |
| 35 | 2.849 | 0.383 | 14.4% | 4.0% | 2.771 | 0.174 | 6.7%  | 4.8% |

TABLE 8-continued

Estimated Age and Median Body Mass During Gestation

| | Male | | | | Female | | | |
|---|---|---|---|---|---|---|---|---|
| Est. Gest. Age (weeks) | P50 (kg) | Rate of change (kg/wk) | Relative rate of change (% body mass) | % Final Adult Weight | P50 (kg) | Rate of change (kg/mo) | Relative rate of change (% body mass) | % Final Adult Weight |
| 36 | 3.013 | 0.164 | 5.7% | 4.3% | 2.904 | 0.133 | 4.8% | 5.0% |
| 37 | 3.193 | 0.181 | 6.0% | 4.5% | 3.068 | 0.164 | 5.7% | 5.3% |
| 38 | 3.366 | 0.173 | 5.4% | 4.8% | 3.232 | 0.163 | 5.3% | 5.6% |
| 39 | 3.489 | 0.123 | 3.7% | 4.9% | 3.354 | 0.122 | 3.8% | 5.8% |
| 40 | 3.580 | 0.091 | 2.6% | 5.1% | 3.441 | 0.087 | 2.6% | 5.9% |

From this table, one can make estimates similar to those based on the table of median weights from birth to age 20. For example, roughly 4% of a boy's DNA will have been formed by gestation week 35, so that if supplementation with low radiocarbon DNA precursors is begun at this time, the maximum radiocarbon reduction would be limited to the 96% of DNA yet to formed. For both boys and girls, only about 0.1% of one's lifetime DNA is formed by week 15 of gestation, so that if supplementation with low radiocarbon DNA precursors is begun at this time, the radiocarbon reduction would be applied to the nearly 99.9% of all DNA yet to be formed. Going back earlier, to week 8 of gestation, fetal weight is estimated to be only about a gram, or $1/60,000^{th}$ of the final body weight. The corresponding amount of DNA formed in these first 8 weeks of pregnancy is an imperceptibly small portion of the overall lifetime amount of DNA formed. One reason to begin maternal low radiocarbon supplementation much before gestation week 8 is to ensure that the mother's DNA and histone precursor pools are saturated with low radiocarbon compounds before there is appreciable fetal growth. In that way the fetus can obtain the maximum low radiocarbon benefit at the outset.

These observations are also based on the assumption that substantially all of the DNA formed will find its origin in the supplements and methods of the present invention. However, in any event, a proportional benefit of the present invention will be obtained even where some DNA is formed from normal, higher radiocarbon compounds.

By the time one reaches early adulthood (on average about age 20, or a few years earlier or later in some cases) and has attained near full adult size, new cell growth is dramatically slowed in most tissues, with incorporation of new DNA bases dropping to low or "maintenance" levels. There will be only a small residual amount of nucleotide turnover due to occasional DNA repair or replacement of dead cells. Even when there is cell turnover or other DNA turnover or repair, the body is very efficient and tends to reuse existing nucleotides rather than synthesize new materials. Detailed information on the actual DNA and histone turnover rate in various adult human tissues is not readily available. If such DNA/histone turnover level is relatively low, on the order of about 0.1% or fewer nucleotide residues replaced per year, a consequent benefit of the method of the present invention is that humans raised from the earliest time, preferably from conception or early youth with low radiocarbon supplementation, will reach early adulthood with lower than normal radiocarbon levels in their DNA and histones. From that point in their life and onward they will tend to retain these low radiocarbon levels even if low radiocarbon supplementation is reduced or ceases in adulthood. In addition, if DNA/histone turnover in adults is low, then adults with normal radiocarbon levels, including all adults presently alive, have a diminished opportunity to significantly lower their DNA/histone radiocarbon levels using low radiocarbon supplements.

However, if the DNA/histone turnover rate is moderately high even in adults, on the order of about 1% or more nucleotide residues replaced per year, then individuals raised from birth with low radiocarbon supplementation need to continue such supplementation throughout life to maintain low radiocarbon levels. But if there is high DNA/histone turnover in adulthood, this also offers the opportunity for adults with natural, high radiocarbon levels to lower those levels through low radiocarbon supplementation as taught herein. If there is only high turnover of DNA but not histones, then only low radiocarbon DNA precursors would be beneficial to an adult. Likewise, if there is only high turnover of histones but not DNA, then only low radiocarbon histone precursors would be beneficial to an adult. However, in any high adult DNA/histone turnover scenario, the optimal radiocarbon reduction, and corresponding reduction of mutations and chromosomal damage is preferentially obtained by those individuals in whom supplementation is begun as soon as possible after conception. Furthermore, supplementation according to the methods of the present invention by a female who has conceived provides a significant opportunity for the gestating offspring to be born with reduced radiocarbon levels, particularly since high levels of DNA and histones (approximately 5-6% of the ultimate adult amount) are produced during gestation. It is also especially advantageous for expectant mothers to use low radiocarbon dietary supplements during the pregnancy, if the fetus is known to be or may possibly be female, in order that any future grandchildren conceived will have developed from oocytes with a significantly lower risk of chromosomal damage from carbon-14 decay. Even if low radiocarbon supplementation is only done during the pregnancy period it may reduce the risk of chromosomal damage and possible birth defects or stillbirth in the following generation. However, if the mother breast-feeds the child after its birth, additional radiocarbon reduction during infancy is possible provided the mother continues (or begins) low radiocarbon dietary supplementation while she is lactating. This continued supplementation by the mother will tend to lower the radiocarbon content of the proteins, DNA, amino acids, and nucleotides in her milk. This breast milk will consequently provide her nursing child with a low radiocarbon level in its DNA and histone protein precursors, which is especially beneficial since the infancy phase is a period of rapid growth (and presumably of DNA synthesis).

The previous sections describe uncertain levels of DNA and histone turnover in overall tissues. However, recent findings by Bhardwaj (2006) indicate that the DNA (but not necessarily histones) for certain critical brain cells are formed very early in life, and because of little or no turnover of carbon within the DNA, such cells will contain lifetime radiocarbon levels corresponding to the radiocarbon levels of their nutrition during this early period of life. In particular, normeuronal NeuN-negative cells have an average age of 4.9+/−1.1 years after time of birth, and NeuN-positive neuronal cells have an average age of 0.0+/−0.4 years from time of birth. Thus, low radiocarbon nutrition of the present invention taken by the mother during the pregnancy, and by the child (or its mother where the child is substantially or solely breast-fed) most preferably during the first 6 years of life; alternatively for a period selected from the group consisting of the first about 1 year, about 2 years, about 3 years, about 4 years, about 5 years and about 6 years of life; preferably for at least the first 6 months of life; alternatively for a period of time selected from the group consisting of the first about 1 month, about 2 months, about 3 months, about 4 months, about 5 months and about 6 months of life; can ensure or at least promote that critical brain cells formed in the earliest stages of a child's life have low radiocarbon levels, which cells appear to be maintained throughout the remainder of life, even if the child later consumes a normal or typical diet comprising food or nutritional components exhibiting natural background radiocarbon levels. This appears to be supported by preliminary epidemiological evidence suggesting that persons born from 1961-1965, when atmospheric radiocarbon levels were briefly but significantly increased due to atmospheric nuclear weapons testing (with a concomitant increase in the radiocarbon content of certain foodstuffs), may have significantly higher rates of certain malignant brain tumors.

One embodiment of the present invention comprises a method to reducing lifetime risk of malignant brain tumors in a human, comprising use or ingestion of nutritional or dietary supplements or infant formula or infant foods comprising one or more DNA precursors exhibiting a level of carbon-14 that is at least about 50% lower to about 100% lower; preferably about 60% lower to about 98% lower; more preferably about 75% lower to about 95% lower; and most preferably about 90% lower to about 100% lower than the natural abundance concentration of carbon-14, particularly wherein the human is at a stage of development selected from the group consisting of prenatal, infancy, and early childhood up to and including about 6 years of age; preferably selected from the group consisting of prenatal, about 1 month, about 2 months, about 3 months, about 4 months, about 5 months, and about 6 months; more preferably selected from the group consisting of prenatal, about 1 year, about 2 years, about 3 years, about 4 years, about 5 years and about 6 years of age.

An alternative embodiment of the present invention comprises a method wherein a pregnant or lactating female ingests one or more nutritional or dietary supplement comprising one or more DNA precursors exhibiting a level of carbon-14 that is at least about 50% lower to about 100% lower; preferably about 60% lower to about 98% lower; more preferably about 75% lower to about 95% lower; and most preferably about 90% lower to about 100% lower than the natural abundance concentration of carbon-14. The low radiocarbon DNA precursors employed by the methods described herein may include any one or more of the relevant compositions and forms described.

The methods of the present invention involving dietary supplementation with low radiocarbon DNA precursors and amino acids can thus lower the amount of radioactive carbon-14 incorporated into DNA and histone proteins, and result in the desired outcome of reducing the number of radiocarbon-induced genetic mutations and other chromosomal damage. In turn this can result in lower risk of spontaneous defective cell replication and may possibly reduce the formation of cancerous cells and/or delay the effects of aging. By reducing the overall incidence of DNA mutations, this method may also benefit individuals suffering from disorders directly or indirectly related to general DNA nucleotide excision repair, such as some forms of xeroderma pigmentosum and trichothiodystrophy.

Low radiocarbon DNA precursors and amino acids can be synthesized by various suitable methods, provided the primary carbon sources are ones with a sufficiently lower than normal level of radiocarbon to achieve the desired effects disclosed herein. Because the methods and supplements of the present invention do not require ultra low levels of carbon-14 (below 1 pMC), but can suitably be carried out at radiocarbon levels from about 2 pMC to about 5 pMC or even higher, there exists a readily available and low cost source in the vast amounts of low radiocarbon "waste" $CO_2$ emissions currently produced as a by-product of fossil fuel-based industrial processes such as heating or generation of electricity.

Radiocarbon values measured in the course of carbon dating of coal for scientific purposes typically follow the standard practice of first removing surface contamination due to atmospheric $CO_2$ as well as selecting samples located away from uranium or other radioactive materials, or sites of potential bacterial contamination, which have the potential to artificially increase the amount of C-14 in the sample. Therefore, it cannot be assumed that radiocarbon measurements obtained for carbon dating purposes reflect the overall radiocarbon level of industrial coal that has been pulverized and possibly stored for extended periods of time in contact with moisture or air containing natural background levels of radiocarbon, or which may be associated with radioactive materials or other sources of biological contamination. On the contrary, it is likely that surface contamination will increase the overall level of radiocarbon, and perhaps by a significant amount, if the material is pulverized or powdered or spends a extended amount of time stored and exposed to air. Therefore, while it is not necessary for purposes of the present invention to totally isolate coal or oil from the air, measures such as minimizing the time of exposure and surface area exposed to air and water can be beneficial. Additionally, for purposes of the present invention it is preferred to use fossil fuels associated with lower than average or typical amounts of uranium or other radioactive materials.

A more significant issue that should be taken into consideration for purposes of the present invention is that not all fossil fuels are necessarily of extremely ancient origin and therefore necessarily low in C-14 content. For example, hydrothermal oils with petroleum-like hydrocarbons of ages less than 5000 years, and thus with radiocarbon levels of greater than 50% natural background levels, have been documented (Didyk, 1989; Peter, 1991). Other fossil fuel deposits of equal or younger age, and hence with potentially higher levels of radiocarbon, are possible since it has been demonstrated that plant matter can be converted into a product indistinguishable from a paraffinic crude oil within four years in a laboratory experiment designed to simulate a continuously subsiding sedimentary basin (Saxby, 1984). Others have stated, "Petroleum products are generated instantaneously on a geological time scale (decades to millennia) as a consequence of hydrothermal processes" (Sturz, 1996). Studies of young hydrothermal petroleum which readily formed in East Africa caused other scientists to urge energy exploration for such material in active continental rift areas, suggesting that younger fossil fuels with potentially much higher radiocarbon levels could become more commonly available in the future (Simoneit, 2000). Fossil fuels, unless clearly identified otherwise, also cannot be assumed to be free of added hydrocarbons with high levels of radiocarbon, as in the case, for example, of gasoline containing corn-based ethanol or natural gas with added methane or biogas produced from the decomposition of sewage.

In addition to the abovementioned radiocarbon endogenous to the fossil fuel or fossil fuel mixture, combustion processes which produce $CO_2$ from fossil fuels may vary considerably in the amount of outside air used, and hence can further increase the amount of radiocarbon that becomes part of the final $CO_2$ emission product. Consequently, the amount of radiocarbon added during combustion can vary significantly depending on the exact process used.

Therefore, for purposes of the present invention, not all fossil fuels, nor all carbon dioxide obtained from the combustion of fossil fuels, are equally suitable or preferred as low radiocarbon sources. To be useful in the present invention, carbon sources must be carefully selected and monitored in regard to their actual radiocarbon content, and that sources of potential contamination throughout the process which might increase levels of radiocarbon should be monitored and avoided within acceptable cost criteria. Naturally, it is more important to measure the final levels of radiocarbon in the product or component produced or synthesized in order to ensure that the expected levels of radiocarbon reduction are obtained and have not been altered by contamination or error introduced anywhere in the process. Thus, coal, petroleum and $CO_2$ sources useful for producing components useful in the present invention should be tested for their radiocarbon content and they can be used if they are consistent with the teachings herein; for example, products or components exhibiting radiocarbon reductions of at least about 50%, 75%, 90%, 96% or 98% or more.

Reference in this disclosure to fossil fuels or fossil fuel $CO_2$ suitable for use in this invention refers to those materials confirmed to contain suitably low levels of radiocarbon, and thereby exclude contaminated, extremely young (geologically), or otherwise unsuitable material with undesirably high levels of radiocarbon.

Ordinary coal, petroleum and natural gas currently used to fuel boilers, furnaces, heaters, and other industrial systems should have levels of radiocarbon ranging from about 3 pMC down to about 0.4 pMC, which is $\frac{1}{30}^{th}$ to $\frac{1}{250}^{th}$ the radiocarbon natural abundance levels found in the biosphere. By recognizing that the radiocarbon levels of the supplements in this invention do not need to be extremely low (99% or more below normal levels) in order to provide significant benefits, a further embodiment of this invention provides the added benefit of using readily available "waste" $CO_2$ effluent from boilers, heaters, furnaces, and other industrial equipment that burn fossil fuels. Useful $CO_2$ can also be recovered from industrial processes using other sources of suitable fuel, for example a hydrocarbon fuel extracted from hydrocarbon-containing geologic deposits such as oil or tar sands. Similarly suitable compounds can be derived from reactants obtained from coal, oil, natural gas, or other hydrocarbon-containing geologic deposits.

$CO_2$ captured as a byproduct of processes such as petroleum refining, coal gasification, or oil and natural gas extraction may also be a suitably low in radiocarbon content for use in the present invention. Additional low radiocarbon $CO_2$ sources may include any suitably ancient carbonate rocks, such as limestone. However, in all cases the present invention requires that the radiocarbon levels of $CO_2$ sources used be confirmed to be adequately low, since some fossil hydrocarbons or carbonates may have endogenous radiocarbon levels greater than 50% and storage, combustion or other processes could potentially introduce additional amounts of unwanted radiocarbon adsorbed from $CO_2$ in the air.

In carrying out the methods of the present invention, unlike prior art methods for producing low radiocarbon food for use as an individual's total diet, there is no need for special mining, storage, or handling of the fossil fuels to prevent contamination from natural background radiocarbon in atmospheric $CO_2$. Furthermore, the methods of this invention can utilize ordinary air in the combustion process. Measurements of $CO_2$ obtained on Mauna Loa, chosen for its isolated location, show atmospheric levels of $CO_2$ increased from 315.98 parts per million by volume (ppmv) of dry air in 1959 to 377.38 ppmv in 2004 (CDIAC—Carbon Dioxide Information Analysis Center, Oak Ridge National Laboratory; "Atmospheric carbon dioxide record from Mauna Loa"). Allowing for higher local $CO_2$ levels of, for example, 400 ppmv, corresponds to an atmospheric $CO_2$ concentration of 0.04%. Oxygen, present in the atmosphere at a concentration of about 20.95%, is 534 times more abundant. For example, assuming that fossil fuel used was methane having an average radiocarbon level of 0.5 pMC (in other words only minor contamination with radiocarbon), and that combustion efficiency relative to $O_2$ is only 20% (i.e., 80% of the oxygen/air supplied is not used in combustion, but is just heated and eliminated in the exhaust) the net radiocarbon level of the $CO_2$ emissions from combustion using ordinary air would only be increased to 2.36 pMC. Final radiocarbon levels would be even slightly lower (<2.36 pMC) if longer chain hydrocarbons (with a higher ratio of carbon to hydrogen) or partially oxidized fuels were used instead of methane. This final level of radiocarbon, 2.36 pMC, is suitable for the production of low radiocarbon nucleotides and amino acid supplements as described in the present invention. The fact that no special processing or handling of fuel, and in fact no significant alteration of the process other than capturing the $CO_2$ in the emissions, allows for the $CO_2$ from nearly any industrial combustion process to potentially be recycled for use in producing low radiocarbon supplements. According to the present invention, direct use can be made of the $CO_2$ now considered an industrial pollutant, even if intermediate clean-up steps are required to remove contaminants unsuitable for the conversion process, as discussed below. Other suitable radiocarbon levels of direct-use or byproduct $CO_2$ typically include about 2 pMC to about 75 pMC; preferably about 2 pMC to about 10 pMC; alternatively about 5 pMC to about 50 pMC; alternatively, 0 pMC to about 2 pMC $CO_2$ can be useful, especially for preparing the DNA precursor-type supplements described above.

The low radiocarbon $CO_2$ can be isolated from the combustion emissions using any desired method of $CO_2$ sequestration. The combustion gas may first be cooled and have particulate matter removed through electrostatic precipitation or other process. Nitrogen and sulfur oxides may also be removed by various combustion or absorption processes. Then the remaining exhaust containing $CO_2$ can be passed through solutions of calcium or sodium hydroxide to capture it as the corresponding carbonate or bicarbonate, which can later be regenerated as $CO_2$ gas by the addition of acid. This process, however, does not regenerate the original sodium or calcium hydroxide. More preferable is the use of an industrial solvent scrubbing system based on a more easily recyclable amine solvent such as monoethanolamine, or MEA (Working Party on Fossil Fuels, 2003). In this process the $CO_2$ gas enters an absorption tower and into contact with the amine solution to which it becomes chemically absorbed. This solution can then be pumped to a desorber or stripper tower where the $CO_2$ is released and the solvent and regenerated by either heating or a reduction in pressure. This MEA-based process is currently in use at some chemical and oil facilities and can recover up to 98% of $CO_2$ emissions with a $CO_2$ purity of more than 99%. Other $CO_2$ capture process include other solvent scrubber systems using more complex amines, membrane separation or absorption processes, or even $CO_2$ adsorption by solids. However it is captured from combustion gas emissions, the low radiocarbon $CO_2$ may then be used in an on-site photobioreactor (to be described below), or may stored as compressed or liquefied $CO_2$ or dissolved in water as a bicarbonate or carbonate, for temporary storage or transport to another location for subsequent processing.

An alternate, but likely more expensive source of low radiocarbon $CO_2$ is based on the treatment of carbonate minerals such as limestone with an acid.

Low radiocarbon $CO_2$ is then used to obtain DNA precursor and amino acid compounds of the present invention. Fermentation using microorganisms such as bacteria, fungi, and yeast has been used for centuries, especially in Japan, to produce nutritional additives such as the amino acid monosodium glutamate. Each year tons of amino acids, including glutamic acid and lysine, are produced by industrial fermentation using the bacteria *Corynebacterium glutamicum* and *Brevibacterium flavum*. Similar fermentation processes using these and other microorganisms could be used to manufacture low radiocarbon DNA precursor compounds using simple raw materials. However, fermentation usually requires organic compounds, such as sugars, as the carbon source, which are not readily available in low radiocarbon form.

Oldham et al. (U.S. Pat. No. 3,854,240, 1974) provides a method for producing isotopically labeled nucleosides, nucleotides and amino acids using the blue-green algae Anacystis nidulans. This photosynthetic microorganism, chosen particularly for its resistance to high levels of radiation, requires only water, inorganic salts, light, and $CO_2$ (or bicarbonate) for growth, and when provided with labeled $^{14}CO_2$, produces correspondingly labeled DNA and proteins that are high in radiocarbon (and high in radioactivity). The application of standard separation and enzymatic and chemical hydrolysis techniques, as specified in this patent, is subsequently applied to these cell extracts to extract and convert their DNA and proteins into $^{14}C$ labeled purified deoxynucleotides and free amino acids.

There are various other methods and devices designed to support the growth of photosynthetic organisms requiring $CO_2$. Stengel, et al. (U.S. Pat. No. 4,084,346, 1978) provides a method for delivering proper amounts of $CO_2$ to autotrophic photosynthetic organisms. Berson, et al. (U.S. Pat. No. 4,868,123, 1989) describes a photobioreactor for growing photosynthetic organisms. Delente, et al. (U.S. Pat. No. 5,151,347, 1992) describes a closed photobioreactor apparatus for the controlled production of photosynthetic microorganisms using carbon-13 or carbon-14 enriched $CO_2$.

All these prior methods use either ordinary, high radiocarbon $CO_2$, or $CO_2$ which was isotopically enriched in carbon-11, carbon-13, or carbon-14. It has been discovered that such methods can also be applied using $CO_2$ depleted in carbon-14 content (as described above), to support the growth of photosynthetic microorganisms and the production of low radiocarbon nucleotides, amino acids, and other DNA and histone precursors. Furthermore, since low radiocarbon $CO_2$ has extremely low radioactivity levels, the species of microorganisms needed for this method is not limited to the radiation-tolerant species described by Oldham. Other microorganisms, such as *Chlorella*, can also be used successfully in photosynthetic processes to produce nucleosides and nucleotides from similar raw materials, particularly when radiocarbon levels are not excessive. There are an estimated 30,000 other types of photosynthetic microorganisms, some of which may also be suitable for producing the desired compounds. Screening tests can be conducted to determine which of such organisms can produce sufficient quantities of the desired compounds in a reasonable time.

If DNA precursor and amino acid radiocarbon levels of about 2% to about 5% natural background level (2 pMC to 5 pMC) are desired, one skilled in the art can readily synthesize such compounds via microbial photosynthesis using industrial $CO_2$ effluents even in the presence of minor contamination from ordinary air. This can be accomplished using low radiocarbon $CO_2$ obtained from any available source, but preferably from waste emissions from industrial combustion processes using ordinary fossil fuels and air. This low radiocarbon $CO_2$ is captured as described earlier (either as a gas or dissolved in water in a bicarbonate or carbonate form) and is then introduced into an enclosed photobioreactor apparatus containing a suitable photosynthetic microorganism or algae. Water (free of natural $CO_2$) and additional inorganic salts and other required nutrients are also provided. Any air or oxygen allowed into the apparatus (if even needed at all) should have any natural $CO_2$ first removed by any commercially available $CO_2$ scrubber process, or by as simple a process as bubbling the gas through a solution of sodium or calcium hydroxide. Sufficient light and temperature control are then provided to optimize growth of the photosynthetic organisms, and at appropriate intervals some of the organisms are harvested and additional low radiocarbon $CO_2$ and other required materials are replenished to enable further growth. The harvested organisms are then processed to provide the desired DNA and protein precursors.

The term "photobioreactor" refers to any container or part thereof, the latter also referred to as a compartment, comprising an aqueous environment, $CO_2$ with suitably low radiocarbon levels, and microorganisms, algae and/or plants capable of carrying out photosynthesis and producing or incorporating within their structures compounds suitable for use in the present invention. The photobioreactor is also capable of receiving inorganic salts and minerals as well as adequate light, whether in the form of sunlight, concentrated sunlight (including, for example, by means of mirrors or other reflective surfaces, lenses, fiber optics and the like), artificial illumination, and combination thereof, in order to facilitate photosynthesis. As is well known in the art, photosynthesis refers to a process that includes several independent reactions, including reactions that are conducted in the presence of and utilizing light energy as well as reactions that can be conducted in the dark or without light energy, in which carbon dioxide and water are converted into organic compounds, e.g., carbohydrates and others, by bacteria, algae and plants in the presence of chlorophyll. Suitable aqueous environments and/or compartments include tanks, pools, ponds, canals, lakes, or other natural or man-made aqueous environments and the like. Portions of larger bodies of water (natural or man-made), including reservoirs, lakes, seas, or oceans, may also be used and/or partitioned by walls or other barriers to create suitable compartments. The surface of such aqueous environments may optionally be open to the ambient air provided that a sufficiently high concentration of low radiocarbon $CO_2$ is provided so as to minimize the effect of diffusion or absorption into the water of ambient outside $CO_2$ having a higher radiocarbon content. Preferably the aqueous compartment is substantially, completely or partially sealed or covered to reduce or minimize the entrance of ambient $CO_2$ having a higher radiocarbon content as well as the escape or diffusion of low radiocarbon $CO_2$ from the photobioreactor and into the environment. The surface covering is preferably a transparent, substantially transparent or translucent plastic film, sheet or the like which permits use of natural sunlight or other illumination of the aqueous surface. Such a preferred cover is interposed between the water and the light, the cover being substantially impermeable to $CO_2$ and which transmits light. Sealed bags, bladders, rafts, floating innertube-like structures and the like comprising plastic or rubber construction can also be used to create suitable, individual aqueous compartments comprising low radiocarbon levels and appropriate salinity, or other mineral content, within a larger body of water, even when the larger body contains $CO_2$ with higher natural background levels of radiocarbon or otherwise unsuitable salinity or contamination.

In one embodiment a photobioreactor comprises an aquaculture pond provided with organisms capable of conducting photosynthesis, preferably microorganisms, inorganic salts, minerals, and $CO_2$ having adequately low radiocarbon level selected from the group consisting of at least about 10%, 25%, 50%, and 75% lower than natural background radiocarbon; more preferably at least about 90%, 96%, and 98% lower than natural background radiocarbon; and preferably completely, substantially completely or partially covered with a transparent plastic sheet or film, which sheet or film acts as a cover to minimize diffusion of low radiocarbon $CO_2$ out of the system and natural background (higher radiocarbon) $CO_2$ into the photobioreactor system. The photosynthesis conducting microorganisms grown in such a photobioreactor can be harvested, and low radiocarbon nucleotides, amino acids, and other DNA and histone precursor compounds extracted. If the $CO_2$ with natural background levels of radiocarbon which is initially in the water is not first scrubbed or removed with a $CO_2$ filter or other separation method well known in the art, then initial production may have a less than preferred level of radiocarbon reduction, which product can be segregated for alternate use or otherwise disposed of. The level of radiocarbon present in the components produced in the photobioreactor can readily be determined using methods referred to herein and/or well known in the art.

A further embodiment comprising a photobioreactor uses a floating, partially submerged raft-like structure or system which is potentially mobile within a larger body of water. In its simplest form, an example of this embodiment comprises a large rubber life raft or similar device filled with water (preferably water that has been filtered or scrubbed to remove all or substantially all of the initial ambient $CO_2$ present in the water) to provide an aqueous compartment over which a covering comprising a transparent or substantially transparent plastic sheet or film is affixed, which also serves substantially to keep out atmospheric or ambient $CO_2$ and outside water. The sidewalls of such a raft-like structure can be sufficiently inflated so that the structure floats at, slightly above or on the surface of a larger body of water in which it is disposed. Preferably, a gas line or tube connects the structure to either a floating or land-based low radiocarbon $CO_2$ gas supply having radiocarbon levels at least about 10%, 25%, 50%, or 75%, and more preferably at least about 90%, 96%, or 98% lower than natural background radiocarbon. At least one check valve or vent is provided in the structure to permit the outward flow of gas so as to prevent excessive internal pressure buildup. Appropriate photosynthetic plants and/or microorganisms, along with necessary inorganic salts and minerals are added to the inner aqueous compartment to encourage growth. Large numbers of such raft-like structures or systems can be tethered to shore or to one another, or towed by a motorized vessel. The photosynthetic microorganisms grown in such photobioreactors can be harvested while the structures float, e.g., at sea, or the structures can be brought to or near land for harvesting, and low radiocarbon nucleotides, amino acids, and other DNA and histone precursor compounds extracted. This embodiment has the advantages of not requiring any surface land for growing purposes, as well as mobility of the structure(s) so as to be able to take advantage of seasonal changes in the amount of ambient light or sunlight as well as ambient air and/or ambient water temperatures; each of these variables can be optimized for the organism, microorganism and/or plant or algae being used. Furthermore, such mobility allows for securing the structures in the event of inclement or unstable conditions, e.g., storms or rough seas.

According to the present invention, chromosomal damage is preferably reduced using dietary supplements comprising low radiocarbon DNA and histone precursors. Residual or by-product low radiocarbon biochemical components remaining after extraction of the desired DNA, histone and other precursors in the previously described photobioreactor processes, such as low radiocarbon carbohydrates (other than DNA precursors), fats, and organic acids, offer either no or significantly less advantage in reducing radiocarbon levels in the chromosomes. Another advantageous aspect of the present invention is the opportunity to modify the component production processes, such as those described above, by repetitively recycling any less desirable by-product low radiocarbon materials, including carbohydrates, fats, and organic acids, as low radiocarbon feedstock for use in non-photosynthetic fermentation processes. Such fermentation processes can produce additional quantities of the desired low radiocarbon DNA, histone and other precursors, as well as specific amino acids using fermentation processes well-known in the art. Certain microorganisms, particularly those of genera *arthrobacter, bacillus, brevibacterium, corynebacterium, escherichia, methanomonas, microbacterium, micrococcus, mycobacterium, nocardia, pseudomonas, serratia* and *streptomyces*, can be used to ferment nucleic and amino acids in general from a wide variety of carbon sources (Hashimoto, 1999; Leuchtenberger, 2005). In addition, other fermentation processes can recycle the above described byproduct low radiocarbon materials into low radiocarbon versions of those individual amino acids most abundant in histones, for example Lys (U.S. Pat. No. 4,066,501; U.S. Pat. No. 4,123,329; U.S. Pat. No. 4,169,763), Arg (U.S. Pat. No. 4,086,137), Leu (U.S. Pat. No. 3,970,519; U.S. Pat. No. 6,124,121), Ala (U.S. Pat. No. 5,478,733), Val (U.S. Pat. No. 5,521,074), Ile (U.S. Pat. No. 5,474,918), Thr (U.S. Pat. No. 5,188,949), Glu (U.S. Pat. No. 4,729,952), Tyr (U.S. Pat. No. 5,605,818), Pro (U.S. Pat. No. 4,444,885), or any of various specific amino acids (U.S. Pat. No. 7,144,724). Standard separation and enzymatic and chemical hydrolysis techniques well known in the art (see, e.g., Oldham, 1974) can be subsequently applied as necessary to these fermentation products to extract and convert their low radiocarbon DNA and proteins into purified nucleotides and free amino acids. Other potentially low radiocarbon organic feedstock material, preferably hydrocarbons or oxidized hydrocarbons derived from low grade oil shale, tar sands, and similar fossil materials which are readily available but may have marginal use as fuels, if confirmed to be low in radiocarbon could also be used in most of these fermentation processes to make low radiocarbon nucleic acids, mixtures of amino acids, or specific amino acids (U.S. Pat. No. 3,355,296; U.S. Pat. No. 3,642,578; U.S. Pat. No. 3,981,774).

A further advantage of using fermentation processes for the production of individual low radiocarbon amino acids is that it permits customization of the relative amino acid abundances present in a composition comprising a mixture of at least one amino acid and other of the various components described herein. For example, a low radiocarbon protein or amino acid mixture produced according to one method that contains a less than desirable level of lysine can be supplemented with low radiocarbon lysine produced by fermentation in order to produce a more preferred composition. Alternatively, the relative amounts of all of the amino acids could be adjusted to more closely correspond to the amino acid abundances of targeted histone proteins. Availability of individual low radiocarbon amino acids also allows for customization of nutritional supplements for other purposes, including tailoring of the composition or mixture for the nutritional needs of specific groups or individuals, as discussed above.

Whatever method by which DNA precursors are produced, standard chemical and enzymatic manipulations can then be used to separate these precursors and provide the desired level of phosphorylation. Buffering with the appropriate salts, derivatization, lyophilization, addition of pharmaceutically acceptable carriers, excipients, stabilizers, or preservatives, or other standard chemical or physical processes can also be carried out to improve stability, enhance digestibility, or facilitate cellular uptake or transport.

Although deoxynucleosides, deoxynucleoside-5'-monophosphates and free amino acids are the chemically preferred forms of the supplements, other chemical forms may also be employed. Because most organisms contain a variety of enzymes to build up and degrade DNA and protein precursors, it is not strictly necessary to provide compounds in the form of the ultimate deoxynucleoside-5'-triphosphate or amino acid that is actually used by DNA polymerase or ribosomes in building DNA or protein. For example, if low radiocarbon DNA precursors which are deficient in phosphate (e.g., as a diphosphate, monophosphate, or non-phosphorylated nucleosides) are provided, the body has enzymes that can readily phosphorylate them into the requisite triphosphorylated form as needed while maintaining their low radiocarbon levels. Likewise, the non-standard bases such as inosine or xanthosine can be enzymatically converted to adenylate or guanylate while maintaining their low radiocarbon levels.

The physical form in which the low radiocarbon DNA precursors and/or amino acids are provided can vary depending on a number of factors, including cost or ease of manufacture, storage requirements (especially if resistance to heat or humidity is critical), ease of use, age of intended user, etc. Useful forms include compositions wherein the nutritional substitute is or is a component of a composition in the form of powders, granules, crystals, liquid solutions, liquid concentrates, formulas including infant formulas, and emulsions, as well as mixtures of these, which may be ingested directly or mixed with any combination of foods, vitamins, minerals, water, milk, milk substitutes or any other drink, or flavorings. Other solid forms such as pills, tablets, capsules, or lozenges, as well as food bars, energy bars or candy bars comprising the supplements, can also be employed when the individual is old enough to safely ingest them. Alternatively, the nutritional supplement can be delivered to an individual as a component of an infusion. Other embodiments of the nutritional supplement compositions of the present invention are particularly useful where additional components or ingredients are included so that it is suitable for use in by individuals in various age groups, e.g., infant formula, sports drinks, particularly those intended for younger individuals, as well as nutritional supplements for expectant and/or lactating mothers.

When an embodiment of the present invention is in the form of an infant formula, the amounts or concentration of each low radiocarbon nucleotide equivalent are preferably provided to be similar to those found in human breast milk, which are typically within the following ranges: AMP, 3.5 to 25.9 mg/L; GMP, 5.4 to 26 mg/L; CMP, 8 to 35.2 mg/L; and UMP, 5.1 to 16.3 mg/L (Gohman et al., U.S. Pat. No. 6,511, 696 and U.S. Pat. No. 6,645,543). IMP (inosine monophosphate) may optionally be included in amounts up to about 3 mg/L. Total nucleotide levels in infant formula may also be limited by European regulations which specify a maximum of 5 mg nucleotides per 100 kcal, and the USA Life Sciences Research Office (LSRO) recommendations which allow up to 16 mg per 100 kcal. Total amount of protein and/or amino acids in an infant formula embodiment is preferably about 10 to about 20 g/L, preferably comprising at least about 0.7 to about 2 g/L of low radiocarbon lysine, and still more preferably also comprising at least about 4 to about 12 g/L total of the low radiocarbon amino acids Arg, Leu, Ala, Val, Ile, Thr, Glu, Tyr, and Pro. When an embodiment is in the form of a nutritional beverage for babies, children, expectant or nursing mothers, or older children or adults, the amounts of low radiocarbon nucleotide equivalents and amino acids are preferably provided in an effective amount, for example in concentrations similar to those preferred for infant formula, or in one or more concentration selected from the group consisting of up to about 25%, 50% and 75% lower than those preferred for infant formula recited above. When an embodiment is provided as a nutritional supplement in any solid form, the total nucleotide equivalents for low radiocarbon AMP, GMP, CMP, UMP, and IMP are preferably provided in an effective amount of about 10 mg to about 1 g per dose, and more preferably further comprising at least about 0.25 g to about 5 g low radiocarbon Lys, and still more preferably further comprising at least about 0.5 g to about 30 g of the low radiocarbon amino acids Arg, Leu, Ala, Val, Ile, Thr, Glu, Tyr, and Pro, with the maximum daily dosage dependent on the age, weight, health, and other dietary intake of the individual, but generally not to exceed about 3 g total nucleotide equivalents per day and about 150 g total protein or amino acids per day. The radiocarbon levels of the low radiocarbon nucleotide and amino acid components of these embodiments are typically at least about 50% lower to about 100% lower; preferably about 60% lower to about 98% lower; more preferably about 75% lower to about 95% lower; and most preferably about 90% lower to about 100% lower, than the natural background level of radiocarbon. These embodiments can usefully comprise at least one higher or natural background radiocarbon component comprising at least one member from the group consisting of fats, carbohydrates, vitamins, pharmaceutically acceptable carriers, excipients or stabilizers, and other organic compounds, with said higher or natural background radiocarbon component member exhibiting a level of radiocarbon that is at about the natural abundance concentration of radiocarbon (carbon-14), or no more than about 10%, 20%, 30%, 40% or 50% lower than the natural abundance concentration of radiocarbon. Furthermore, in each of the various embodiments of the present invention, if for any reason it is necessary to limit the total amount of low radiocarbon nucleotides to an amount that is insufficient to supply the body's requirements for nucleotides, then additional amounts of the low radiocarbon amino acids Asp and Gly and low radiocarbon ribose may be provided in such embodiment in order to meet the body's requirements for nucleotides since these compounds can be used by the body in the de novo synthesis of required nucleotides.

Other examples of foods that are particularly well suited for low radiocarbon component supplementation according to the present invention include shelf-stable semisolid baby-food compositions, gels or gel forming compositions, puddings, yogurt, sauces, soups, cookies, crackers, hot and cold cereals, and other ready-to-eat foods. In general, any type of food preferred by the main target population of this invention, including for example pregnant and lactating women, infants, babies, and growing children and teens, and which food can accept the addition of amino acids, proteins, or nucleic acids without significantly negatively affecting the organoleptic properties of the food including texture and flavor, or significantly negatively affecting the stability of the composition, is a suitable target, food or composition for such supplementation.

Additionally, articles of manufacture can be provided wherein the desired supplement combination or containers of individual supplements are made available along with measuring tools or containers and instructions for combining, dissolving and/or dispersing the components in a suitable liquid or carrier for ingestion as well as instructions for the timing of such ingestion versus meals, as described above.

Vitamins and minerals, including trace minerals where appropriate, can be used in combination with the low radiocarbon compounds of the present invention and include, as vitamins: Vitamin A (retinoids, carotenoids); Vitamin D (D2 and/or D3); Vitamin E (alpha-tocopherols and tocotrienols; D alpha-tocopherol is the naturally occurring form); Vitamin K (phyllo- and menaquinone); Vitamin C (ascorbic acid); Thiamin (vitamin $B_1$, aneurin); riboflavin (vitamin $B_2$); Niacin (vitamin $B_3$, nicotinic acid); Vitamin $B_6$ (pyridoxine); Vitamin $B_{12}$ (cobalamin); Folate (folic acid, pterylpolyglutamates); Biotin; Pantothenic acid; choline; inositol; and, as minerals: sodium; potassium; chloride; phosphorus; calcium; magnesium; iron; iodine; chromium; cobalt; copper; fluoride; manganese; molybdenum; selenium; and zinc. Mixtures of vitamins, mixtures of minerals and mixtures of vitamins and minerals are also useful in the present invention.

Any of various standard chemical or physical methods, including but not limited to cold storage, dehydration or lyophilization, use of stabilizing additives (Price et al., U.S. Pat. No. 5,811,072) or careful buffering of pH (Ihlenfeldt et al., U.S. Pat. No. 6,916,616), may be employed as needed to stabilize DNA precursor compounds during storage or transport prior to use.

Depending on the physical form chosen for the supplements, appropriate pharmaceutically acceptable carriers, excipients, or stabilizers may be employed.

The actual amount of radiocarbon reduction achievable in practice in, e.g., human DNA and proteins, can be monitored over time using accelerator mass spectrometry (AMS), the same technique employed in carbon dating of ancient materials. AMS has been used successfully to date samples with as little as 20 µg of carbon, and could be extended to handle samples with just a few micrograms carbon (Vogel, 1989). At this sensitivity, samples of extracted human DNA and protein can be obtained non-invasively through simple mouth swabs or hair samples for testing using the carbon dating method well known in the art. For detailed research purposes, biopsies of fats cells or other specific tissues, or possibly even blood samples, can be used to obtain sufficient sample material to measure radiocarbon content. Should even greater sensitivities be available in the future, AMS could be coupled with other separation or mass spectrometry techniques to quantitate the specific radiocarbon reductions obtained for specific nucleotides or amino acids rather than overall as a group.

Various embodiments of the invention are described in the following enumerated paragraphs. Such embodiments may further comprise components, including one or more DNA and DNA precursor compounds, histone proteins and histone precursor proteins, amino acids and derivatives thereof, fats, carbohydrates, vitamins, pharmaceutically acceptable carriers, excipients and stabilizers and other ingestible organic compounds, which components exhibit a level of carbon-14 that is at about the natural abundance concentration of carbon-14 or up to about 50% less than the natural abundance concentration of carbon-14. Such embodiments include:

1. A method for reducing the radiocarbon content of histone proteins in a vertebrate comprising providing to said vertebrate at least one histone precursor dietary supplement comprising at least two low radiocarbon amino acids or derivatives of: (1) Lys; and (2) at least one amino acid selected from the group consisting of Arg, Leu, Ala, Val, Ile, Thr, Glu, Tyr, Pro, Ser, Gly, and Gln; said Lys and said at least one amino acid exhibiting a level of carbon-14 that is at least about 10% lower to about 100% lower than the natural abundance concentration of carbon-14.

2. The method of paragraph 1 wherein the supplement further comprises at least one low radiocarbon DNA precursor selected from the group consisting of purines, pyrimidines, nucleosides, deoxynucleosides, nucleotides, deoxynucleotides, and derivatives and mixtures thereof, wherein said at least one DNA precursor exhibits a level of carbon-14 that is at least about 10% lower to about 100% lower than the natural abundance concentration of carbon-14.

3. The method of paragraph 2, said at least one DNA precursor is selected from the group consisting of the DNA nucleotides deoxyadenosine 5'-phosphate (dAMP), deoxyguanosine 5'-phosphate (dGMP), deoxycytidine 5'-phosphate (dCMP) and deoxythymidine 5'-phosphate (dTMP).

4. The method of paragraph 3, wherein said derivative is in the form of at least one salt selected from the group consisting of the sodium, potassium, calcium, magnesium, iron, zinc, manganese, chromium, cobalt, copper, molybdenum, zinc and mixtures thereof.

5. The method of paragraph 1, wherein at least about 50% of the low radiocarbon amino acid carbon atoms are contributed by Lys and at least one amino acid selected from the group consisting of Arg, Leu, Ala, Val, Ile, Thr, Glu, Tyr, Pro, Ser, Gly, and Gln.

6. The method of paragraph 5, wherein the supplement further comprises at least one low radiocarbon DNA precursor selected from the group consisting of purines, pyrimidines, nucleosides, deoxynucleosides, nucleotides, deoxynucleotides, and derivatives and mixtures thereof, wherein said at least one DNA precursor exhibits a level of carbon-14 that is at least about 10% lower to about 100% lower than the natural abundance concentration of carbon-14.

7. The method of paragraph 6, wherein said at least one DNA precursor is selected from the group consisting of the DNA nucleotides deoxyadenosine 5'-phosphate (dAMP), deoxyguanosine 5'-phosphate (dGMP), deoxycytidine 5'-phosphate (dCMP) and deoxythymidine 5'-phosphate (dTMP).

8. The method of paragraph 1, wherein low radiocarbon amino acid carbon atoms are present in the supplement in about the percentages shown in the following table:

| Amino Acid | % |
|---|---|
| Lysine | 12-24 |
| Arginine | 7-16 |
| Leucine | 5-14 |
| Alanine | 3-11 |
| Valine | 3-10 |
| Isoleucine | 3-9 |
| Threonine | 2-8 |
| Glutamic acid | 2-8 |
| Tyrosine | 2-8 |
| Proline | 2-8 |
| Serine | 1-7 |
| Glycine | 0-7 |
| Glutamine | 0-6 |
| Phenylalanine | 0-6 |
| Histidine | 0-5 |
| Asparagine | 0-4 |
| Aspartic acid | 0-3 |

9. The method of paragraph 1, wherein said supplement is provided in a form selected from the group consisting of powders, tablets, capsules, pills, lozenges and liquids.

10. The method of paragraph 1, further comprising providing to the vertebrate a nutritionally effective amount of at least one vitamin or mineral.

11. The method of paragraph 1, wherein said vertebrate is in a stage of development selected from the group consisting of prenatal, infancy, childhood, adolescence, and early adulthood.

12. The method of paragraph 1, wherein said dietary supplement is provided in infant beverage or formula.

13. The method of paragraph 1, wherein said dietary supplement is provided in a beverage, semisolid or solid food product.

14. The method of paragraph 1, wherein said vertebrate is selected from the group consisting of a human, a mammal other than a human, a bird, and a fish.

15. The method of paragraph 14, wherein said vertebrate is a human and at a stage of development selected from the group consisting of prenatal, infancy, childhood, adolescence, early adulthood, and adulthood.

16. The method of paragraph 1, wherein said vertebrate is a pregnant or lactating female.

17. A method for producing at least one low radiocarbon histone precursor comprising at least two low radiocarbon amino acids or derivatives of: (1) Lys; and (2) at least one amino acid selected from the group consisting of Arg, Leu, Ala, Val, Ile, Thr, Glu, Tyr, Pro, Ser, Gly, and Gln; comprising conducting photosynthesis in a photobioreactor in the presence of at least one photosynthetic microorganism or algae, light, water, and a carbon source, said carbon source selected from the group consisting of: $CO_2$ recovered from the combustion of a fuel selected from the group consisting of coal, oil, natural gas and hydrocarbons extracted from hydrocarbon-containing geologic deposits; $CO_2$ derived from the reaction of a metal carbonate or a metal bicarbonate; a reactant obtained from coal, oil, natural gas, or other hydrocarbon-containing geologic deposits; and mixtures thereof; wherein said carbon source for producing said Lys and said at least one amino acid exhibits a level of carbon-14 that is at least about 10% lower to about 100% lower than the natural abundance concentration of carbon-14; harvesting the microorganism or algae and extracting and purifying said at least one histone precursor produced.

18. The method of paragraph 17, comprising further producing at least one low radiocarbon DNA precursor selected from the group consisting of purines, pyrimidines, nucleosides, deoxynucleosides, nucleotides, deoxynucleotides, and derivatives and mixtures thereof, wherein said at least one DNA precursor exhibits a level of carbon-14 that is at least about 10% lower to about 100% lower than the natural abundance concentration of carbon-14.

19. The method of paragraph 18, wherein said DNA precursor is selected from the group consisting of the DNA nucleotides deoxyadenosine 5'-phosphate (dAMP), deoxyguanosine 5'-phosphate (dGMP), deoxycytidine 5'-phosphate (dCMP) and deoxythymidine 5'-phosphate (dTMP).

20. The method of paragraph 17, wherein at least about 50% of the low radiocarbon amino acid carbon atoms are contributed by Lys and at least one amino acid selected from the group consisting of Arg, Leu, Ala, Val, Ile, Thr, Glu, Tyr, Pro, Ser, Gly, and Gln.

21. The method of paragraph 20, comprising further producing at least one low radiocarbon DNA precursor selected from the group consisting of purines, pyrimidines, nucleosides, deoxynucleosides, nucleotides, deoxynucleotides, and derivatives and mixtures thereof, wherein said at least one DNA precursor exhibits a level of carbon-14 that is at least about 10% lower to about 100% lower than the natural abundance concentration of carbon-14.

22. The method of paragraph 21, wherein said DNA precursor is selected from the group consisting of the DNA nucleotides deoxyadenosine 5'-phosphate (dAMP), deoxyguanosine 5'-phosphate (dGMP), deoxycytidine 5'-phosphate (dCMP) and deoxythymidine 5'-phosphate (dTMP).

23. The method of paragraph 17, wherein said photobioreactor further comprises a cover interposed between the water and the light, the cover substantially impermeable to $CO_2$ and which transmits light.

24. The method of paragraph 23, wherein said photobioreactor further comprises a check valve to control the level of pressure within the photobioreactor.

25. The method of paragraph 17, wherein the photobioreactor comprises a structure capable of floating on a body of water.

26. The method of paragraph 25, wherein said structure is mobile.

27. The method of paragraph 17, wherein said photobioreactor comprises a body of water.

28. The method of paragraph 27, wherein the body of water is contained in at least two substantially separate compartments wherein each compartment is suitable for carrying out photosynthesis substantially independent of one another.

29. A method for producing at least one component selected from the group consisting of:
  (A) low radiocarbon DNA precursors selected from the group consisting of purines, pyrimidines, nucleosides, deoxynucleosides, nucleotides, deoxynucleotides and derivatives and mixtures thereof;
  (B) low radiocarbon amino acids and derivatives and mixtures thereof; and
  (C) mixtures of (A) and (B); comprising conducting photosynthesis in a photobioreactor in the presence of:
  (i) at least one photosynthetic microorganism or algae;
  (ii) light;
  (iii) water; and
  (iv) a low radiocarbon carbon dioxide source;
  (1) said carbon dioxide source selected from the group consisting of: $CO_2$ recovered from the combustion of a fuel selected from the group consisting of coal, oil, natural gas and hydrocarbons extracted from hydrocarbon-containing geologic deposits; $CO_2$ derived from the reaction of a metal carbonate or a metal bicarbonate; a reactant obtained from coal, oil, natural gas, or other hydrocarbon-containing geologic deposits; and mixtures thereof;

(2) said photobioreactor further comprising a cover interposed between the water and the light, the cover substantially impermeable to $CO_2$ and which transmits light;

(3) said photobioreactor comprising a structure capable of floating on a body of water;

said carbon source for producing said at least one component exhibits a level of carbon-14 that is at least about 10% lower to about 100% lower than the natural abundance concentration of carbon-14; and harvesting the microorganism or algae and extracting and purifying said at least one component produced.

30. The method of paragraph 29, wherein said DNA precursor is selected from the group consisting of adenine, guanine, cytosine, thymine, uracil, hypoxanthine, xanthine, orotic acid, ribose, deoxyribose, adenosine, deoxyadenosine, guanosine, deoxyguanosine, cytidine, deoxycytidine, thymidine, deoxythymidine, uridine, deoxyuridine, inosine, deoxyinosine, xanthosine, deoxyxanthosine, orotidine, and deoxyorotidine.

31. The method of paragraph 29, wherein said amino acid is selected from the group consisting of alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine.

32. The method of paragraph 29, wherein said carbon source is derived partially or substantially completely from $CO_2$ recovered from the exhaust or effluent from a combustion process conducted in a facility having a use selected from the group consisting of generating heat, producing electricity, and other industrial processes in which a fuel source is selected from the group consisting of oil, coal, natural gas and hydrocarbons extracted from hydrocarbon-containing geologic deposits.

33. The method of paragraph 29, wherein said structure is mobile.

34. A method for producing at least one component selected from the group consisting of:

(A) low radiocarbon DNA precursor compounds selected from the group consisting of purines, pyrimidines, nucleosides, deoxynucleosides, nucleotides, deoxynucleotides and derivatives and mixtures thereof;

(B) low radiocarbon amino acids and derivatives and mixtures thereof; and (C) mixtures of (A) and (B); comprising conducting photosynthesis in a photobioreactor in the presence of:

(i) at least one photosynthetic microorganism or algae;
(ii) light;
(iii) water; and
(iv) a low radiocarbon carbon dioxide source;

(1) said carbon dioxide source selected from the group consisting of: $CO_2$ recovered from the combustion of a fuel selected from the group consisting of coal, oil, natural gas and hydrocarbons extracted from hydrocarbon-containing geologic deposits; $CO_2$ derived from the reaction of a metal carbonate or a metal bicarbonate; a reactant obtained from coal, oil, natural gas, or other hydrocarbon-containing geologic deposits; and mixtures thereof;

(2) said photobioreactor further comprising a cover interposed between the water and the light, the cover substantially impermeable to $CO_2$ and which transmits light;

(3) the photobioreactor comprising a body of water; said carbon source for producing said at least one component exhibits a level of carbon-14 that is at least about 10% lower to about 100% lower than the natural abundance concentration of carbon-14; and harvesting the microorganism or algae and extracting and purifying said at least one component produced.

35. The method of paragraph 34, wherein the body of water is contained in at least two substantially separate compartments wherein each compartment is suitable for carrying out photosynthesis substantially independent of one another.

36. A nutritional or dietary supplement comprising at least one histone precursor comprising at least two low radiocarbon amino acids or derivatives of: (1) Lys; and (2) at least one amino acid selected from the group consisting of Arg, Leu, Ala, Val, Ile, Thr, Glu, Tyr, Pro, Ser, Gly, and Gln; said Lys and said at least one amino acid exhibiting a level of carbon-14 that is at least about 10% lower to about 100% lower than the natural abundance concentration of carbon-14.

37. The nutritional supplement of paragraph 36, wherein the supplement further comprises at least one low radiocarbon DNA precursor selected from the group consisting of purines, pyrimidines, nucleosides, deoxynucleosides, nucleotides, deoxynucleotides, and derivatives and mixtures thereof, wherein said at least one DNA precursor exhibits a level of carbon-14 that is at least about 10% lower to about 100% lower than the natural abundance concentration of carbon-14.

38. The nutritional supplement of paragraph 37, wherein said DNA precursor is selected from the group consisting of the DNA nucleotides deoxyadenosine 5'-phosphate (dAMP), deoxyguanosine 5'-phosphate (dGMP), deoxycytidine 5'-phosphate (dCMP) and deoxythymidine 5'-phosphate (dTMP).

39. The nutritional supplement of paragraph 36, wherein at least about 50% of the low radiocarbon amino acid carbon atoms are contributed by Lys and at least one amino acid selected from the group consisting of Arg, Leu, Ala, Val, Ile, Thr, Glu, Tyr, Pro, Ser, Gly, and Gln.

40. The nutritional supplement of paragraph 39, further comprising at least one low radiocarbon DNA precursor selected from the group consisting of purines, pyrimidines, nucleosides, deoxynucleosides, nucleotides, deoxynucleotides, and derivatives and mixtures thereof, wherein said at least one DNA precursor exhibits a level of carbon-14 that is at least about 10% lower to about 100% lower than the natural abundance concentration of carbon-14.

41. The nutritional supplement of paragraph 40, wherein said DNA precursor is selected from the group consisting of the DNA nucleotides deoxyadenosine 5'-phosphate (dAMP), deoxyguanosine 5'-phosphate (dGMP), deoxycytidine 5'-phosphate (dCMP) and deoxythymidine 5'-phosphate (dTMP).

42. The nutritional supplement of paragraph 36, comprising low radiocarbon amino acid carbon atoms in about the percentages shown in the following table:

| Amino Acid | % |
| --- | --- |
| Lysine | 12-24 |
| Arginine | 7-16 |
| Leucine | 5-14 |
| Alanine | 3-11 |
| Valine | 3-10 |
| Isoleucine | 3-9 |
| Threonine | 2-8 |
| Glutamic acid | 2-8 |

-continued

| Amino Acid | % |
| --- | --- |
| Tyrosine | 2-8 |
| Proline | 2-8 |
| Serine | 1-7 |
| Glycine | 0-7 |
| Glutamine | 0-6 |
| Phenylalanine | 0-6 |
| Histidine | 0-5 |
| Asparagine | 0-4 |
| Aspartic acid | 0-3 |

43. The nutritional supplement of paragraph 36, wherein said supplement is provided in a form selected from the group consisting of powders, tablets, capsules, pills, lozenges and liquids.

44. A composition comprising the nutritional supplement of paragraph 36.

45. The composition of paragraph 44, further comprising a nutritionally effective amount of at least one component selected from the group consisting of vitamins, minerals, carbohydrates, vegetable oils and lipids.

46. The composition of paragraph 44, further comprising nutritional components suitable for use in an infant nutritional beverage selected from the group consisting of infant formula, natural milk and milk substitute.

47. The composition of paragraph 44, further comprising components suitable for mixing into or incorporation into a liquid drink, beverage, or infusion.

48. The composition of paragraph 44, further comprising components suitable for mixing into or incorporation into semisolid or solid food.

49. The composition of paragraph 44, further comprising one or more pharmaceutically acceptable carriers, excipients or stabilizers.

50. The nutritional supplement of paragraph 36, wherein said low radiocarbon amino acid derivatives are in the form of at least one salt or adduct selected from the group consisting of sodium, potassium, calcium, magnesium, iron, zinc, manganese, chromium, cobalt, copper, molybdenum, zinc, chloride, hydrochloride, sulfate, carbonate, bicarbonate, phosphate, acetate, ascorbate, citrate, isocitrate, cis-aconitate, malate, maleate, succinate, fumarate, glutarate, alpha-ketoglutarate, oxaloacetate, pyruvate, pyroglutamate, tartrate, lactate, caseinate, gluconate, palmitate, stearate, picolinate and mixtures thereof.

51. The nutritional supplement of paragraph 38, wherein said derivatives of said DNA precursor are in the form of at least one salt selected from the group consisting of sodium, potassium, calcium, magnesium, iron, zinc, manganese, chromium, cobalt, copper, molybdenum, zinc and mixtures thereof.

52. A method for enhanced production of at least one component selected from the group consisting of:
  (A) low radiocarbon DNA precursors selected from the group consisting of purines, pyrimidines, nucleosides, deoxynucleosides, nucleotides, deoxynucleotides and derivatives and mixtures thereof;
  (B) low radiocarbon amino acids and derivatives and mixtures thereof; and
  (C) mixtures of (A) and (B); comprising:
  (1) conducting photosynthesis suitable for producing said at least one component and low radiocarbon by-products, in a photobioreactor in the presence of:
  (i) at least one photosynthetic microorganism or algae;
  (ii) light;
  (iii) water; and
  (iv) a carbon dioxide source; said carbon dioxide source selected from the group consisting of: $CO_2$ recovered from the combustion of a fuel selected from the group consisting of coal, oil, natural gas and hydrocarbons extracted from hydrocarbon-containing geologic deposits; $CO_2$ derived from the reaction of a metal carbonate or a metal bicarbonate; a reactant obtained from coal, oil, natural gas, or other hydrocarbon-containing geologic deposits; and mixtures thereof; wherein said carbon dioxide source exhibits a level of carbon-14 that is at least about 10% lower to about 100% lower than the natural abundance concentration of carbon-14;
  (2) harvesting the microorganism or algae and extracting from said at least one component and by-products, said by-products comprising compounds other than members of said (A), (B) and (C); and purifying said at least one component produced; and
  (3) providing at least one of said low radiocarbon by-products suitable for use as a nutrient to a non-photosynthetic fermentation process, said fermentation process capable of producing at least one said component, the same or different from said component produced in (1); and
  (4) extracting and purifying said at least one said component from said non-photosynthetic process.

53. The method of paragraph 52, wherein said at least one DNA precursor is selected from the group consisting of adenine, guanine, cytosine, thymine, uracil, hypoxanthine, xanthine, orotic acid, ribose, deoxyribose, adenosine, deoxyadenosine, guanosine, deoxyguanosine, cytidine, deoxycytidine, thymidine, deoxythymidine, uridine, deoxyuridine, inosine, deoxyinosine, xanthosine, deoxyxanthosine, orotidine, and deoxyorotidine.

54. The method of paragraph 52, wherein said at least one amino acid is selected from the group consisting of alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine.

55. The method of paragraph 52, wherein said carbon source is derived partially or substantially completely from $CO_2$ recovered from the exhaust or effluent from a combustion process conducted in a facility having a use selected from the group consisting of generating heat, producing electricity, and other industrial processes in which a fuel source is selected from the group consisting of oil, coal, natural gas and hydrocarbons extracted from hydrocarbon-containing geologic deposits.

56. The method of paragraph 52, wherein said photobioreactor comprises a structure capable of floating on a body of water; said photobioreactor further comprising a cover interposed between the water and the light, the cover substantially impermeable to $CO_2$ and which transmits light.

57. The method of paragraph 56, wherein the photobioreactor comprises a body of water and said body of water is contained in at least two substantially separate compartments wherein each compartment is suitable for carrying out photosynthesis substantially independent of one another.

58. The method of paragraph 54, wherein said non-photosynthetic fermentation process is selected for the production of at least one specific low radiocarbon amino acid.

And further:

59. A method for reducing in a vertebrate the radiocarbon content of at least one component selected from the group consisting of deoxyribonucleic acid (DNA), histone proteins and chromatin comprising providing to said vertebrate at least one dietary supplement, said supplement comprising at least one member, including enantiomers, stereoisomers, rotamers, tautomers, racemates and nutritionally acceptable salts or solvates thereof, selected from the group consisting of: (A) DNA precursor compound selected from the group consisting of purines, pyrimidines, nucleosides, deoxynucleosides, nucleotides, deoxynucleotides, and derivatives and mixtures thereof; (B) amino acids and derivatives and mixtures thereof; and (C) mixtures of (A) and (B); said at least one member based on said (A) compound exhibiting a level of carbon-14 that is at least about 10% lower to about 100% lower than the natural abundance concentration of carbon-14; and said (B) exhibiting a level of carbon-14 that is at least about 10% lower to about 98% lower than the natural abundance concentration of carbon-14.

60. The method of paragraph 59 wherein said purines, pyrimidines, nucleosides and deoxynucleosides are selected from the group consisting of adenine, guanine, cytosine, thymine, uracil, hypoxanthine, xanthine, orotic acid, ribose, deoxyribose, adenosine, deoxyadenosine, guanosine, deoxyguanosine, cytidine, deoxycytidine, thymidine, deoxythymidine, uridine, deoxyuridine, inosine, deoxyinosine, xanthosine, deoxyxanthosine, orotidine, deoxyorotidine and mixtures thereof.

61. The method of paragraph 59 where said derivative in (A) is selected from the group consisting of a nucleoside monophosphate, nucleoside diphosphate, nucleoside triphosphate, oligonucleotide, polynucleotide, and mixtures thereof.

62. The method of paragraph 59 wherein said derivative of said (A) or said (B) is in the form of at least one salt selected from the group consisting of the sodium, potassium, calcium, magnesium, iron, zinc, manganese, chromium, cobalt, copper, molybdenum, zinc and mixtures thereof.

63. The method of paragraph 59 wherein said amino acids are selected from the group consisting of alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine.

64. The method of paragraph 59 wherein said amino acid derivative is in a form selected from the group consisting of a dipeptide, tripeptide, oligopeptide, polypeptide and mixtures thereof.

65. The method of paragraph 59 wherein said amino acid derivative is in the form of at least one salt or adduct selected from the group consisting of sodium, potassium, calcium, magnesium, iron, zinc, manganese, chromium, cobalt, copper, molybdenum, zinc, chloride, hydrochloride, sulfate, carbonate, bicarbonate, phosphate, acetate, ascorbate, citrate, isocitrate, cis-aconitate, malate, maleate, succinate, fumarate, glutarate, alpha-ketoglutarate, oxaloacetate, pyruvate, pyroglutamate, tartrate, lactate, caseinate, gluconate, palmitate, stearate, picolinate and mixtures thereof.

66. The method of paragraph 59 wherein said amino acid derivative is in the form of an ester selected from the group consisting of methyl, ethyl, propyl and mixtures thereof.

67. The method of paragraph 8 wherein said amino acid derivative is aspartame (L-alpha-aspartyl-L-phenylalanine methyl ester).

68. The method of paragraph 59 wherein said amino acid derivative is in the form of an N-acetyl amide.

69. The method of paragraph 59 wherein said supplement is provided in a form selected from the group consisting of powders, tablets, capsules, pills, lozenges and liquids.

70. The method of paragraph 59 further comprising providing a nutritionally effective amount of at least one vitamin or mineral.

71. The method of paragraph 59 wherein said vertebrate is in a stage of development selected from the group consisting of prenatal, infancy, childhood, adolescence, and early adulthood.

72. The method of paragraph 59 wherein said nutritional supplement is provided in infant beverage or formula.

73. The method of paragraph 59 wherein said supplement is included in a beverage or solid food product.

74. The method of paragraph 59 wherein said vertebrate is selected from the group consisting of a human, a mammal other than a human, a bird, and a fish.

75. The method of paragraph 74 wherein said vertebrate is a human and stage of development is selected from the group consisting of prenatal, infancy, childhood, adolescence, early adulthood, and adulthood.

76. The method of paragraph 59 wherein said vertebrate is a pregnant or lactating female.

77. A method for producing at least one member selected from the group consisting of: (A) DNA precursor compounds selected from the group consisting of purines, pyrimidines, nucleosides, deoxynucleosides and derivatives and mixtures thereof; (B) amino acids and derivatives and mixtures thereof; and (C) mixtures of (A) and (B); comprising conducting photosynthesis in a photobioreactor in the presence of at least one photosynthetic microorganism or algae, light, and a carbon source, said carbon source selected from the group consisting of: $CO_2$ recovered from the combustion of a fuel selected from the group consisting of coal, oil, natural gas and hydrocarbons extracted from hydrocarbon-containing geologic deposits; $CO_2$ derived from the reaction of a metal carbonate or a metal bicarbonate; a reactant obtained from coal, oil, natural gas, or other hydrocarbon-containing geologic deposits; and mixtures thereof; wherein said carbon source for producing said at least one member based on said (A) compound exhibiting a level of carbon-14 that is at least about 10% lower to about 100% lower than the natural abundance concentration of carbon-14; and said carbon source for producing said (B) exhibiting a level of carbon-14 that is at least about 10% lower to about 98% lower than the natural abundance concentration of carbon-14; harvesting the microorganisms or algae and extracting and purifying said at least one member produced.

78. The method of paragraph 77 wherein said DNA precursor compound is selected from the group consisting of adenine, guanine, cytosine, thymine, uracil, hypoxanthine, xanthine, orotic acid, ribose, deoxyribose, adenosine, deoxyadenosine, guanosine, deoxyguanosine, cytidine, deoxycytidine, thymidine, deoxythymidine, uridine, deoxyuridine, inosine, deoxyinosine, xanthosine, deoxyxanthosine, orotidine, and deoxyorotidine.

79. The method of paragraph 77 wherein said amino acid is selected from the group consisting of alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine.

80. The method of paragraph 77 wherein said carbon source is derived partially or substantially completely from $CO_2$ recovered from the exhaust or effluent from a combustion process conducted in a facility having a use selected from the group consisting of generating heat, producing electricity, and other industrial processes in which a fuel source is selected from the group consisting of oil, coal, natural gas and hydrocarbons extracted from hydrocarbon-containing geologic deposits.

81. A method for monitoring radiocarbon levels of vertebrate DNA, protein or mixtures of DNA and protein comprising application of the methods of accelerator mass spectrometry (AMS) for carbon dating wherein said AMS is applied to DNA, protein or a mixture of DNA and protein isolated from at least one sample selected from the group consisting of mouth swabs, hair samples, biopsies, blood samples, and mixtures thereof.

82. The method of paragraph 81 further including administering a low radiocarbon dietary supplement to said vertebrate, said dietary supplement comprising at least one member selected from the group consisting of: (A) DNA precursor compound selected from the group consisting of nucleosides, deoxynucleosides, nucleotides, deoxynucleotides, and derivatives and mixtures thereof; (B) amino acids and derivatives and mixtures thereof; and (C) mixtures of (A) and (B); wherein said at least one member based on said (A) compound exhibiting a level of carbon-14 that is at least about 10% lower to about 100% lower than the natural abundance concentration of carbon-14; and said (B) exhibiting a level of carbon-14 that is at least about 10% lower to about 98% lower than the natural abundance concentration of carbon-14.

83. A nutritional supplement comprising at least one member, including enantiomers, stereoisomers, rotamers, tautomers, racemates and nutritionally acceptable salts or solvates thereof, selected from the group consisting of: (A) DNA precursor compounds comprising purines, pyrimidines, nucleosides, deoxynucleosides, nucleotides, deoxynucleotides, and derivatives and mixtures thereof; (B) amino acids, amino acid derivatives and mixtures thereof; and (C) mixtures of (A) and (B); said at least one member based on said (A) compound exhibiting a level of carbon-14 that is at least about 10% lower to about 100% lower than the natural abundance concentration of carbon-14; and said (B) exhibiting a level of carbon-14 that is at least about 10% lower to about 98% lower than the natural abundance concentration of carbon-14.

84. The nutritional supplement of paragraph 83 wherein said at least one DNA precursor compound is selected from the group consisting of adenine, guanine, cytosine, thymine, uracil, hypoxanthine, xanthine, orotic acid, ribose, deoxyribose, adenosine, deoxyadenosine, guanosine, deoxyguanosine, cytidine, deoxycytidine, thymidine, deoxythymidine, uridine, deoxyuridine, inosine, deoxyinosine, xanthosine, deoxyxanthosine, orotidine, and deoxyorotidine.

85. The nutritional supplement of paragraph 25 wherein said at least one amino acid is selected from the group consisting of alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine.

86. The nutritional supplement of paragraph 83 wherein said at least one DNA precursor compound derivative comprises a monophosphate, diphosphate, triphosphate, oligonucleotide, or polynucleotide of said nucleosides and deoxynucleosides.

87. The nutritional supplement of paragraph 83 wherein said DNA precursor compound derivative is in the form of at least one salt selected from the group consisting of the sodium, potassium, calcium, magnesium, iron, zinc, manganese, chromium, cobalt, copper, molybdenum, zinc and mixtures thereof.

88. The nutritional supplement of paragraph 83 wherein said amino acid derivative is in the form of at least one salt selected from the group consisting of sodium, potassium, calcium, magnesium, iron, zinc, manganese, chromium, cobalt, copper, molybdenum, zinc, chloride, hydrochloride, sulfate, carbonate, bicarbonate, phosphate, acetate, ascorbate, citrate, isocitrate, cis-aconitate, malate, maleate, succinate, fumarate, glutarate, alpha-ketoglutarate, oxaloacetate, pyruvate, pyroglutamate, tartrate, lactate, caseinate, gluconate, palmitate, stearate, picolinate and mixtures thereof.

89. The nutritional supplement of paragraph 83 wherein said amino acid derivative is in the form of a dipeptide, tripeptide, or any other length oligopeptide or polypeptide.

90. The nutritional supplement of paragraph 83 wherein said amino acid derivative is in the form of at least one ester selected from the group consisting of methyl, ethyl, and propyl.

91. The nutritional supplement of paragraph 83 wherein said amino acid derivative is aspartame (L-alpha-aspartyl-L-phenylalanine methyl ester).

92. The nutritional supplement of paragraph 83 wherein said amino acid derivative is S-adenosyl-methionine (SAMe).

93. The nutritional supplement of paragraph 83 wherein said amino acid derivative is in the form of an N-acetyl amide.

94. The nutritional supplement of paragraph 83 wherein said supplement is provided in a form selected from the group consisting of powders, tablets, capsules, pills, lozenges and liquids.

95. A composition comprising the nutritional supplement of paragraph 83.

96. The composition of paragraph 95 further comprising a nutritionally effective amount of at least one vitamin or mineral.

97. The composition of paragraph 95 further comprising nutritional components suitable for use in an infant nutritional beverage selected from the group consisting of infant formula, natural milk and milk substitute.

98. The composition of paragraph 95 further comprising components suitable for mixing into or incorporation into a liquid drink, beverage, or infusion.

99. The composition of paragraph 95 further comprising components suitable for mixing into or incorporation into other solid food.

100. The composition of paragraph 95 further comprising one or more pharmaceutically acceptable carriers, excipients or stabilizers.

101. The method of paragraph 59 wherein said amino acid derivative is S-adenosyl-methionine (SAMe).

102. A method for reducing in a vertebrate the radiocarbon content of at least one component selected from the group consisting of deoxyribonucleic acid (DNA), histone proteins and chromatin comprising administering to said vertebrate at least one dietary supplement, said supplement comprising at least one member, including enantiomers, stereoisomers, rotamers, tautomers, racemates and nutritionally acceptable salts or solvates thereof, selected from the group consisting of: (A) DNA precursor compound selected from the group consisting of purines, pyrimidines, nucleosides, deoxynucleosides, nucleotides, deoxynucleotides, and derivatives and mixtures thereof; (B) amino acids and derivatives and mixtures thereof; and (C) mixtures of (A) and (B); said at least one member exhibiting a level of carbon-14 that is at least about 10% lower to about 100% lower than the natural abundance concentration of carbon-14; and wherein said administration is at a sufficient time prior to taking normal nutrition such that said supplement will substantially satisfy the body's need for said at least one component.

103. The method of paragraph 102 wherein said administration is about 5 to about 120 minutes prior to a normal meal.

104. The method of paragraph 102 wherein said administration is at a time that permits the stomach to substantially empty prior to ingestion of a meal comprising normal radiocarbon level ingredients.

Any range of numbers recited in the specification hereinabove or in the paragraphs and claims hereinafter, referring to various aspects of the invention, such as that representing a particular set of properties, units of measure, conditions, physical states or percentages, is intended to literally incorporate expressly herein by reference or otherwise, any number falling within such range, including any subset of numbers or ranges subsumed within any range so recited. Furthermore, the term "about" when used as a modifier for, or in conjunction with, a variable, characteristic or condition is intended to convey that the numbers, ranges, characteristics and conditions disclosed herein are flexible and that practice of the present invention by those skilled in the art using temperatures, concentrations, amounts, contents, carbon numbers and properties that are outside of the range or different from a single value, will achieve the desired result, namely, a nutritional supplement comprising at least one low radiocarbon DNA precursor and/or amino acid in a form typically suitable for ingestion and suitable for maintaining and/or improving the cellular health of an individual.

All documents described herein are incorporated by reference herein, including any priority documents and/or testing procedures. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for reducing in certain cells of a human the radiocarbon content of at least one component selected from the group consisting of deoxyribonucleic acid (DNA), histone proteins and chromatin,
    comprising the formulation of a mixed-level-radiocarbon food or nutritional supplement,
    wherein said mixed-level-radiocarbon food or nutritional supplement comprises a mixture formulated by adding together
        (I) a therapeutically effective or beneficial amount of at least one low-radiocarbon component, including nutritionally acceptable salts or solvates thereof, comprising at least one member selected from the group consisting of:
            (A DNA precursor compounds selected from the group consisting of purines, pyrimidines, nucleosides, deoxynucleosides, nucleotides, deoxynucleotides, oligonucleotides, polynucleotides and mixtures thereof;
            (B) histone precursor compounds selected from the group consisting of amino acids, dipeptides, tripeptides, oligopeptides, polypeptides, proteins, including hydrolyzed, substantially hydrolyzed or partially hydrolyzed proteins, and mixtures thereof; and
            (C) mixtures of (A) and (B); and
        (II) a therapeutically effective or nutritionally beneficial amount of at least one component having a natural background level of radiocarbon comprising at least one member selected from the group consisting of fats, lipids, fatty acids, carbohydrates, vitamins, and ingestible dietary organic compounds other than said DNA precursor compounds (A) or histone precursor compounds (B);
    and whereby
        said human,
        or the pregnant mother of said human during the gestation of said human,
        or the lactating mother whose milk is ingested by said human,
    ingests an effective amount of at least one said mixed-level-radiocarbon food or nutritional supplement so as to form in vivo in said human at least one of said DNA, histone proteins or chromatin comprising a reduced concentration of radiocarbon compared to the natural abundance concentration of radiocarbon; and wherein said low radiocarbon component (I) exhibits a level of carbon-14 that is at least 50% lower to 100% lower than the natural abundance concentration of carbon-14; and
    wherein said at least one natural background radiocarbon component (II) exhibits a level of carbon-14 that is at about the natural abundance concentration of carbon-14; and
    wherein said mixed-level radiocarbon food or nutritional supplement exhibits an overall level of carbon-14 for the group consisting of all members of DNA precursor compounds (A) and histone precursor compounds (B) that is at least 50% lower to 100% lower than the natural abundance concentration of carbon-14.

2. The method of claim 1 wherein the time period for ingestion of said mixed-level radiocarbon food or nutritional supplement is limited to the development stage of life of said human, said development stage of life lasting from conception up to about age 20 years.

3. The method of claim 2 wherein said cells to be reduced in radiocarbon comprise brain neurons.

4. The method of claim 1, wherein the time period for ingestion of said mixed-level radiocarbon food or nutritional supplement is limited to the early development stage of life of said human, said early development stage of life lasting from conception up to about age 6 years.

5. The method of claim 1 wherein said low-radiocarbon component (I) has normal or near-normal abundances of both of the stable isotopes of carbon, that is, a carbon-12 abundance between 97.9% and 99.9% of the total carbon, and a carbon-13 abundance between 0.1% and 2.1% of the total carbon.

6. The method of claim 1 wherein said low radiocarbon component (I) exhibits a level of carbon-14 that is at least 75% lower to 100% lower than the natural abundance concentration of carbon-14.

7. The method of claim 1 wherein said low radiocarbon component (I) exhibits a level of carbon-14 that is at least 90% lower to 100% lower than the natural abundance concentration of carbon-14.

8. The method of claim 1 wherein said low radiocarbon component (I) exhibits a level of carbon-14 that is at least 96% lower to 100% lower than the natural abundance concentration of carbon-14.

9. The method of claim 1 wherein said therapeutically effective or beneficial amount provides between about 1 mg and 3 g per day of said low-radiocarbon component (I) per kg body weight of said human.

10. A method for reducing the radiocarbon content in the genetic material of certain cells of a human in order to prevent genetic damage from the subsequent decay of radiocarbon incorporated in said genetic material,
    said method comprising a diet comprising wherein
        said human,
        or the pregnant mother of said human during the gestation of said human, or the lactating mother whose milk is ingested by said human, ingests items from the group consisting of:
- (I) a food item or nutritional supplement which comprises a therapeutic or beneficial amount of a low-radiocarbon DNA or histone precursor, said food item or nutritional supplement selected from the group consisting of:
  - (A) a mixed-level-radiocarbon food item or nutritional supplement, wherein said mixed-level-radiocarbon item comprises a mixture which is formulated by adding together
    - i) a therapeutically effective or beneficial amount of at least one low-radiocarbon component comprising a DNA or histone precursor; and
    - ii) a therapeutically effective or beneficial amount of at least one component having about the natural background level of radiocarbon comprising a member selected from the group consisting of fats, lipids, fatty acids, carbohydrates, vitamins, and ingestible dietary organic compounds other than DNA or histone precursors;
  - (B) a food item or nutritional supplement which has about the natural background level of radiocarbon, ingested at about the same time with an additional and sufficient quantity of components comprising low-radiocarbon DNA or histone precursors such that the overall radiocarbon level of DNA or histone precursors ingested at approximately the same time is overall low in radiocarbon;
  - (C) any combination of (A) and (B);
- (II) a food item or nutritional supplement having about the natural background level of radiocarbon, which does not contain a therapeutic or beneficial amount of a DNA or histone precursor, and which also contains a therapeutic or beneficial amount of at least one component selected from the group consisting of fats, lipids, fatty acids, carbohydrates, vitamins, and ingestible dietary organic compounds other than a DNA or histone precursor;
- (III) any combination of (I) or (II);

and wherein the overall radiocarbon level of the group consisting of all DNA or histone precursors which are ingested is low in radiocarbon;

and wherein said DNA or histone precursor consists of at least one component, including nutritionally acceptable salts or solvates thereof, selected from the group consisting of:
- (D) DNA precursor compounds selected from the group consisting of purines, pyrimidines, nucleosides, deoxynucleosides, nucleotides, deoxynucleotides, oligonucleotides, polynucleotides and mixtures thereof;
- (E) histone precursor compounds selected from the group consisting of amino acids, dipeptides, tripeptides, oligopeptides, polypeptides, proteins, including hydrolyzed, substantially hydrolyzed or partially hydrolyzed proteins, and mixtures thereof; and
- (F) mixtures of (D) and (E);

and wherein said low in radiocarbon or low-radiocarbon means at least 50% to 100% reduced in radiocarbon compared to the natural background level of radiocarbon.

11. The method of claim 10 wherein the time period for ingestion of said low-radiocarbon foods and said mixed-level-radiocarbon foods is limited to the time in which said human is in the development stage of life, up to about the age of twenty years.

12. The method of claim 10 wherein the time period for ingestion of said low-radiocarbon foods and said mixed-level-radiocarbon foods is limited to the time in which said human is an infant or child up to about the age of six years.

13. The method of claim 10 wherein said low in radiocarbon or low-radiocarbon is further limited to having normal or near-normal abundances of both of the stable isotopes of carbon, that is, a carbon-12 abundance between 97.9% and 99.9% of the total carbon, and a carbon-13 abundance between 0.1% and 2.1% of the total carbon.

14. The method of claim 10 in which foods in group (II) having natural background levels of radiocarbon are low in both nucleotides and protein, comprising: berries selected from the group consisting of cherries, strawberries, blueberries, other red-blue berries and mixtures thereof; bananas; vegetables selected from the group consisting of celery, tomatoes, kale, cabbage, parsley, green-leafy vegetables, and mixtures thereof; pineapple and other foods high in bromelain; red cabbage, red bell peppers, tangerines, mandarins, oranges, potatoes and other foods high in vitamin C; fruit juices; breads, cereals, pasta, rice and other foods comprising complex carbohydrates; and mixtures thereof.

15. The method of claim 10 in which said low in radiocarbon or low-radiocarbon is defined as a level of carbon-14 that is at least 75% lower to 100% lower than the natural abundance concentration of carbon-14.

16. The method of claim 10 wherein said therapeutically effective or beneficial amount of (I) provides between about 1 mg and 3 g per day of said low-radiocarbon DNA or histone precursors per kg body weight of said human.

17. The method of claim 10 wherein said therapeutically effective or beneficial amount of (I) provides between about 10 mg and 2 g per day of said low-radiocarbon DNA or histone precursors per kg body weight of said human.

18. The method of claim 10 wherein said low-radiocarbon DNA or histone precursors provide about 15%-20% of the total calories ingested.

19. The method of claim 10 wherein said components with natural background levels of radiocarbon consisting of all members of the group consisting of fats, lipids, fatty acids, carbohydrates, vitamins, and ingestible dietary organic compounds other than DNA or histone precursors, provide about 75%-85% of the total calories ingested.

* * * * *